(12) United States Patent
Yi

(10) Patent No.: US 9,661,511 B2
(45) Date of Patent: May 23, 2017

(54) JOINT CHANNEL CORRECTION METHOD, JOINT CHANNEL CORRECTION UNIT AND BASE STATION

(71) Applicant: HUAWEI TECHNOLOGIES CO., LTD., Shenzhen, Guangdong (CN)

(72) Inventor: Xiongshu Yi, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 227 days.

(21) Appl. No.: 14/554,782

(22) Filed: Nov. 26, 2014

(65) Prior Publication Data

US 2015/0085690 A1    Mar. 26, 2015

Related U.S. Application Data

(63) Continuation of application No. PCT/CN2013/071010, filed on Jan. 26, 2013.

(30) Foreign Application Priority Data

May 31, 2012   (CN) .......................... 2012 1 0176621
Dec. 24, 2012   (CN) .......................... 2012 1 0567805

(51) Int. Cl.
*H04W 24/02*  (2009.01)
*H04B 17/14*  (2015.01)
(Continued)

(52) U.S. Cl.
CPC ............ *H04W 24/02* (2013.01); *H04B 17/14* (2015.01); *H04L 25/0224* (2013.01); *H04W 92/20* (2013.01)

(58) Field of Classification Search
CPC ...... H04W 24/02; H04W 92/20; H04B 17/14; H04L 25/0224
See application file for complete search history.

(56) References Cited

U.S. PATENT DOCUMENTS 7,317,750 B2   1/2008   Shattil
2002/0159537 A1*  10/2002   Crilly, Jr. ............. H04B 7/0617
                                                                    375/267

(Continued)

FOREIGN PATENT DOCUMENTS

CN    1571534       1/2005
CN    101227242    7/2008
(Continued)

OTHER PUBLICATIONS

Japanese Office Action dated Dec. 1, 2015 in corresponding Japanese Patent Application No. 2015-514324.

(Continued)

*Primary Examiner* — Ajay Cattungal
(74) *Attorney, Agent, or Firm* — Staas & Halsey LLP

(57) ABSTRACT

Embodiments of the present invention provide a joint channel correction method, a joint channel correction unit and a base station. The joint channel correction method can implement joint channel correction between base stations in a base station set. At least one base station in the base station set is connected to the joint channel correction unit, so that all base stations in the base station set share a common reference transmit end and a common reference receive end.

20 Claims, 28 Drawing Sheets

(51) Int. Cl.
*H04L 25/02* (2006.01)
*H04W 92/20* (2009.01)

(56) References Cited

U.S. PATENT DOCUMENTS

| | | | | |
|---|---|---|---|---|
| 2004/0224691 A1* | 11/2004 | Hadad | ............... | H04W 36/18 |
| | | | | 455/442 |
| 2005/0054318 A1* | 3/2005 | Fujii | ............... | H01Q 1/246 |
| | | | | 455/272 |
| 2008/0003948 A1* | 1/2008 | Mitran | ............... | H04B 7/024 |
| | | | | 455/67.11 |
| 2008/0075033 A1* | 3/2008 | Shattil | ............... | H04B 7/026 |
| | | | | 370/328 |
| 2008/0317149 A1* | 12/2008 | Sondur | ............... | H04L 27/2657 |
| | | | | 375/260 |
| 2009/0029651 A1* | 1/2009 | Polini | ............... | H04W 16/22 |
| | | | | 455/68 |
| 2009/0249158 A1* | 10/2009 | Noh | ............... | H04L 1/0026 |
| | | | | 714/750 |
| 2009/0316634 A1* | 12/2009 | Sahara | ............... | H04L 27/2656 |
| | | | | 370/329 |
| 2010/0238824 A1* | 9/2010 | Farajidana | ............... | H04B 7/0417 |
| | | | | 370/252 |
| 2010/0303015 A1* | 12/2010 | Ko | ............... | H04B 7/024 |
| | | | | 370/328 |
| 2011/0134848 A1* | 6/2011 | Tamaki | ............... | H04B 7/0417 |
| | | | | 370/328 |
| 2011/0149886 A1* | 6/2011 | Xu | ............... | H04B 7/0628 |
| | | | | 370/329 |
| 2011/0158116 A1* | 6/2011 | Tenny | ............... | H04W 56/0045 |
| | | | | 370/252 |
| 2011/0199985 A1* | 8/2011 | Cai | ............... | H04L 1/0026 |
| | | | | 370/329 |
| 2012/0225680 A1* | 9/2012 | Suh | ............... | H04W 16/32 |
| | | | | 455/501 |
| 2015/0018030 A1* | 1/2015 | Park | ............... | H04W 52/283 |
| | | | | 455/522 |
| 2015/0117291 A1* | 4/2015 | Seo | ............... | H04L 5/001 |
| | | | | 370/312 |

FOREIGN PATENT DOCUMENTS

| | | |
|---|---|---|
| CN | 101335966 A | 12/2008 |
| CN | 101500338 A | 8/2009 |
| CN | 101572576 | 11/2009 |
| CN | 101621842 | 1/2010 |
| JP | 2013-538484 | 10/2003 |
| WO | 2012/007837 A1 | 1/2012 |

OTHER PUBLICATIONS

Chinese Notice of Allowance dated May 11, 2016 in corresponding Chinese Patent Application No. 201210567805.5.
PCT International Search Report dated May 2, 2013 in corresponding International Patent Application No. PCT/CN2013/071010.
"Antenna Array Calibration for TDD CoMP", Alcatel-Lucent Shanghai Bell, Alcatel-Lucent, 3GPP TSG RAN WG1 Meeting #59, Korea, Nov. 2009, 5 pp.
International Search Report, dated May 2, 2013, in corresponding International Application No. PCT/CN2013/071010 (6 pp.).
Chinese Office Action dated Oct. 27, 2015 in corresponding Chinese Patent Application No. 201210567805.5.

\* cited by examiner

JOINT CHANNEL CORRECTION METHOD, JOINT CHANNEL CORRECTION UNIT AND BASE STATION

CROSS-REFERENCE TO RELATED APPLICATIONS

This application is a continuation of International Application No. PCT/CN2013/071010, filed on Jan. 26, 2013, which claims priority to Chinese Patent Application No. 201210176621.6, filed on May 31, 2012, and Chinese Patent Application No. 201210567805.5, filed on Dec. 24, 2012, all of which are hereby incorporated by reference in their entireties.

TECHNICAL FIELD

The present invention relates to the field of wireless communications technologies, and in particular, to a joint channel correction method, a joint channel correction unit and a base station.

BACKGROUND

In a wireless mobile cellular communications system, a cell edge user suffers very strong co-channel interference from a neighboring cell. Therefore, a multi-cell coordinated communications technology may be adopted to mitigate the co-channel interference.

The principle of the multi-cell coordinated communications technology is: multiple base stations (cells) communicate in a coordinated manner and serve one or more users simultaneously on a same time-frequency resource block.

At present, a base station mostly includes BBU (baseband unit)+RRU (remote radio unit). One BBU may support one or more RRUs. One RRU generally manages one cell. Therefore, the base station including BBU+RRU may manage one cell, or may manage more than one cell. Certainly, it may be considered logically that different cells are managed by different logical base stations.

Because multiple logical base stations work simultaneously in a coordinated manner on the same time-frequency resource block, joint channel correction needs to be performed on the multiple logical base stations (that is, multiple RRUs) involved in the multi-cell coordinated communications. At present, technologies for receive channel self-correction and transmit channel self-correction of a single base station (that is, a single RRU) are already mature. However, joint channel correction among multiple cells is still in research now.

SUMMARY

Embodiments of the present invention provide a joint channel correction method, a joint channel correction unit and a base station, so as to implement joint channel correction among multiple cells.

In order to achieve the foregoing objective, the embodiments of the present invention provide the following technical solutions:

A first aspect of the present invention provides a joint channel correction method for joint channel correction between base stations in a base station set, where the base station set includes at least two base stations, and at least one base station in the base station set is connected to a joint channel correction unit, so that all base stations in the base station set share a common reference transmit end and a common reference receive end; and the method includes:

sending, by the common reference transmit end, an uplink correction signal to each base station in the base station set, where the uplink correction signal is used to calculate an uplink channel estimation value of each base station;

receiving, by the common reference receive end, a downlink correction signal sent by each base station in the base station set, where the downlink correction signal is used to calculate a downlink channel estimation value of each base station; and completing channel self-correction of each base station according to the uplink channel estimation value and the downlink channel estimation value of each base station.

Another aspect of the present invention provides a joint channel correction unit connected to at least one base station in a base station set, where:

the joint channel correction unit includes a first combiner and a second combiner; a combining end of the first combiner is connected to a combining end of the second combiner; a dividing end of the first combiner is connected to a first self-correction channel interface of at least one base station in the base station set; and different dividing ends of the second combiner are separately connected to second self-correction channel interfaces of different base stations in the base station set; or the joint channel correction unit includes a second combiner, where a combining end of the second combiner is connected to a first self-correction channel interface of any base station in the base station set, and different dividing ends of the second combiner are separately connected to second self-correction channel interfaces of different base stations in the base station set.

Still another aspect of the present invention provides a joint channel correction unit connected to at least one base station in a base station set, where:

the joint channel correction unit includes a second combiner and a radio frequency cable; the radio frequency cable is separately connected to a first self-correction channel interface and a second self-correction channel interface of a base station that includes a third combiner in the base station set; a combining end of the second combiner is connected to a third self-correction channel interface of the base station that includes the third combiner, and different dividing ends of the second combiner are separately connected to second self-correction channel interfaces of other base stations in the base station set.

Still another aspect of the present invention provides a joint channel correction unit connected to at least one base station in a base station set, where the joint channel correction unit includes at least one first antenna, and each first antenna is connected to a first self-correction channel interface of one base station in the base station set.

Still another aspect of the present invention provides a joint channel correction unit connected to at least one base station in a base station set, where the joint channel correction unit includes a data cable, a seventh combiner, at least two sixth combiners and a UE simulator used as a common reference transmit end and a common reference receive end;

combining ends of the at least two sixth combiners are separately connected to different dividing ends of the seventh combiner, a radio frequency interface is disposed on the UE simulator, and a combining end of the seventh combiner is connected to the radio frequency interface; and a dividing end of each sixth combiner is connected to a first service bearer interface of one base station in the base station set;

a data transmission interface of the UE simulator of the joint channel correction unit is connected to an external communication interface of each base station in the base station set;

or, a data transmission interface of the UE simulator of the joint channel correction unit is connected to an external communication interface used as a primary communication interface unit by using a data cable, where a communication interface unit of any base station in the base station set may be used as the primary communication interface unit;

or, a data transmission interface of the UE simulator of the joint channel correction unit and an internal communication interface of each base station in the base station set are both connected to an input interface of an external interconnected calculating unit by using a data cable.

Still another aspect of the present invention provides a joint channel correction unit connected to at least one base station in a base station set, where:

the joint channel correction unit includes a dividing combiner, at least two coupling discs, and a UE simulator used as a common reference transmit end and a common reference receive end, where any one of the coupling discs has a second service bearer interface, a third service bearer interface and a second self-correction channel interface;

the second self-correction channel interfaces of the at least two coupling discs are separately connected to different dividing ends of the dividing combiner, a radio frequency interface is disposed on the UE simulator, and a combining end of the dividing combiner is connected to the radio frequency interface;

the at least two coupling discs are connected to base stations in the base station set in a one-to-one manner; and one coupling disc is connected to one base station in the following manner:

the first service bearer interface of the base station is connected to the second service bearer interface of the coupling disc, and a service antenna of the base station is connected to the third service bearer interface of the coupling disc.

Still another aspect of the present invention provides a base station that includes a remote radio unit RRU and a coupling disc, where a first self-correction channel interface and a first service bearer interface that interwork with each other are disposed on the RRU, a second self-correction channel interface and a second service bearer interface that interwork with each other are disposed on the coupling disc, and the first service bearer interface interworks with the second service bearer interface, where a first coupled circuit and a third combiner are built in, and a third self-correction channel interface is disposed on the coupling disc; a dividing end of the third combiner is connected to the second service bearer interface by using the first coupled circuit, another dividing end of the third combiner is connected to the third self-correction channel interface, and a combining end of the third combiner is connected to the second self-correction channel interface.

Still another aspect of the present invention provides a base station that includes a remote radio unit RRU and a coupling disc, where a first self-correction channel interface and a first service bearer interface that interwork with each other are disposed on the RRU, a second self-correction channel interface and a second service bearer interface that interwork with each other are disposed on the coupling disc, and the first service bearer interface interworks with the second service bearer interface, where the base station further at least includes: a first antenna connected to the first self-correction channel interface.

Still another aspect of the present invention provides a base station that includes a remote radio unit RRU and a coupling disc, where a first self-correction channel interface and a first service bearer interface that interwork with each other are disposed on the RRU, a second self-correction channel interface and a second service bearer interface that interwork with each other are disposed on the coupling disc, and the first service bearer interface interworks with the second service bearer interface, where the foregoing UE simulator and a seventh combiner are built in the coupling disc, or, the foregoing UE simulator is built in the coupling disc.

It can be known through the foregoing technical solutions that, base stations in a base station set share a common reference transmit end and a common reference receive end, and therefore, after the base stations complete channel self-correction, ratios of all transmit-receive intermediate radio frequency channel responses of the base stations are consistent on a $k^{th}$ subcarrier, thereby implementing joint channel correction between the base stations in the base station set. Therefore, according to the foregoing technical solutions, a conventional technology for single base station channel self-correction may be used to implement joint channel correction between base stations.

Still another aspect of the present invention provides a joint channel correction method for performing joint channel correction between a serving base station and a coordinated base station, where the method includes:

obtaining a beamforming BF gain value corresponding to each minimum unit, where the minimum unit includes at least one subcarrier;

estimating a residual delay $\tau$ and an initial phase $\theta_{int}$ between channels of the serving base station and the coordinated base station according to the obtained BF gain value; and calculating a joint channel receive compensation factor or a joint channel transmit compensation factor of each subcarrier of the coordinated base station according to the $\tau$ and $\theta_{int}$, so that the coordinated base station adjusts, by using the joint channel receive compensation factor or the joint channel transmit compensation factor, a ratio of a transmit-receive intermediate radio frequency channel response to be consistent with a ratio of a transmit-receive intermediate radio frequency channel response of the serving base station, thereby completing joint channel correction between the serving base station and the coordinated base station.

Still another aspect of the present invention provides a base station, including:

a BF gain value obtaining unit, configured to obtain a beamforming BF gain value corresponding to each minimum unit, where the minimum unit includes at least one subcarrier;

an estimation unit, configured to estimate a residual delay $\tau$ and an initial phase $\theta_{int}$ between channels of a serving base station and a coordinated base station according to the BF gain value obtained by the BF gain value obtaining unit; and a joint channel compensation factor calculating unit, configured to calculate a joint channel receive compensation factor or a joint channel transmit compensation factor of each subcarrier of the coordinated base station according to $\tau$ and $\theta_{int}$ estimated by the estimation unit, so that the coordinated base station adjusts, by using the joint channel receive compensation factor or the joint channel transmit compensation factor, a ratio of a transmit-receive intermediate radio frequency channel response to be consistent with a ratio of a transmit-receive intermediate radio frequency channel response of the serving base station, thereby completing joint channel correction between the serving base station and the coordinated base station.

It can be known through the foregoing technical solutions that, after τ and $θ_{int}$ are estimated, a joint channel receive compensation factor or a joint channel transmit compensation factor of each subcarrier of a coordinated base station may be calculated according to the τ and $θ_{int}$, so that the coordinated base station can adjust, by using the joint channel receive compensation factor or the joint channel transmit compensation factor, a ratio of a transmit-receive intermediate radio frequency channel response to be consistent with a ratio of a transmit-receive intermediate radio frequency channel response of a serving base station, thereby completing joint channel correction between the serving base station and the coordinated base station.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely the embodiments of the present invention, and a person of ordinary skill in the art may still derive other drawings from these accompanying drawings without creative efforts.

FIG. 8l is another schematic structural diagram of a coupling disc according to an embodiment of the present invention;

DESCRIPTION OF EMBODIMENTS

For the purpose of reference and clarity, descriptions, abbreviations or acronyms of the technical terms used in the following specification are summarized as follows:
LTE: Long Term Evolution;
SRS: Sounding Reference Signal;
CRS: Common Reference Signal;
COMP: Coordinative Multiple Point;
JT: Joint Transmission;
MRT: Maximum Ratio Transmission;
CQI: Channel Quality Index;
RRU: Remote Radio Unit;
BBU: BaseBand Unit;
UE: User Equipment or terminal;
AWGN: Additive White Gaussian Noise. The amplitude distribution of the Additive White Gaussian Noise obeys Gaussian distribution, and the power spectral density is distributed evenly;
OFDM: Orthogonal frequency-division multiplexing, Orthogonal frequency-division multiplexing;
SINR: Signal to Interference plus Noise Ratio, Signal to Interference plus Noise Ratio. The SINR is a ratio of strength of a received wanted signal to strength of a received interference signal (noise and interference);
RSRP: Reference Signal Receiving Power, Reference Signal Receiving Power;
RSRQ: Reference Signal Receiving Quality, Reference Signal Receiving Quality;
RSSI: Received Signal Strength Indicator, Received Signal Strength Indicator;
BF: Beamforming, Beam forming or Beamforming;
PAPR: Peak to Average Power Ratio, Peak to Average Power Ratio.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
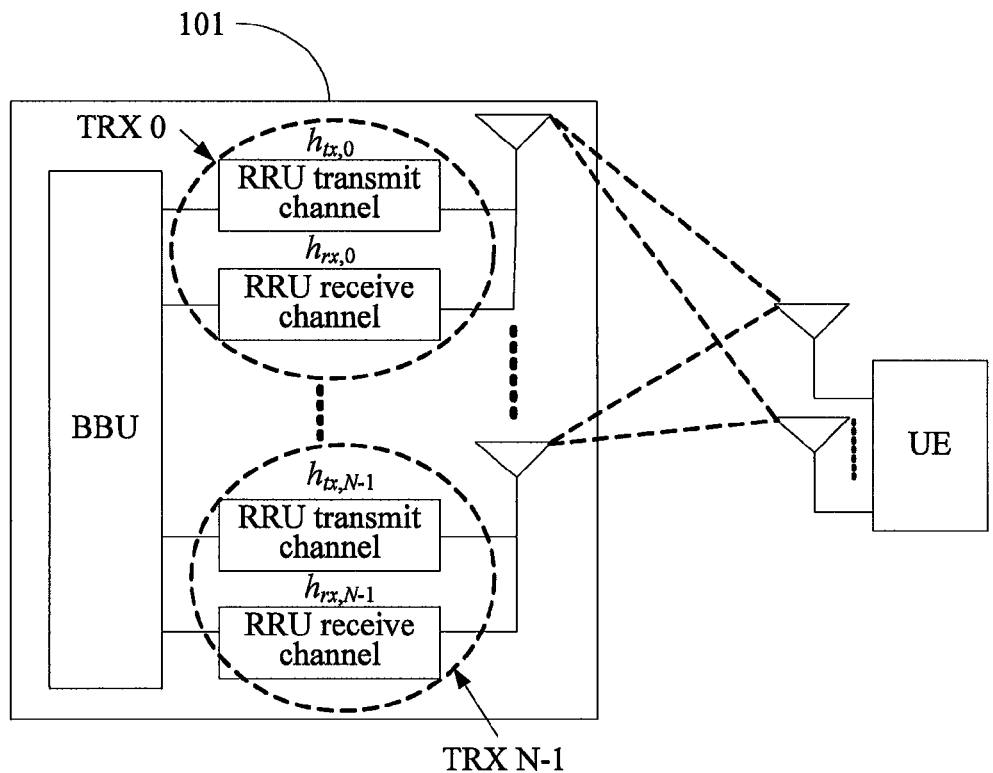
FIG. 1 is a schematic structural diagram of a base station according to an embodiment of the present invention.

Referring to FIG. 1, a base station adopts a BBU+RRU multi-channel solution (in FIG. 1, N transmit-receive channels are included, where TRX denotes a transmit-receive channel, tx denotes a transmit channel, rx denotes a receive channel, subscripts 0 to N−1 denote the sequence numbers of the channels), and one BBU can support one or more RRUs.

As mentioned above, the base station including BBU+RRU may manage one cell, or may manage more than one cell. Logically, it may be considered that different cells are managed by different logical base stations. Therefore, unless otherwise specified, the base stations hereafter in refer to logical base stations, and each of the cells hereafter in corresponds to one logical base station.

Signals are transmitted between a BBU and an RRU by using an optical cable. An RRU of an external correction type is connected to a coupling disc by using a radio frequency cable, and then connected from an outlet of the coupling disc to a service antenna by using the radio frequency cable, while an RRU of an internal correction type is directly connected to a service antenna by using a radio frequency cable. Because of non-reciprocity of transmit-receive channel responses, that is, $(h_{tx,0} \neq h_{rx,0}, \ldots, h_{tx,N-1} \neq h_{rx,N-1})$, compensation (that is, channel correction) needs to be performed on characteristics of transmit-receive intermediate radio frequency channel responses, so that $h_{tx,0} = \zeta h_{rx,0}, \ldots, h_{tx,N-1} = \zeta h_{rx,N-1}$, where $h_{tx}$ is a channel response of an intermediate radio frequency transmit channel of the base station, $h_{rx}$ is a channel response of an intermediate radio frequency receive channel of the base station, and $\zeta$ is a complex constant. It should be noted that, because inconsistency of phase-frequency characteristics of the channel responses of an intermediate radio frequency channel at a UE side has no impact on BF performance, and the inconsistency of amplitude-frequency characteristics thereof has little impact on the BF performance, the impact of the channel responses of the intermediate radio frequency channel at the UE side is ignored in processes described hereinafter.

An uplink channel response at a baseband side (that is, a BBU side) is equal to a channel response of an intermediate radio frequency receive channel of the base station multiplied by an uplink air interface channel response, that is, $H_{i,UL}(k) = H_{i,rx}(k) \cdot H_{i,UL}^{Air}(k)$, and a downlink channel response at a UE side is equal to a channel response of an intermediate radio frequency transmit channel of the base station multiplied by a downlink air interface channel response, that is, $H_{i,DL}(k) = H_{i,DL}^{Air}(k) \cdot h_{i,tx}(k)$. Subscript i denotes an $i^{th}$ channel, subscript UL denotes uplink, subscript DL denotes downlink, and superscript Air denotes an air interface. For a TDD (Time Division Duplex) system, the uplink air interface channel response is equal to the downlink air interface channel response, and therefore, after correction is performed by using a compensation factor $\beta$, it is obtained that:

$$h_{tx,0} = \zeta h_{rx,0}, \ldots, h_{tx,N-1} = \zeta h_{rx,N-1}$$

and further it is satisfied that on a $k^{th}$ subcarrier:

$$\frac{\beta_{0,UL}(k)H_{0,UL}(k)}{\beta_{0,DL}(k)H_{0,DL}(k)} = \frac{\beta_{1,UL}(k)H_{1,UL}(k)}{\beta_{1,DL}(k)H_{1,DL}(k)} = \ldots = \frac{\beta_{N,UL}(k)H_{N-1,UL}(k)}{\beta_{N,DL}(k)H_{N-1,DL}(k)} = \zeta = \lambda e^{j\theta(k)} \quad \text{(formula 1)}$$

In the formula 1, subscript i denotes an $i^{th}$ channel, where i=0, 1, . . . , N−1, $\beta_{i,UL}(k)$ denotes a receive channel compensation factor, $\beta_{i,DL}(k)$ denotes a transmit channel compensation factor, $\lambda e^{j\theta(k)}$ denotes a complex constant factor (or referred to as a residual channel response), $\lambda$ denotes amplitude, and k denotes a subcarrier number.

In addition, $\beta_{i,UL}(k)$ in the formula 1 may also be referred to as a receive channel self-correction coefficient, and $\beta_{i,DL}(k)$ may also be referred to as a transmit channel self-correction coefficient, both of which may be collectively referred to as self-correction coefficients.

If the uplink/downlink air interface channel responses are not considered (that is, when the channel is a direct connection channel), there is:

$$\frac{\beta_{0,UL}(k)H_{0,UL}(k)}{\beta_{0,DL}(k)H_{0,DL}(k)} = \frac{\beta_{1,UL}(k)H_{1,UL}(k)}{\beta_{1,DL}(k)H_{1,DL}(k)} = \ldots = \quad \text{(formula 2)}$$

$$\frac{\beta_{N-1,UL}(k)H_{N-1,UL}(k)}{\beta_{N-1,DL}(k)H_{N-1,DL}(k)} = \lambda e^{j\theta(k)} \Rightarrow$$

$$\frac{\frac{1}{h_{0,rx} \cdot h_{ctx}} h_{0,rx}}{\frac{1}{h_{0,tx} \cdot h_{crx}} h_{0,tx}} = \frac{\frac{1}{h_{1,rx} \cdot h_{ctx}} h_{1,rx}}{\frac{1}{h_{1,tx} \cdot h_{crx}} h_{1,tx}} = \ldots =$$

$$\frac{\frac{1}{h_{(N-1),rx} \cdot h_{ctx}} h_{(N-1),rx}}{\frac{1}{h_{(N-1),tx} \cdot h_{crx}} h_{(N-1),tx}} = \lambda e^{j\theta(k)} \Rightarrow$$

$$\frac{h_{crx}}{h_{ctx}} = \frac{h_{crx}}{h_{ctx}} = \ldots = \frac{h_{crx}}{h_{ctx}} = \lambda e^{j\theta(k)}$$

where $h_{crx}$ denotes a channel response of a receive channel correction reference channel, and $h_{ctx}$ denotes a channel response of a transmit channel correction reference channel.

It can be seen from the formula 2 that, the final objective of channel correction is: on a $k^{th}$ subcarrier, ratios of all transmit-receive intermediate radio frequency channel responses of the base station are the same complex constant factor.

At present, a single base station channel self-correction technology (including receive channel self-correction and transmit channel self-correction) is already mature, and the single base station channel self-correction only needs to satisfy the requirement of the formula 1.

Channel correction among multiple base stations involved in the multi-cell coordinated communications is more complex. The following uses that two base stations communicate in a coordinated manner as an example, where a 4×1 antenna is disposed on each base station.

For distinguishing purposes, in this specification, one of the two base stations is referred to as BS0, and the other is referred to as BS1 (unless otherwise specified, BS0 and BS1 are only used for distinguishing different base stations, but not intended to limit the base stations). Moreover, to shorten formula length, subcarrier numbers are omitted in some subsequent formulas in this specification. Therefore, unless otherwise specified, subsequent formulas without subcarrier numbers are the formulas in which subcarrier numbers are omitted.

It can be known from the formula 1 that, after single base station channel self-correction is performed, ratios of all transmit-receive intermediate radio frequency channel responses on the $k^{th}$ subcarrier of the base station are the same complex constant factor. Therefore, there are the following formulas 3 and 4:

$$H_{i,DL}^{BS0} = \lambda_0 e^{j\theta_0}(H_{i,UL}^{BS0})^T, i=0,1 \ldots 3 \quad \text{(formula 3)}$$

$$H_{i,DL}^{BS1} = \lambda_1 e^{j\theta_1}(H_{i,UL}^{BS1})^T, i=0,1 \ldots 3 \quad \text{(formula 4)}$$

In the formulas 3 and 4, parameters with the subscript 0 and the superscript BS0 denote each parameter corresponding to the base station BS0, parameters with the subscript 1 and the superscript BS1 denote each parameter corresponding to the base station BS1, and for definitions of other subscripts, reference may be made to the definitions of the same subscripts in the forgoing formulas, which are not repeated again herein.

Again it is known that, weights (MRT weights) obtained by BS0 and BS1 by using an uplink channel separately are:

$$w_0 = ((h_{UL}^{BS0})^T)^H / \|h_{UL}^{BS0}\|_F \quad \text{(formula 5)}$$

$$w_1 = ((h_{UL}^{BS1})^T)^H / \|h_{UL}^{BS1}\|_F \quad \text{(formula 6)}$$

where $(\bullet)^T$ denotes transpose, $(\bullet)^H$ denotes conjugate transpose, and $h_{UL}^{BS0}$ in the formula 5 may be denoted as follows:

$$h_{UL}^{BS0} = \begin{bmatrix} H_{0,UL}^{BS0} \\ H_{1,UL}^{BS0} \\ H_{2,UL}^{BS0} \\ H_{3,UL}^{BS0} \end{bmatrix}.$$

Likewise, $h_{UL}^{BS0}$ in the formula 6 may be analogized.

Assuming that BS0 and BS1 each use the foregoing corresponding weight to weight a same signal and then send the signal, a signal r received by the UE is:

$$r = h_{DL}^{BS0} w_0 s_0 + h_{DL}^{BS1} w_1 s_1 + n \quad \text{(formula 7)}$$

$$= \lambda_0 e^{j\theta_0} (h_{UL}^{BS0})^T ((h_{UL}^{BS0})^T)^H / \|h_{UL}^{BS0}\|_F s_0 +$$

$$\lambda_1 e^{j\theta_1} (h_{UL}^{BS1})^T ((h_{UL}^{BS1})^T)^H / \|h_{UL}^{BS1}\|_F s_0 + n$$

$$= \lambda_0 e^{j\theta_0} \|h_{UL}^{BS0}\|_F s_0 + \lambda_1 e^{j\theta_1} \|h_{UL}^{BS1}\|_F s_0 + n$$

$$= \lambda_0 e^{j\theta_0} \cdot \left( \|h_{UL}^{BS0}\|_F + \frac{\lambda_1}{\lambda_0} e^{j(\theta_1 - \theta_0)} \|h_{UL}^{BS1}\|_F \right) s_0 + n$$

It can be seen from the formula 7 that, on the $k^{th}$ subcarrier, because $\lambda_0 e^{j\theta_0} \neq \lambda_1 e^{j\theta_1}$ (that is, $\lambda_0 e^{j\theta_0(k)} \neq \lambda_1 e^{j\theta_1(k)}$), after the same signal is weighted and sent by BS0 and BS1, coherent superposition cannot be ensured at the UE side.

Figure 2:
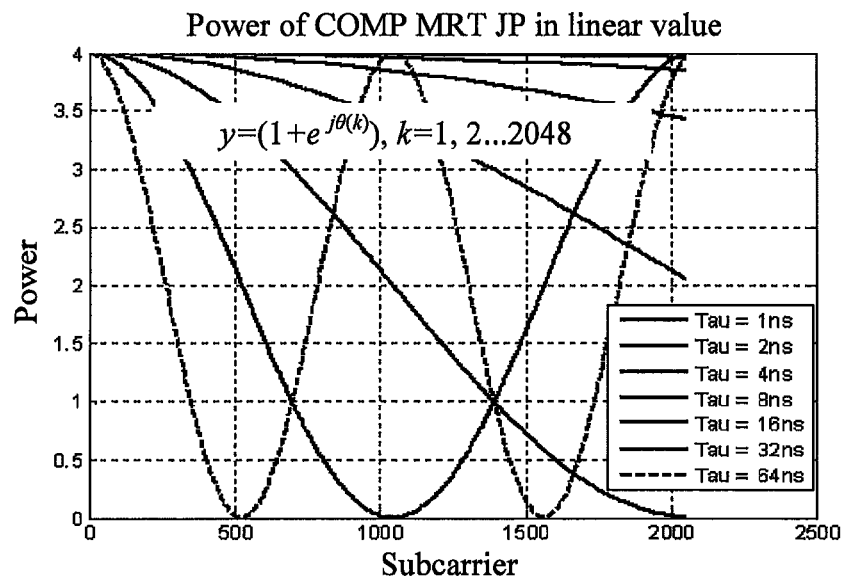
FIG. 2 shows a coordinated transmission situation in which a delay difference exists between two base stations under AWGN according to an embodiment of the present invention.

By using an OFDM system, a Gaussian channel, $\lambda_0 = \lambda_1 = 1$, and $\theta_0(k) = 0$ as an example, referring to FIG. 2 (in FIG. 2, Tau denotes a delay, that is, compared with BS0, BS1 has one common delay difference Tau, which is embodied as a linear phase in a frequency domain), it can be seen that, because $\theta_0(k) \neq \theta_1(k)$, it cannot be ensured that an array gain brought about by the coherent superposition is obtained on each subcarrier, and even a signal cancellation effect will be further brought about, thereby reducing the system performance.

Therefore, to ensure that the two base stations perform coherent transmission in a coordinated manner, the consistency of residual channel responses after the single base station channel self-correction needs to be further ensured, so that $\lambda_0 e^{j\theta_0(k)} = \lambda_1 e^{j\theta_1(k)}$, so as to implement coherent superposition at the UE side, thereby implementing joint channel correction between the base stations.

In view of this, this embodiment provides a joint channel correction method to implement joint channel correction between base stations in a base station set.

The method provided by this embodiment is based on a joint channel correction unit, where the joint channel correction unit is connected to at least one base station in the base station set, so that all base stations in the base station set share a common reference transmit end and a common reference receive end.

Figure 3:
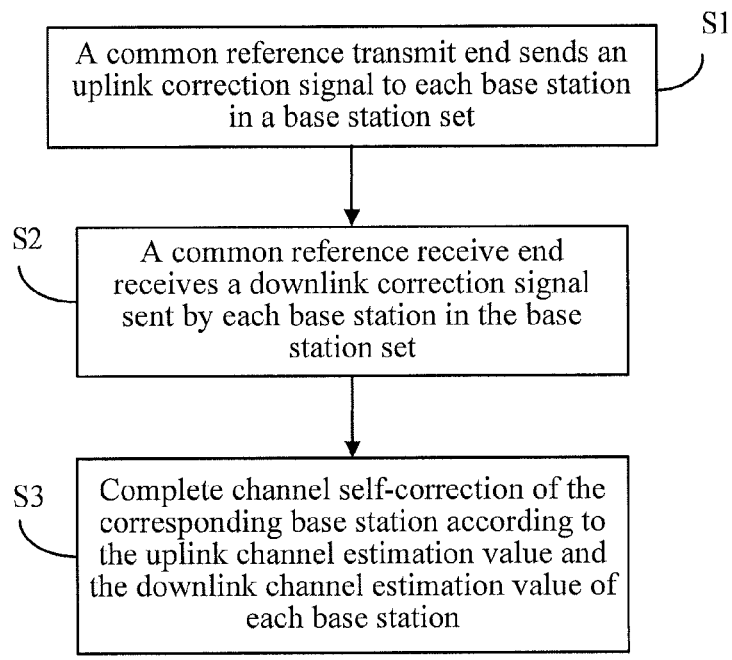
FIG. 3 is a flowchart of a joint channel correction method according to an embodiment of the present invention.

The method provided by this embodiment simulates uplink and downlink communication between each base station and an ordinary UE. Referring to FIG. 3, the method includes at least the following steps:

S1: The common reference transmit end sends an uplink correction signal to each base station in the base station set.

S2: The common reference receive end receives a downlink correction signal sent by each base station in the base station set.

It should be noted that, the steps S1 and S2 are interchangeable. In the step S1, the common reference transmit end is used to simulate the ordinary UE, where the UE sends the uplink correction signal to each base station in the base station set, so as to obtain an uplink channel estimation value on each receive channel of each base station, that is, an estimation value of the uplink channel response $H_{i,UL}(k)$ at the baseband side.

In the step S2, the common reference receive end is used to simulate the ordinary UE, where each base station in the base station set send the downlink correction signal to the ordinary UE, so as to obtain a downlink channel estimation value on each transmit channel of each base station, that is, an estimation value corresponding to the downlink channel response $H_{i,DL}(k)$ at the baseband side.

S3: Complete channel self-correction of the base station according to the uplink channel estimation value and the downlink channel estimation value of each base station.

In the step S3, when a certain base station obtains an uplink channel estimation value and a downlink channel estimation value that belong to the base station, channel self-correction may be performed according to an existing channel self-correction algorithm.

That the base station set includes two base stations BS0 and BS1 is used as an example. After the foregoing steps S1 to S3 are completed, on the $k^{th}$ subcarrier, ratios of all transmit-receive intermediate radio frequency channel response of BS0 are $\lambda_0 e^{j\theta_0(k)}$, and ratios of all transmit-receive intermediate radio frequency channel responses of BS1 are $\lambda_1 e^{j\theta_1(k)}$. Because BS0 and BS1 share the common reference transmit end and the common reference receive end, there is $\lambda_0 e^{j\theta_0(k)} = \lambda_1 e^{j\theta_1(k)}$, thereby implementing joint channel correction between BS0 and BS1. The principle of joint channel correction among three and more than three base stations is similar thereto, which is not repeated again herein. Therefore, it can be seen that, according to the method provided by this embodiment, joint channel correction between base stations can be implemented by using the existing single base station channel self-correction technology.

The RRUs are classified into an external correction type and an internal correction type, and therefore correspondingly, the base stations are also classified into an external correction type and an internal correction type. The following embodiments of the present invention separately describe joint channel correction between base stations of the external correction type and that between base stations of the internal correction type in detail.

1: External Correction Type

For ease of understanding, the following describes the conventional channel self-correction on a single base station of the external correction type first.

Figure 4:
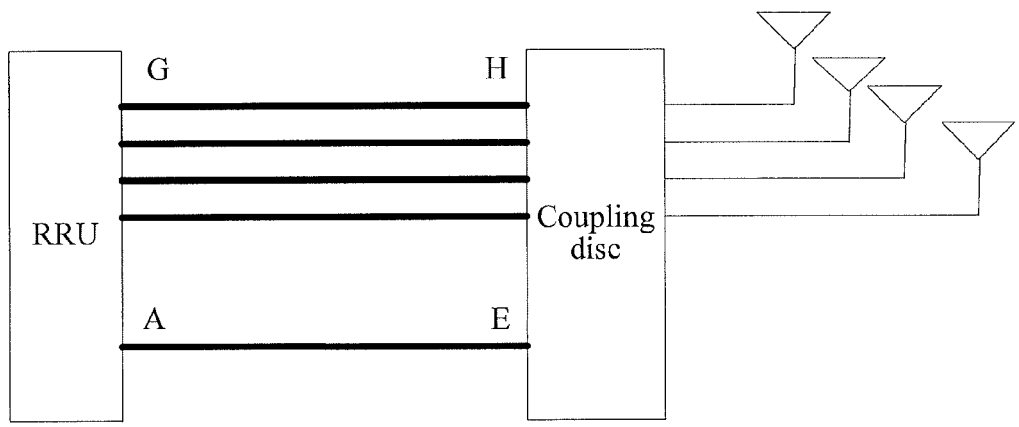
FIG. 4 is a schematic structural diagram of an existing base station of an external correction type according to an embodiment of the present invention.

A base station of the external correction type generally includes a BBU, an RRU, a coupling disc and a service antenna. Referring to FIG. 4 in which 4 antennas are used as an example, a first self-correction channel interface A and a first service bearer interface G that interwork with each other are disposed on the RRU, a second self-correction channel interface E and a second service bearer interface H that interwork with each other are disposed on the coupling disc, and the first service bearer interface G interworks with the second service bearer interface H.

It should be noted that, because 4 antennas are used as an example, the first service bearer interface G includes 4 radio frequency cable ports, and likewise, the second service bearer interface H also includes 4 radio frequency cable ports. If the number of service antennas is X, the first service bearer interface G and the second service bearer interface H include X radio frequency cable ports each, which is not repeated hereinafter in the present invention.

When channel self-correction is performed on the existing single base station, the first self-correction channel interface A and the second self-correction channel interface E are connected by using a radio frequency cable, and the detailed procedure is as follows:

Step (1): Send a "transmit channel correction signal" (that is, the downlink correction signal) from the first service bearer interface G over multiple channels, and the transmit channel correction signal reaches A in a transmission path of G→H→E→A. The BBU calculates a downlink channel estimation value according to the transmit channel correction signal received at A, and calculates a transmit channel self-correction coefficient according to the downlink channel estimation value.

It should be noted that, the first service bearer interface G actually includes X radio frequency cable ports, and the X radio frequency cable ports communicate with X service antennas over the second service bearer interface H, so that the process of sending a transmit channel correction signal from the first service bearer interface G over multiple channels, in which the transmit channel correction signal reaches A in the transmission path of G→H→E→A simulates a downlink communication process in which a downlink service signal is sent from the X service antennas of the base station to an ordinary UE.

Specifically, the foregoing transmit channel correction signal may be based on a customized low PAPR signal sequence, and may be transmitted in a time division form, a frequency division form or a code division form.

A and E interwork with each other over a direct channel, and uplink and downlink air interface channel responses do not need to be considered, so that an estimation value $h_{i,DL}(k)$ of a channel response of an $i^{th}$ intermediate radio frequency transmit channel (including a channel response of a correction reference channel) of a single base station may be obtained by performing step (1), and then a transmit channel self-correction coefficient $\beta_{i,DL}(k)$ may be calculated according to the $h_{i,DL}(k)$.

The specific formula for calculating the $\beta_{i,DL}(k)$ may be:

$$\beta_{i,DL}(k) = \frac{1}{h_{i,DL}(k)}.$$

Certainly, a relative correction calculation formula may also be used. For example, the channel response of the first intermediate radio frequency transmit channel is used as a reference to enable $\beta_{1,DL}(k)=1$, and then a transmit channel self-correction coefficient is calculated by using $$\beta_{i,DL}(k) = \frac{h_{1,DL}(k)}{h_{i,DL}(k)}.$$

Alternatively, a channel response of a second intermediate radio frequency transmit channel or another intermediate radio frequency transmit channel may also be used as a reference, which is not repeated again herein.

Step (2): Send a "receive channel correction signal" (that is, the uplink correction signal) from A. The receive channel correction signal reaches G in a transmission path of A→E→H→G. The BBU calculates an uplink channel estimation value according to the receive channel correction signal received at G, and calculates a receive channel self-correction coefficient according to the uplink channel estimation value.

It should be noted that, the process of sending a "receive channel correction signal" from A, in which the receive channel correction signal reaches G in a transmission path of A→E→H→G simulates an uplink communication process in which an uplink signal sent by an ordinary UE is received by X service antennas of the base station. A channel response $h_{i,UL}(k)$ of the $i^{th}$ intermediate radio frequency receive channel of the single base station may be obtained by performing step (2), and then a receive channel self-correction coefficient $\beta_{i,UL}(k)$ may be calculated according to the $h_{i,UL}(k)$. A specific formula for calculating the $\beta_{i,UL}(k)$ is the same as that for $\beta_{i,DL}(k)$ which is not repeated again herein.

Step (3): Perform channel self-correction on the single base station according to the self-correction coefficient.

When the channel self-correction is performed on the single base station, receive channel self-correction and transmit channel self-correction may be performed separately or simultaneously on the single base station.

If the receive channel self-correction and the transmit channel self-correction are performed separately, the following operations may be performed:

The receive channel self-correction on the single base station is as follows: After an uplink channel response $H_{i,UL}(k)$ at a baseband side is obtained by performing channel estimation according to an uplink SRS signal (noted that here, the $H_{i,UL}(k)$ obtained according to the uplink SRS signal includes a channel response of an air interface and a channel response of an intermediate radio frequency receive channel), the $\beta_{i,UL}(k)$ is used to compensate (that is, to be multiplied by) the $H_{i,UL}(k)$ to obtain $H_{i,UL}(k)'$, so as to complete the receive channel self-correction on the single base station. Further, a downlink BF weight may be calculated by using the $H_{i,UL}(k)'$.

Alternatively, compensation of the receive channel self-correction on the single base station may also be performed on a received uplink transmit signal at the baseband side, that is, an uplink receive frequency domain signal $r_{i,UL}(k)$ at the baseband side is multiplied by the $\beta_{i,UL}(k)$.

The transmit channel self-correction on the single base station is as follows: Perform compensation of transmit channel self-correction on a downlink transmit frequency domain signal at the baseband side, that is, a downlink transmit frequency domain signal $s_{i,UL}(k)$ is multiplied by the $\beta_{i,DL}(k)$ at the baseband side.

If the receive channel self-correction and the transmit channel self-correction are performed on the single base station simultaneously, the following operations may be performed:

performing compensation of transmit-receive channel self-correction on the received uplink transmit signal at the baseband side, that is, multiplying the uplink receive frequency domain signal $r_{i,UL}(k)$ by $$\frac{\beta_{i,UL}(k)}{\beta_{i,DL}(k)},$$

or after $H_{i,UL}(k)$ is obtained through estimation according to the uplink SRS signal, directly multiplying the $H_{i,UL}(k)$ by $$\frac{\beta_{i,UL}(k)}{\beta_{i,DL}(k)};$$

or, performing compensation of transmit-receive channel self-correction on the downlink transmit frequency domain signal at the baseband side, that is, multiplying the downlink transmit frequency domain signal $s_{i,DL}(k)$ by $$\frac{\beta_{i,DL}(k)}{\beta_{i,UL}(k)}.$$

The channel self-correction performed by each base station in the step S3 is equivalent to the channel self-correction performed by the single base station.

Figure 5A:
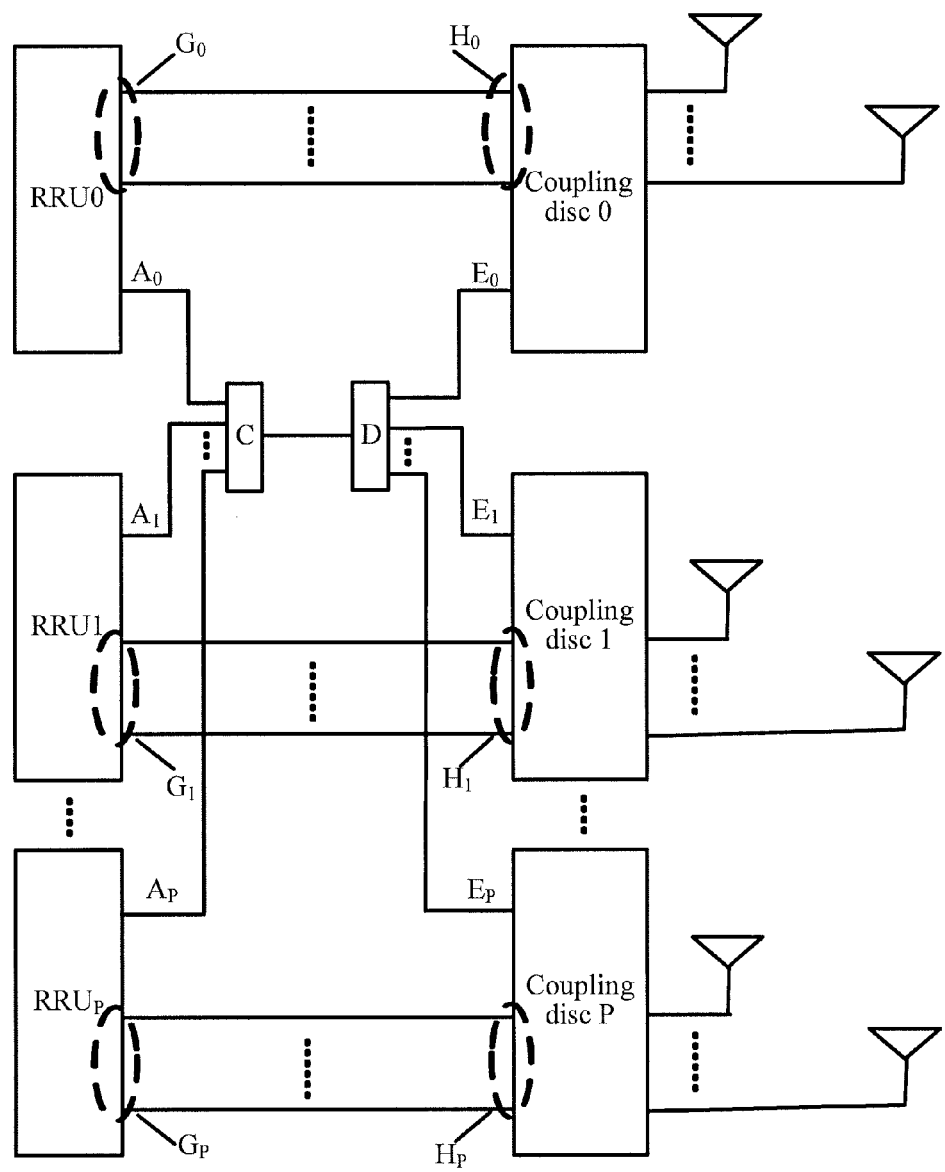
FIG. 5a is a schematic diagram of a connection relationship between a base station of an external correction type and a joint channel correction unit according to an embodiment of the present invention.

With respect to the existing base station of the external correction type, in order to implement joint channel correction without changing its structure, referring to FIG. 5a, in some embodiments of the present invention, the foregoing joint channel correction unit may include a first combiner C and a second combiner D (structures of the first combiner C and the second combiner D may be the same or different), and a combining end of the first combiner C is connected to a combining end of the second combiner D.

A base station set in FIG. 5a includes BS0 to $BS_N$, totally N+1 (N is a positive integer) base stations. For the purpose of distinction, an RRU and a coupling disc included in a $P^{th}$ base station $BS_P$ (P=0, 1, . . . , N) are denoted by $RRU_P$ and coupling disc P respectively, a first self-correction channel interface of $BS_P$ is denoted by $A_P$, a first service bearer interface of $BS_P$ is denoted by $G_P$, a second self-correction channel interface of $BS_P$ is denoted by $E_P$, and a second service bearer interface of $BS_P$ is denoted by $H_P$.

Because the number of dividing ends of one combiner is limited, when there is a large number of base stations, interconnection between N+1 base stations may be implemented by cascading multiple combiners. Therefore, in some cases, multiple small combiners are cascaded to form the first combiner C and the second combiner D.

Based on the structure shown in FIG. 5a, the foregoing connection manner of at least one base station in the base station set and a joint channel correction unit may specifically include that:

each first self-correction channel interface is separately connected to different dividing ends of the first combiner C; and each second self-correction channel interface is separately connected to different dividing ends of the second combiner D.

In FIG. 5a, any first self-correction channel interface connected to the first combiner C may be used as a common reference transmit end or a common reference receive end, or both a common reference transmit end and a common reference receive end. For example, a first self-correction channel interface $A_0$ may be selected as the common reference transmit end, and a first self-correction channel interface $A_P$ may be selected as the common reference receive end; or the first self-correction channel interface $A_0$ may also be selected as both the common reference transmit end and the common reference receive end.

For the purpose of convenience, the first self-correction channel interface $A_0$ is selected as the common reference transmit end and the common reference receive end in the embodiments hereinafter. Correspondingly, the foregoing step S1 may specifically include:

Sending receive channel correction signals to each first service bearer interface over the first self-correction channel interface $A_0$.

Specifically, for BS0, the receive channel correction signal is sent from the first self-correction channel interface $A_0$, transmitted in a path of $A_0 \rightarrow C \rightarrow D \rightarrow E_0 \rightarrow H_0 \rightarrow G_0$, and received from the first service bearer interface $G_0$.

For BS1, the receive channel correction signal is transmitted in a path of $A_0 \rightarrow C \rightarrow D \rightarrow E_1 \rightarrow H_1 \rightarrow G_1$ and received from the first service bearer interface $G_1$.

As deduced by analogy, for $BS_P$, the receive channel correction signal is transmitted in a path of $A_0 \rightarrow C \rightarrow D \rightarrow E_P \rightarrow H_P \rightarrow G_P$ and received from the first service bearer interface G.

Likewise, the foregoing step S2 may specifically include:

receiving, by the first self-correction channel interface $A_0$, a transmit channel correction signal sent by each first service bearer interface.

Specifically, for BS0, the transmit channel correction signal is sent from the first service bearer interface $G_0$, transmitted in a path of $G_0 \rightarrow H_0 \rightarrow E_0 \rightarrow D \rightarrow C \rightarrow A_0$, and received from the first self-correction channel interface $A_0$.

For BS1, the transmit channel correction signal is sent from the first service bearer interface $G_1$, transmitted in a path of $G_1 \rightarrow H_1 \rightarrow E_1 \rightarrow D \rightarrow C \rightarrow A_0$, and received from the first self-correction channel interface $A_0$.

As deduced by analogy, for $BS_P$, the transmit channel correction signal is sent from the first service bearer interface $G_P$, transmitted in a path of $G_P \rightarrow H_P \rightarrow E_P \rightarrow D \rightarrow C \rightarrow A_0$, and received from the first self-correction channel interface $A_0$.

It can be known from the specific transmission paths that, if the first self-correction channel interface $A_0$ of BS0 is selected as both the common reference transmit end and the common reference receive end, the first self-correction channel interfaces ($A_1$ to $A_N$) of other base stations will not be used. Therefore, the first combiner C in FIG. 5a may use only one dividing end to connect to the first self-correction channel interface $A_0$.

Figure 5B:
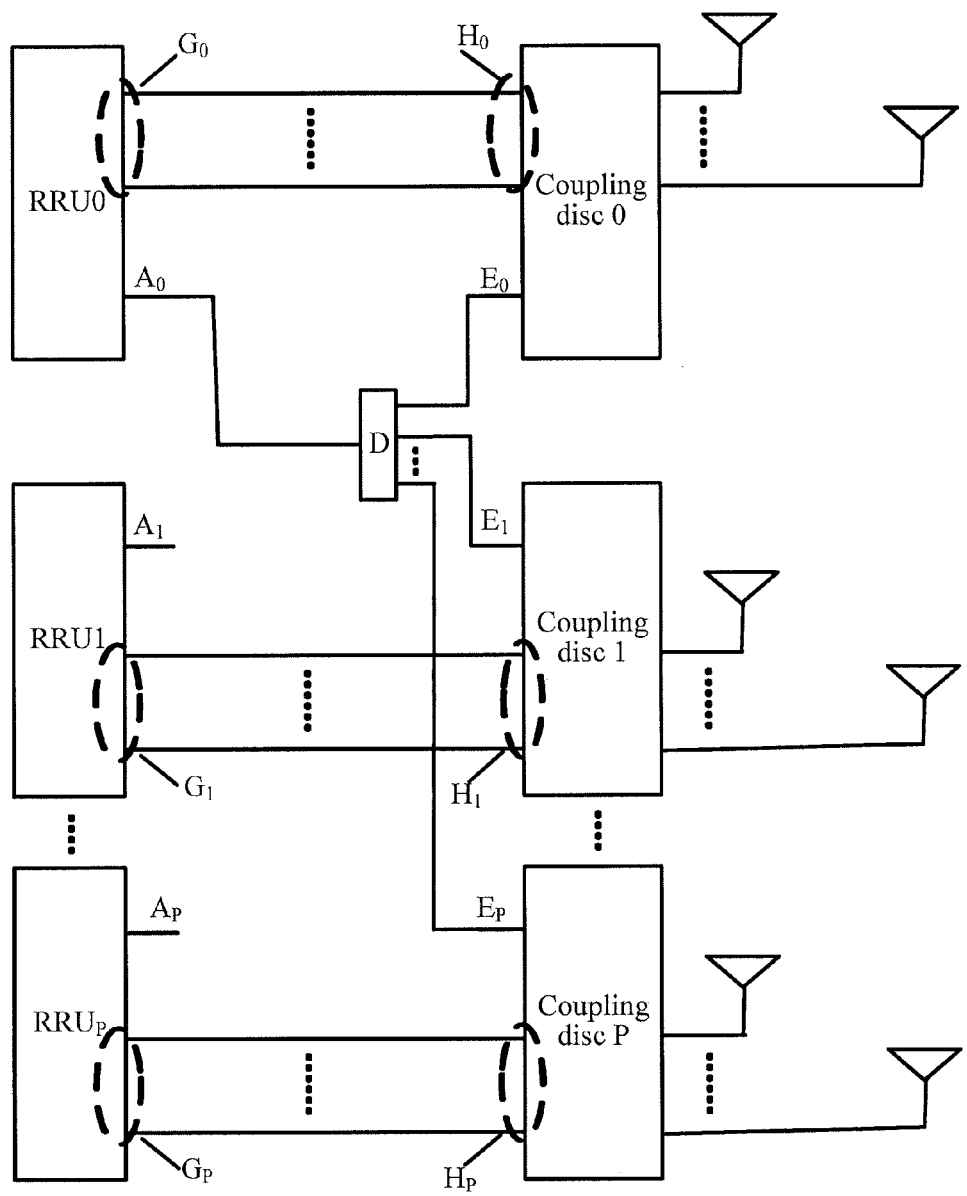
FIG. 5b is a schematic diagram of another connection relationship between a base station of an external correction type and a joint channel correction unit according to an embodiment of the present invention.

Alternatively, referring to FIG. 5b, the joint channel correction unit may only include the second combiner D.

Correspondingly, the foregoing connection manner of "at least one base station in the base station set and a joint channel correction unit" may specifically include that:

a combining end of the second combiner D is connected to the first self-correction channel interface ($A_0$) used as both the common reference transmit end and the common reference receive end; and a dividing end of the second combiner D is connected to each second self-correction channel interface.

In FIG. 5a to FIG. 5b, the same common reference receive end (the first self-correction channel interface $A_0$) is used to receive the transmit channel correction signal, therefore, each base station needs to be equipped with an internal communication interface to communicate with another base station. In this way, BS0 may transfer channel self-correction related information of the another base station to a corresponding base station over the internal communication interface, so that the another base station completes channel self-correction.

Specifically, the channel self-correction related information may be a transmit channel correction signal that is received by the first self-correction channel interface $A_0$ and sent from a first service bearer interface of another base station.

Alternatively, BS0 may also calculate a subcarrier-level transmit channel self-correction coefficient of $BS_1$ to $BS_N$ separately according to a transmit channel correction signal that is received by $A_0$ and sent from a first service bearer interface of another base station. Therefore, the foregoing channel self-correction related information may also be a subcarrier-level transmit channel self-correction coefficient of the another base station.

In addition, the phase of the subcarrier-level transmit channel self-correction coefficient is generally linear in a frequency domain, and the subcarrier-level transmit channel self-correction coefficient may be obtained through deduction by using the delay and the initial phase. Therefore, the foregoing channel self-correction related information may also be delay information and initial phase information of the another base station.

In some cases (for example, in a co-site case), BBUs of base stations may be integrated on one BBU board. In this case, the BBUs of the base stations may communicate with each other over an internal private communication interface (that is, a manufacturer customized internal interface) to transfer the foregoing channel self-correction related information.

Certainly, besides the private communication interface, the base stations may also communicate with each other over an X2 interface to transfer the foregoing channel self-correction related information. Therefore, the foregoing internal communication interface may specifically include at least one of the internal private communication interface and the X2 interface.

For details about how to calculate a transmit channel self-correction coefficient according to a transmit channel correction signal, how to calculate a receive channel self-correction coefficient according to a receive channel correction signal, and how to perform channel self-correction according to a self-correction coefficient, reference may be made to the specific procedure in the foregoing single base station channel self-correction, which is not repeated again herein.

After the base stations (BS0 to $BS_N$) shown in FIG. 5a to FIG. 5b complete the channel self-correction, ratios of all transmit-receive intermediate radio frequency channel responses are $\lambda_0 e^{j\Theta_0(k)}$ to $\lambda_N e^{j\Theta_N(k)}$ on the $k^{th}$ subcarrier separately. Because BS0 to $BS_N$ all use $A_0$ as a common reference transmit end (start point) to send receive channel correction signals, and use $A_0$ as a common reference receive end (an end point) to receive transmit channel correction signals, there is $\lambda_0 e^{j\Theta_0(k)} = \lambda_1 e^{j\Theta_1(k)} =, \ldots, \lambda_p e^{j\Theta_p(k)} =, \ldots, = \lambda_N e^{j\Theta_N(k)}$, thereby implementing joint channel correction among the base stations BS0 to $BS_N$.

In addition, in other embodiments of the present invention, a combiner may also be built in a coupling disc. For example, referring to FIG. 6a and FIG. 6b, a third combiner 601 and a first coupled circuit 603 are built in a coupling disc 0, and a fourth combiner 602 and a second coupled circuit 604 may be built in another coupling disc (a coupling disc$_P$ is used as an example). In addition, a third self-correction channel interface may be disposed on each coupling disc. For distinguishing purposes, $S_0$ to $S_N$ denote third self-correction channel interfaces on each coupling discs separately, and other names in FIG. 5a are retained, where:

a combining end of the third combiner 601 is connected to a second self-correction channel interface $E_0$, one dividing end of the third combiner 601 is connected to a second service bearer interface $H_0$ by using the first coupled circuit 603, and the other dividing end is connected to the third self-correction channel interface $S_0$; and a combining end of the fourth combiner 602 is connected to a second service bearer interface $H_P$ by using the second coupled circuit 604, and two dividing ends of the fourth combiner 602 are connected to a second self-correction channel interface $E_P$ and the third self-correction channel interface $S_P$ separately.

In this embodiment, a joint channel correction unit may include a radio frequency cable and a second combiner D (certainly, if a base station set includes only two base stations, the second combiner D may not be used).

Correspondingly, the foregoing connection manner of "at least one base station in the base station set and a joint channel correction unit" may specifically include that:

a first self-correction channel interface $A_0$ used as a common reference transmit end and a common reference receive end communicates with a second self-correction channel interface $E_0$ by using the radio frequency cable; and a combining end of a second combiner D is connected to a third self-correction channel interface $S_0$, and dividing ends of the second combiner are separately connected to other third self-correction channel interfaces (when there are only two base stations, or paired base station joint correction is adopted, the third self-correction channel interface $S_0$ may be connected to a third self-correction channel interface of the other base station by using the radio frequency cable.

Figure 6A:
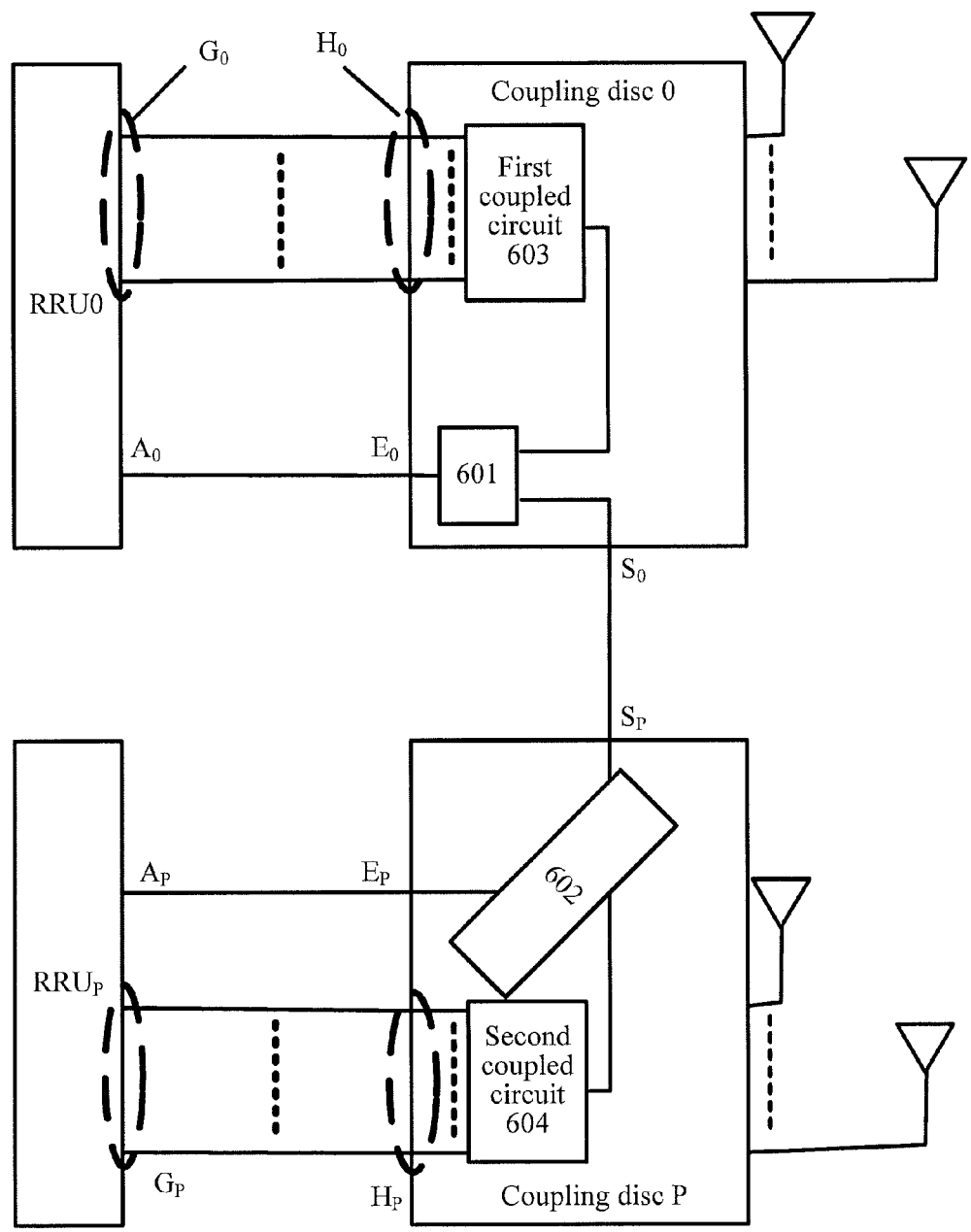
FIG. 6a and FIG. 6b are still another schematic diagram of a connection relationship between a base station of an external correction type and a joint channel correction unit according to an embodiment of the present invention.
Figure 6B:
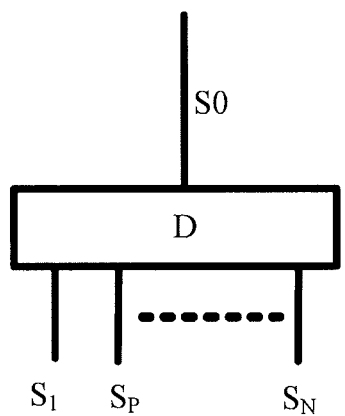
Figure 6C:
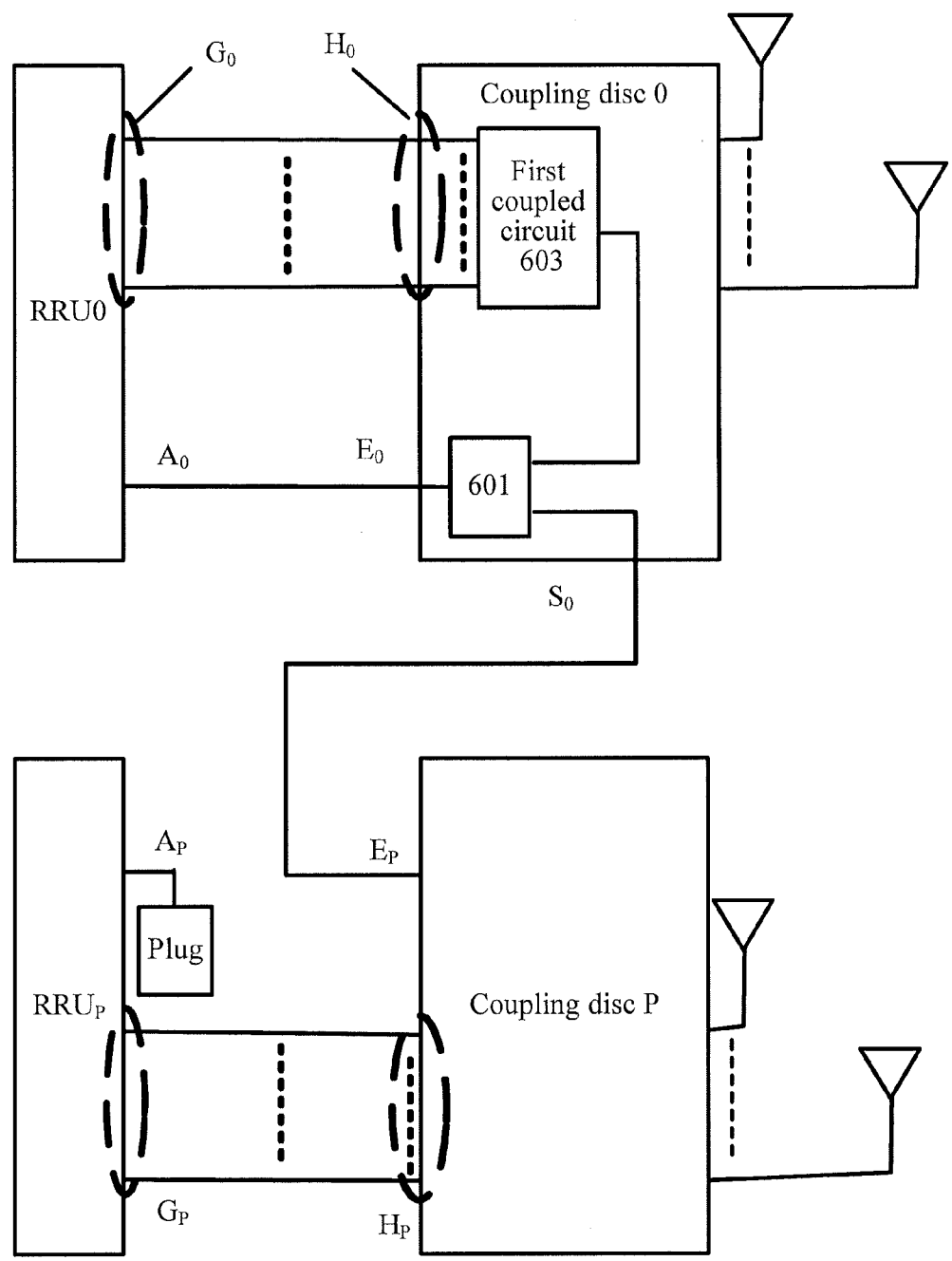
FIG. 6c is a schematic diagram of still another connection relationship between a base station of an external correction type and a joint channel correction unit according to an embodiment of the present invention.

In addition, referring to FIG. 6c, the third self-correction channel interface $S_0$ may also interwork (by using the second combiner D) with a second self-correction channel interface of another existing coupling disc that does not have the fourth combiner 602 built in.

After the joint channel correction unit is used for connecting to the base stations, the step S1 may specifically include:

sending, by the first self-correction channel interface $A_0$, a receive channel correction signal to each first service bearer interface.

Specifically, for BS0, the "receive channel correction signal" is sent from the first self-correction channel interface $A_0$, transmitted in a path of $A_0 \to E_0 \to 601 \to 603 \to H_0 \to G_0$, and received by the first service bearer interface $G_0$.

As deduced by analogy, for $BS_p$, a "receive channel correction signal" is transmitted in a path of $A_0 \to E_0 \to 601 \to 602 \to 604 \to H_P \to G_P$ and received by the first service bearer interface G.

Correspondingly, the step S2 may specifically include:

receiving, by the first self-correction channel interface $A_0$, a "transmit channel correction signal" sent by each first service bearer interface.

Specifically, for BS0, the transmit channel correction signal is sent from the first service bearer interface $G_0$, transmitted in a path of $G_0 \to H_0 \to 603 \to 601 \to E_0 \to A_0$, and received by the first self-correction channel interface $A_0$.

As deduced by analogy, for $BS_p$, the transmit channel correction signal is sent from the first service bearer interface $G_P$, transmitted in a path of $G_P \to H_P \to 604 \to 602 \to E_0 \to A_0$, and received by the first self-correction channel interface $A_0$.

Figure 6D:
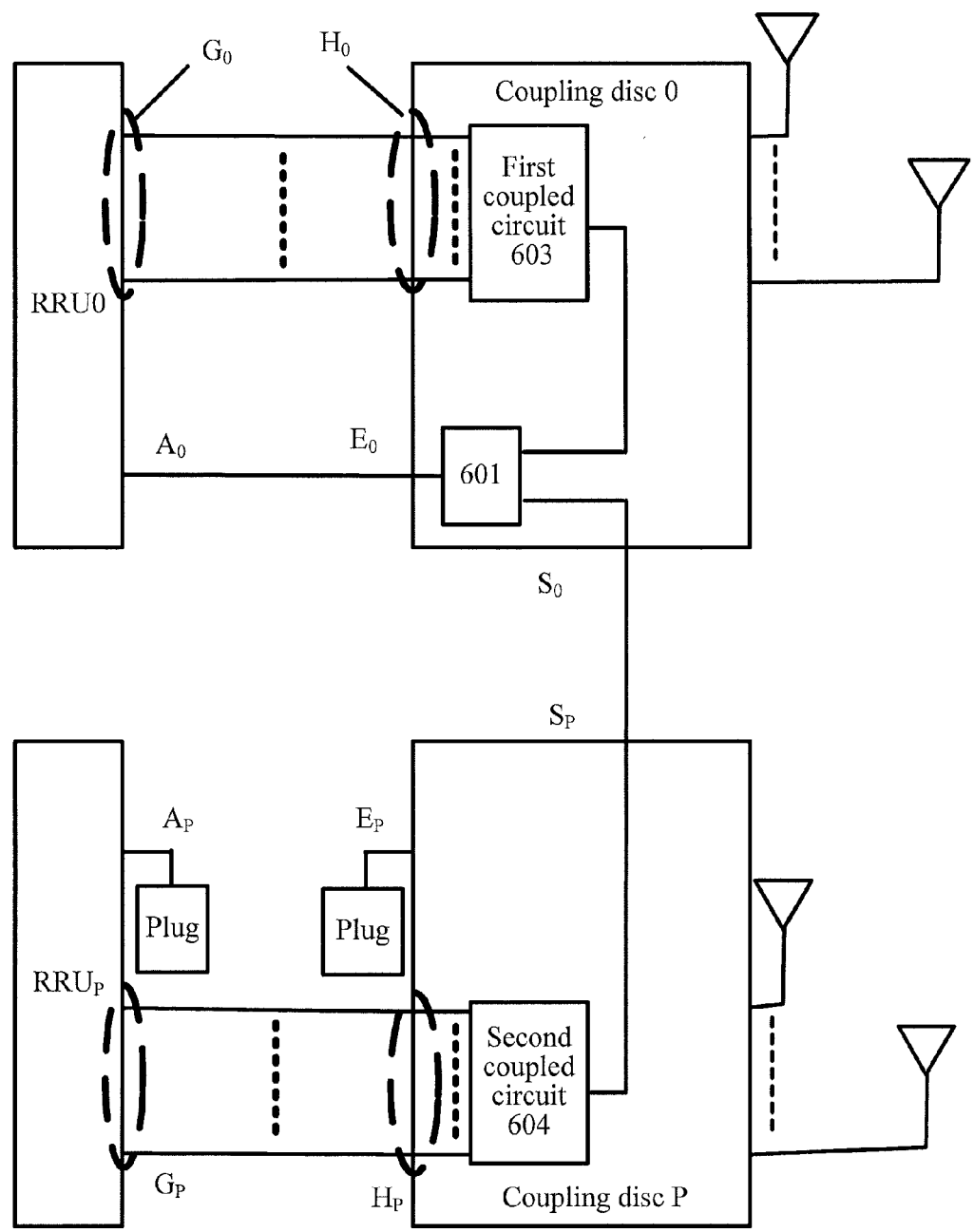
FIG. 6d is a schematic diagram of still another connection relationship between a base station of an external correction type and a joint channel correction unit according to an embodiment of the present invention.

Because neither $A_P$ nor $E_P$ is used in FIG. 6a, the dividing end of the fourth combiner 602 may also not be connected to the second self-correction channel interface $E_P$. In addition, in other embodiments of the present invention, referring to FIG. 6d, coupling discs of BS1 to $BS_p$ in FIG. 6a may also not include the fourth combiner 602 but reserve the third self-correction channel interface, and a plug may be used to block $A_P$ and $E_P$, which is not in use (interfaces that are not in use in other embodiments of the present invention may also be blocked by using a plug, which is not repeated again herein).

In addition, based on the structures shown in FIG. 6a to FIG. 6d, BS0 also needs to transfer channel self-correction related information of another base station over an internal communication interface, so that the another base station completes channel self-correction. For details, refer to related records in FIG. 5a to FIG. 5b, which are not repeated again herein.

Similar to FIG. 5a to FIG. 5b, BS0 to $BS_N$ in FIG. 6a to FIG. 6d also use $A_0$ as a start point to send receive channel correction signals, and use $A_0$ as an end point to receive transmit channel correction signals. Therefore, after the channel self-correction is completed, ratios of all transmit-receive intermediate radio frequency channel responses of BS0 to $BS_N$ on the $k^{th}$ subcarrier satisfy $\lambda_0 e^{j\Theta_0(k)} = \lambda_1 e^{j\Theta_1(k)} = \ldots, \lambda_p e^{j\Theta_p(k)} =, \ldots, = \lambda_N e^{j\Theta_N(k)}$, thereby also implementing joint channel correction among BS0, . . . , and $BS_N$.

Figure 7A:
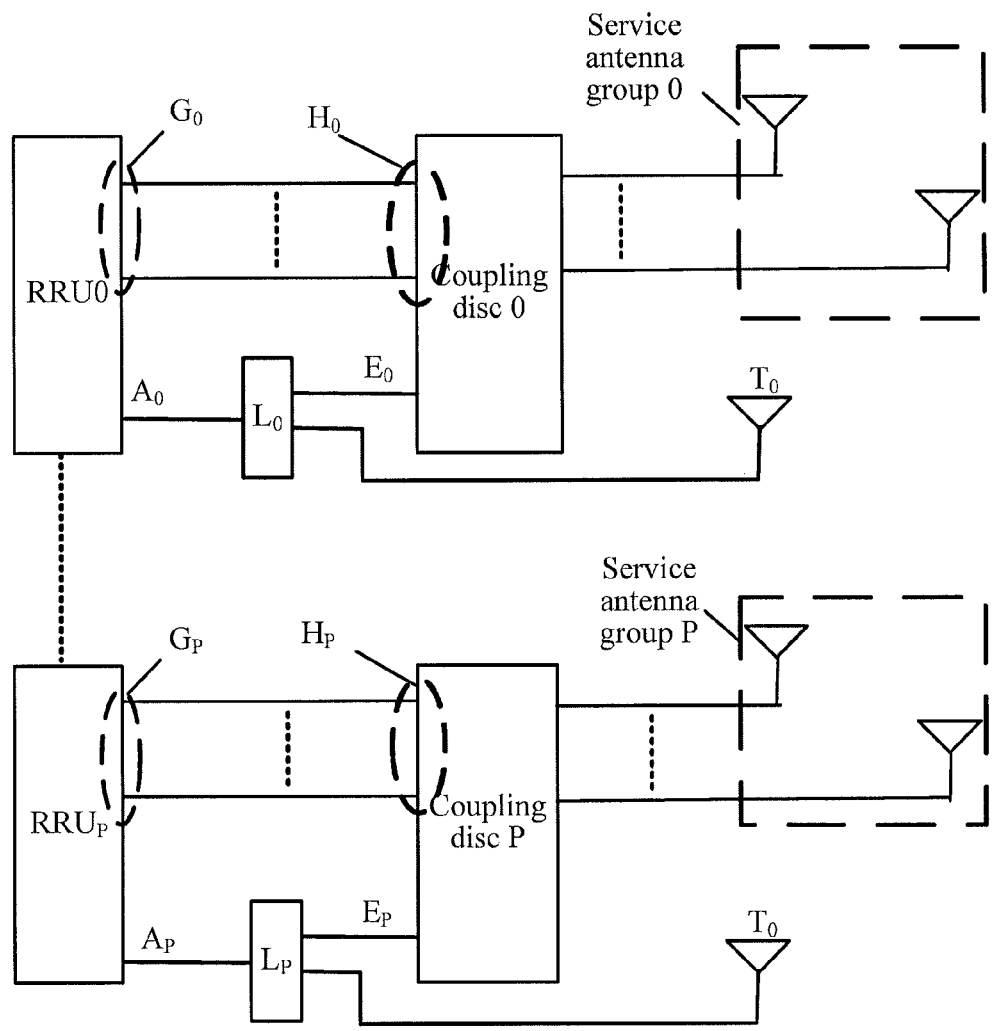
FIG. 7a is still another schematic diagram of a connection relationship between a base station of an external correction type and a joint channel correction unit according to an embodiment of the present invention.

In all the foregoing embodiments, all components included in the joint channel correction unit are wired components. The joint channel correction unit may also include wireless components. FIG. 7a shows another structure of the joint channel correction unit, including:

N+1 fifth combiners ($L_0$ to $L_N$), and N+1 first antennas ($T_0$ to $T_N$), where a combining end of a $P^{th}$ (P=0, 1, . . . , N) fifth combiner $L_P$ is connected a $P^{th}$ first antenna $T_P$.

For the purpose of distinction, a service antenna group in a $P^{th}$ base station $BS_P$ in FIG. 7a is referred to as service antenna group P, and other names in FIG. 5a are retained.

With respect to FIG. 7a, the foregoing connection manner of "at least one base station in the base station set and a joint channel correction unit" may specifically include that:

two dividing ends of the $P^{th}$ fifth combiner $L_P$ are separately connected to the first self-correction channel interface $A_P$ and the second self-correction channel interface $E_P$ of the $P^{th}$ base station $BS_P$.

Any first self-correction channel interface in FIG. 7a may be used as a common reference transmit end or a common reference receive end, or used as both a common reference transmit end and a common reference receive end. For example, the first self-correction channel interface $A_0$ may be selected as the common reference transmit end, and the first self-correction channel interface $A_P$ may be selected as the common reference receive end; or the first self-correction channel interface $A_0$ may also be selected as both the common reference transmit end and the common reference receive end.

For the purpose of convenience, the first self-correction channel interface $A_0$ is selected as both the common reference transmit end and the common reference receive end. Correspondingly, the foregoing step S1 may specifically include:

sending, by the first self-correction channel interface $A_0$, a receive channel correction signal to each first service bearer interface.

Specifically, for BS0, the "receive channel correction signal" is sent from the first self-correction channel interface $A_0$, transmitted in a path of $A_0 \to L_0 \to T_0 \to$ service antenna group $0 \to H_0 \to G_0$, and received by the first service bearer interface $G_0$.

As deduced by analogy, for $BS_p$, the "receive channel correction signal" is sent from the first self-correction channel interface $A_0$, transmitted in a path of $A_0 \rightarrow L_0 \rightarrow T_0 \rightarrow$service antenna group $P \rightarrow H_P \rightarrow G_P$, and received by the first service bearer interface G.

Step S2 may specifically include:

receiving, by the first self-correction channel interface $A_0$, a transmit channel correction signal sent by each first service bearer interface.

Specifically, for BS0, the transmit channel correction signal is sent from the first service bearer interface $G_0$, transmitted in a path of $G_0 \rightarrow H_0 \rightarrow$service antenna group $0 \rightarrow T_0 \rightarrow L_0 \rightarrow A_0$, and received by the first self-correction channel interface $A_0$.

As deduced by analogy, for BSp, the transmit channel correction signal is sent from the first service bearer interface $G_P$, transmitted in a path of $G_P \rightarrow H_P \rightarrow$service antenna group $P \rightarrow T_0 \rightarrow L_0 \rightarrow A_0$, and received by the first self-correction channel interface $A_0$.

Certainly, if $A_P$ is selected as a common reference receive end, for BS0, a transmit channel correction signal is sent from the first service bearer interface $G_0$, transmitted in a path of $G_0 \rightarrow H_0 \rightarrow$service antenna group $0 \rightarrow T_P \rightarrow L_P \rightarrow A_P$, and received by the first self-correction channel interface $A_P$; and for $BS_p$, a transmit channel correction signal is sent from the first service bearer interface $G_P$, transmitted in a path of $G_P \rightarrow H_P \rightarrow$service antenna group $P \rightarrow T_P \rightarrow L_P \rightarrow A_P$, and received by the first self-correction channel interface A.

Figure 7B:
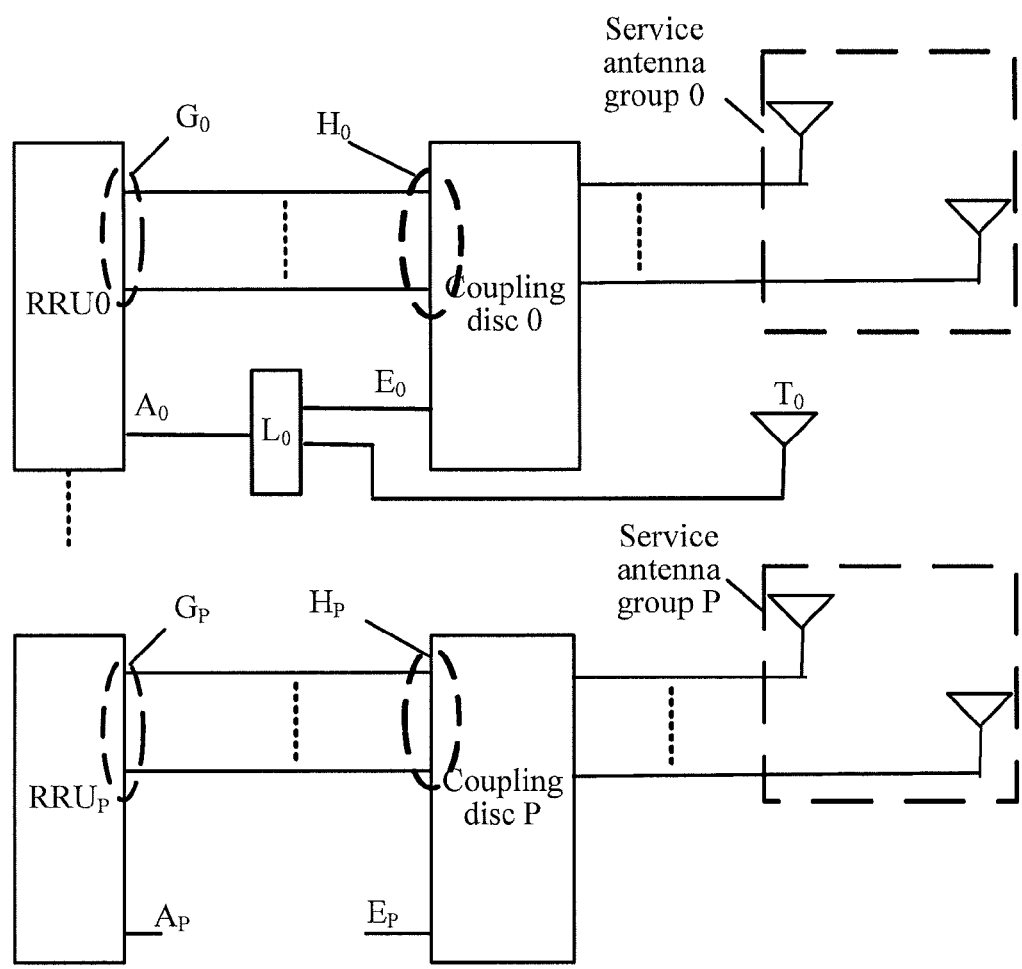
FIG. 7b is a schematic diagram of still another connection relationship between a base station of an external correction type and a joint channel correction unit according to an embodiment of the present invention.

It can be known from the foregoing specific transmission path that, if the first self-correction channel interface $A_0$ of BS0 is selected as a common reference transmit end and a common reference receive end, none of the first self-correction channel interfaces ($A_1$ to $A_N$) of other base stations, second self-correction channel interfaces ($E_0$ to $E_N$) of all base stations, and $T_1$ to $T_N$ is used. Therefore, referring to FIG. 7b, the foregoing joint channel correction unit may include only one fifth combiner $L_0$ and one first antenna $T_0$, where the first antenna $T_0$ connects to the first self-correction channel interface $A_0$ by using a combining end of the fifth combiner $L_0$.

Figure 7C:
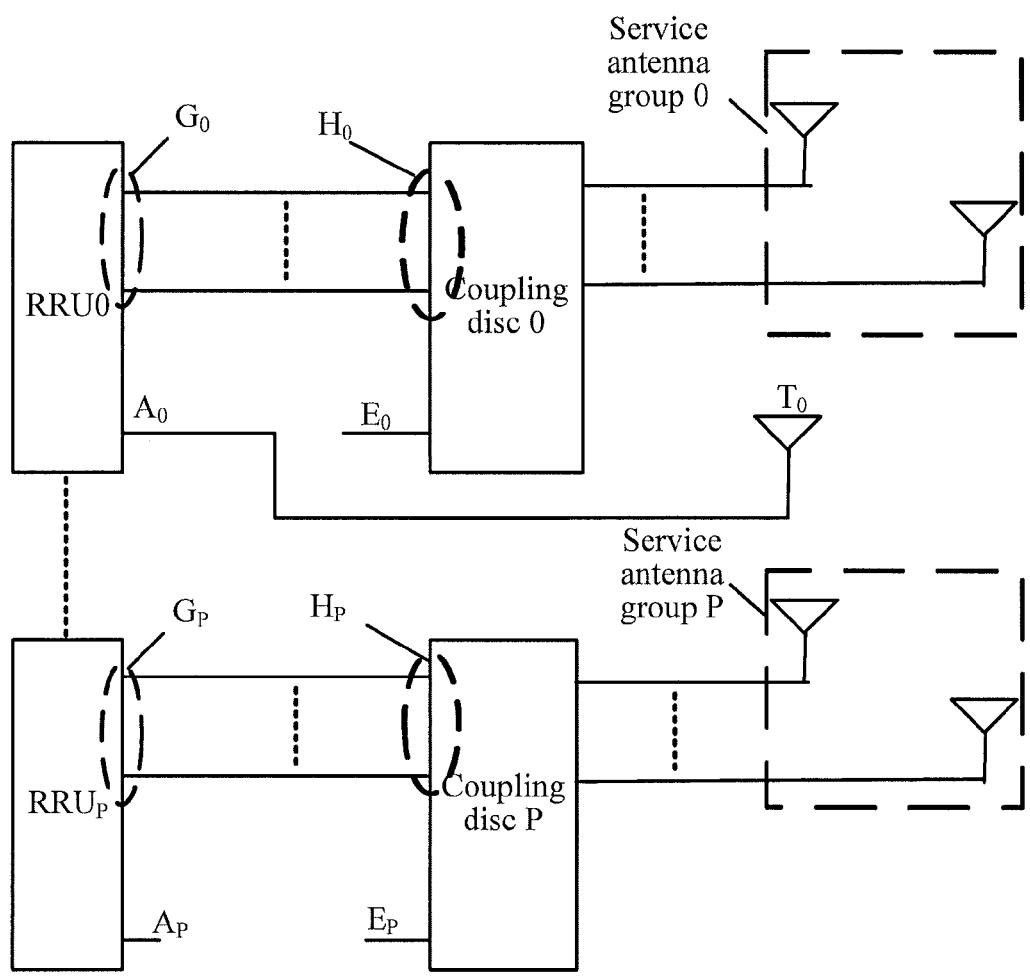
FIG. 7c is a schematic diagram of still another connection relationship between a base station of an external correction type and a joint channel correction unit according to an embodiment of the present invention.

Alternatively, referring to FIG. 7c, the foregoing joint channel correction unit may include only one first antenna $T_0$. In this case, the first antenna $T_0$ is directly connected to the first self-correction channel interface $A_0$.

Figure 7D:
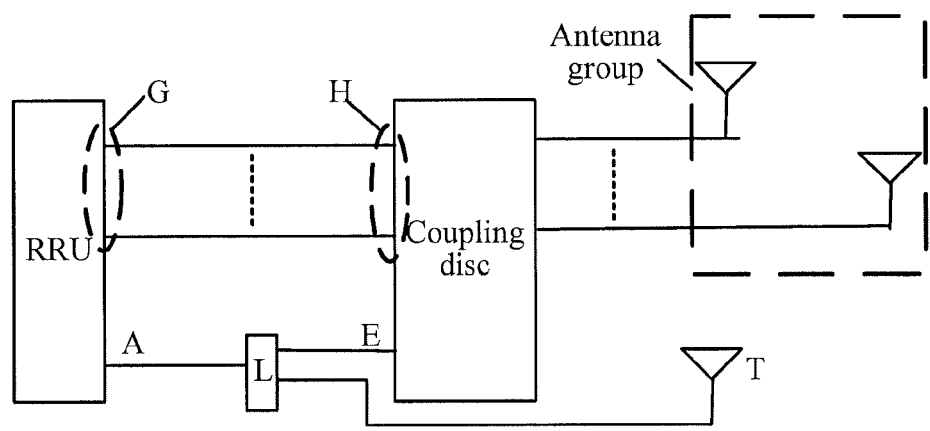
FIG. 7d is a schematic structural diagram of a base station of an external correction type according to an embodiment of the present invention.
Figure 7E:
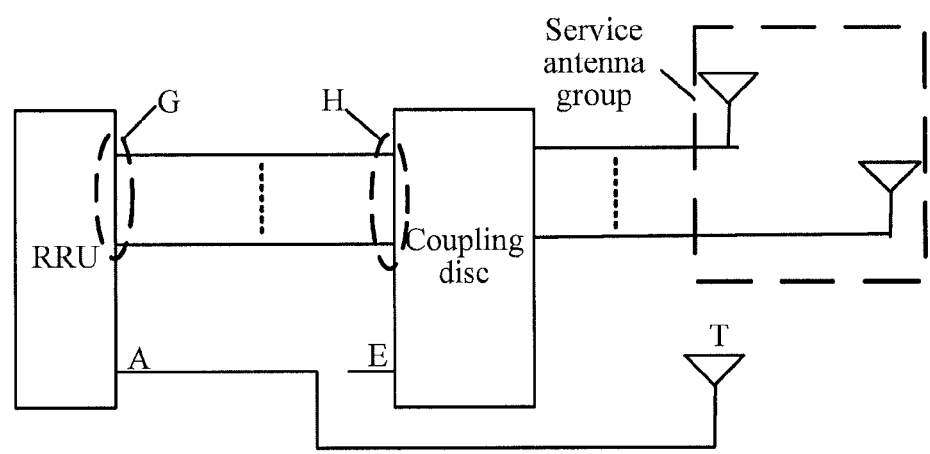
FIG. 7e is another schematic structural diagram of a base station of an external correction type according to an embodiment of the present invention.

In addition, referring to FIG. 7d or FIG. 7e, the embodiment of the present invention also further provides a new base station that includes a first antenna T and a fifth combiner L or includes a first antenna T.

It should be noted that, the first antennas in FIG. 7a to FIG. 7e may specifically be common antennas, or may be cable antennas or leaky cables.

When joint channel correction is performed, a first self-correction channel interface of the new base station shown in FIG. 7d or FIG. 7e may be selected as the common reference transmit end or the common reference receive end, or used as both the common reference transmit end and the common reference receive end.

Certainly, a first self-correction channel interface of an existing base station may also be selected as the common reference transmit end or the common reference receive end, or used as both the common reference transmit end and the common reference receive end. However, in this case, at least the first self-correction channel interface of the existing base station needs to be connected to the first antenna.

In addition, based on the structures shown in FIG. 7a to FIG. 7e, a base station to which the common reference receive end belongs also needs to transfer channel self-correction related information to another base station over an internal communication interface, so that another base station completes channel self-correction. For details, refer to related records in FIG. 5a to FIG. 5b, and details are not described again herein.

It should be noted that, the base stations in all the foregoing embodiments may further cooperate closely with each other and negotiate a correction time sequence (subframe).

Figure 7F:
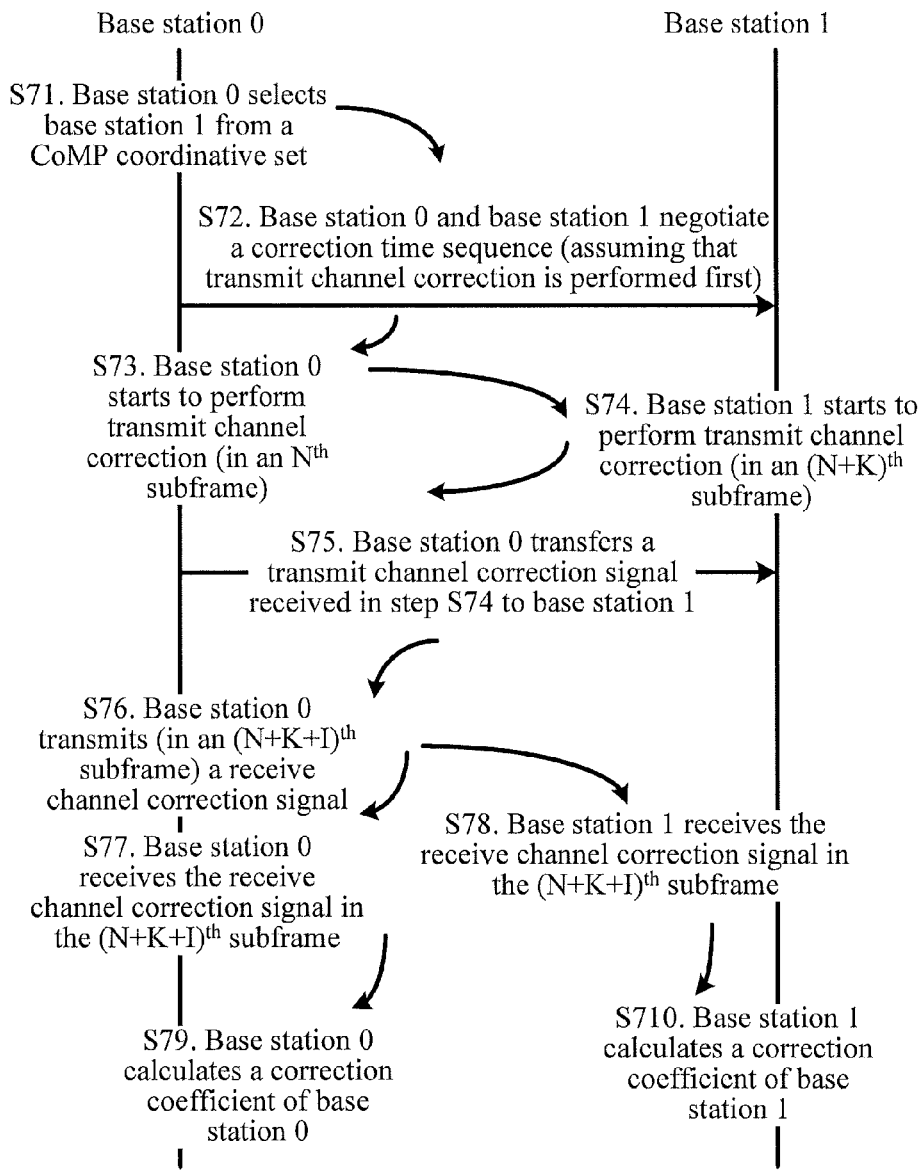
FIG. 7f is a flowchart in which two base stations negotiate a correction time sequence according to an embodiment of the present invention.

By using the base stations BS0 and BS1 as an example, referring to FIG. 7f, the specific procedure is as follows:

S71: BS0 selects BS1 from a CoMP coordinative set.

S72: BS0 and BS1 negotiate a correction time sequence.

In this embodiment, it is assumed that transmit channel correction is performed first (receive channel correction may also be performed first, and it can be seen from the following procedure that, the transmit channel correction and the receive channel correction are independent processes).

S73: According to the negotiated time sequence, BS0 simulates downlink communication of BS0 in an $N^{th}$ subframe.

That is, BS0 sends a transmit channel correction signal from the first service bearer interface $G_0$ in the $N^{th}$ subframe, and receives the transmit channel correction signal from the first self-correction channel interface $A_0$.

S74: According to the negotiated time sequence, BS1 simulates downlink communication of BS1 in an $(N+K)^{th}$ subframe.

That is, BS1 sends the transmit channel correction signal from the first service bearer interface $G_1$ in the $(N+K)^{th}$ subframe, and receives the transmit channel correction signal from the first self-correction channel interface $A_0$.

S75: BS0 transmits the transmit channel correction signal received by BS1 to BS1, where the transmit channel correction signal is received from the first self-correction channel interface $A_0$ in step S74.

S76: According to the negotiated time sequence, BS0 sends a receive channel correction signal from the first self-correction channel interface $A_0$ in an $(N+K+I)^{th}$ subframe.

S77: According to the negotiated time sequence, BS0 receives, from the first service bearer interface $G_0$ in the $(N+K+I)^{th}$ subframe, the receive channel correction signal sent in step S76.

S78: According to the negotiated time sequence, BS1 receives, from the first service bearer interface G1 in the $(N+K+I)^{th}$ subframe, the receive channel correction signal sent in step S76.

S79: BS0 calculates the self-correction coefficient of BS0 by using the transmit channel correction signal received by the first self-correction channel interface $A_0$ in step S73, and the receive channel correction signal received by the first service bearer interface $G_0$ in step S77 and completes channel self-correction.

S710: BS1 calculates the self-correction coefficient of BS1 by using the transmit channel correction signal obtained in step S75, and the receive channel correction signal received by the first service bearer interface $G_1$ in step S78 and completes channel self-correction.

For how to calculate the self-correction coefficient, reference may be made to the foregoing method for a single base station to calculate a self-correction coefficient, which is not repeated again herein.

2: Internal Correction Type

As mentioned above, an RRU of an internal correction type is directly connected to a service antenna by using a radio frequency cable. Because there is no coupling disc, a base station of an internal correction type cannot establish a connection between the RRU and the coupling disc to simulate a downlink channel.

Therefore, in the following embodiments of the present invention, one UE simulator (the UE simulator is used to simulate an ordinary UE) is used as both a common reference transmit end and a common reference receive end or different UE simulators are used as a common reference transmit end and a common reference receive end separately, to complete joint channel correction through the channel self-correction of the base station of an internal correction type.

Based on a known protocol, the base station may send a CRS signal to the ordinary UE, so that the ordinary UE demodulates the CRS signal, and calculates a downlink channel estimation value of the base station. The ordinary UE may send an SRS signal to the base station, so that the base station calculates an uplink channel estimation value according to the SRS signal.

Because in the following embodiments of the present invention, a UE simulator is adopted to simulate the ordinary UE, the uplink and downlink channel estimation values may also be obtained by using the SRS signal and the CRS signal likewise.

Figure 8A:
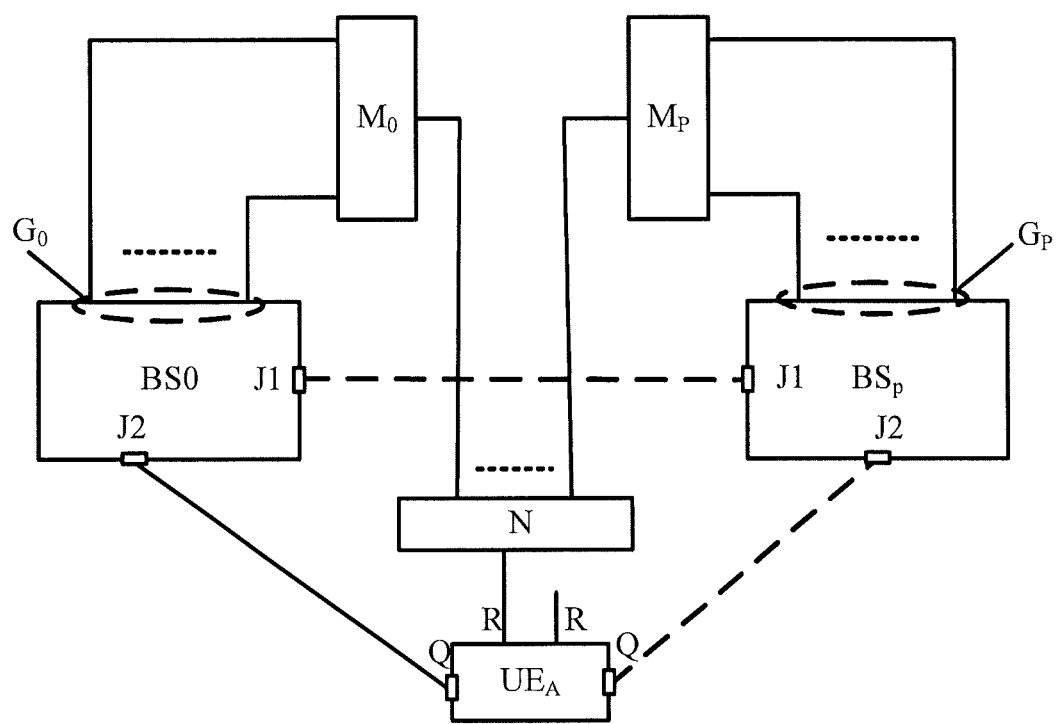
FIG. 8a is a schematic diagram of a connection relationship between a base station of an internal correction type and a joint channel correction unit according to an embodiment of the present invention.

FIG. 8a shows a structure with respect to a joint channel correction unit of a base station of an internal correction type, including: N+1 sixth combiners M ($M_0$ to $M_N$), a data line, a UE simulator ($UE_A$) and a seventh combiner N. Moreover, a radio frequency interface R and a data transmission interface Q are disposed on $UE_A$. $UE_A$ may provide multiple radio frequency interfaces, so as to select an optimal channel. A combining end of the seventh combiner N is connected to the radio frequency interface R of $UE_A$, and N+1 dividing ends of the seventh combiner are connected to combining ends of the foregoing N+1 sixth combiners separately.

In this embodiment, besides the internal communication interface, a communication interface unit of the base station further includes an external communication interface, and the external communication interface may also be a manufacturer customized interface.

With respect to FIG. 8a, the foregoing connection manner of "at least one base station in the base station set and a joint channel correction unit" may specifically include that:

the foregoing N+1 sixth combiners are connected to N+1 base stations in the base station set in a one-to-one manner.

A dividing end of a $P^{th}$ sixth combiner $M_P$ is connected to a first service bearer interface $G_P$ of a $P^{th}$ base station. It should be noted that, the sixth combiner is an X-in-one combiner, where X is decided by the number of service antennas. Because a base station in FIG. 8a adopts 4 service antennas, a sixth combiner in FIG. 8a is a 4-in-one combiner.

In this embodiment, the UE simulator $UE_A$ of the joint channel correction unit is used as a common reference transmit end and a common reference receive end (common $UE_A$ for short).

The corresponding step S1 may specifically include:

sending, by the common $UE_A$, an SRS signal to each first service bearer interface, so that each base station calculates an uplink channel estimation value of each base station.

It should be noted that, as long as the common $UE_A$ sends the SRS signal once, each base station can receive the SRS signal over the first service bearer interface separately, thereby calculating the uplink channel estimation value of each base station.

Step S2 may specifically include:

receiving, by the common $UE_A$, a CRS signal sent by each base station, so that the common $UE_A$ calculates a downlink channel estimation value of each base station.

Then, joint correction can be completed in the following manners:

Manner 1: Select a communication interface unit of BS0 (or any other base station) as a primary communication interface unit, and connect the data transmission interface Q of the common $UE_A$ to the external communication interface J2 of the primary communication interface unit by using a data cable.

The common $UE_A$ feeds back the calculated downlink channel estimation value of each base station to BS0 over the data transmission interface Q and the external communication interface J2. BS0 then feeds back a downlink channel estimation value of another base station to a corresponding base station over the internal private communication interface J1. Then, each base station uses uplink and downlink channel estimation values to calculate a transmit channel self-correction coefficient and a receive channel self-correction coefficient respectively, thereby completing channel self-correction. For how to calculate the self-correction coefficients and how to specifically complete the channel self-correction, refer to the foregoing related records in this specification, which are not repeated again herein.

Manner 2: The common $UE_A$ is connected to the external communication interface J2 of each base station over multiple data transmission interfaces Q, so as to feed back the downlink channel estimation value separately to each base station. Then, each base station uses uplink and downlink channel estimation values to calculate a transmit channel self-correction coefficient and a receive channel self-correction coefficient respectively, thereby completing channel self-correction. In this manner, it is unnecessary to use the private communication interface J1 to transmit the downlink channel estimation values between the base stations.

Manner 3: Select the communication interface unit of BS0 (or any other base station) as the primary communication interface unit, and another system base station feeds back uplink channel estimation value information to BS0 over the internal private communication interface J1. The common $UE_A$ is also connected to the external communication interface J2 of BS0 over the data transmission interface Q, thereby feeding back downlink channel estimation value information of each base station to BS0. After calculating self-correction coefficients of all base stations, BS0 distributes the self-correction coefficients over the internal private communication interface J1.

Figure 8B:
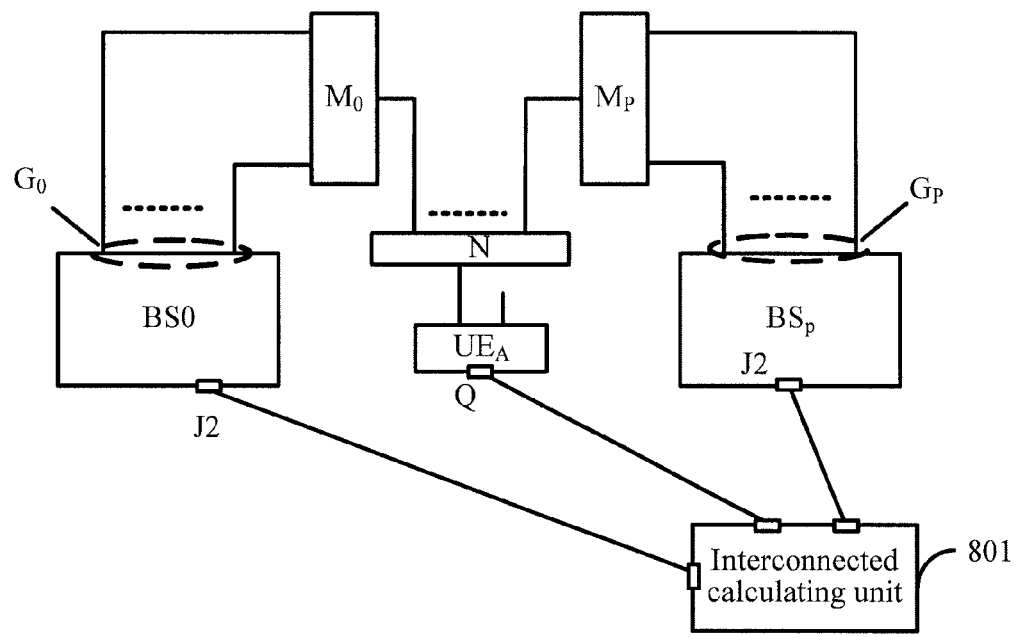
FIG. 8b is a schematic diagram of another connection relationship between a base station of an internal correction type and a joint channel correction unit according to an embodiment of the present invention.

In addition, referring to FIG. 8b, the common $UE_A$ may further be connected to an input interface of an interconnected calculating unit 801 over data transmission interface Q, and each base station may further be connected to the input interface of the interconnected calculating unit 801 over the external communication interface J2. The common $UE_A$ feeds back downlink channel estimation value information of all base stations to the interconnected calculating unit 801, the base stations also feed back their respective uplink channel estimation value information to the interconnected calculating unit 801, and after calculating self-correction coefficients of all base stations, the interconnected calculating unit 801 distributes the self-correction coefficients.

Figure 8C:
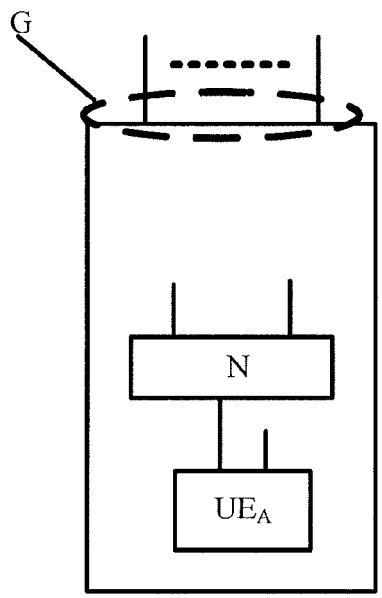
FIG. 8c is a schematic structural diagram of a base station of an internal correction type according to an embodiment of the present invention.

In other embodiments of the present invention, referring to FIG. 8c, the foregoing $UE_A$ and seventh combiner N may also be built in a base station. In addition, only the $UE_A$ may be built in the base station.

Figure 8D:
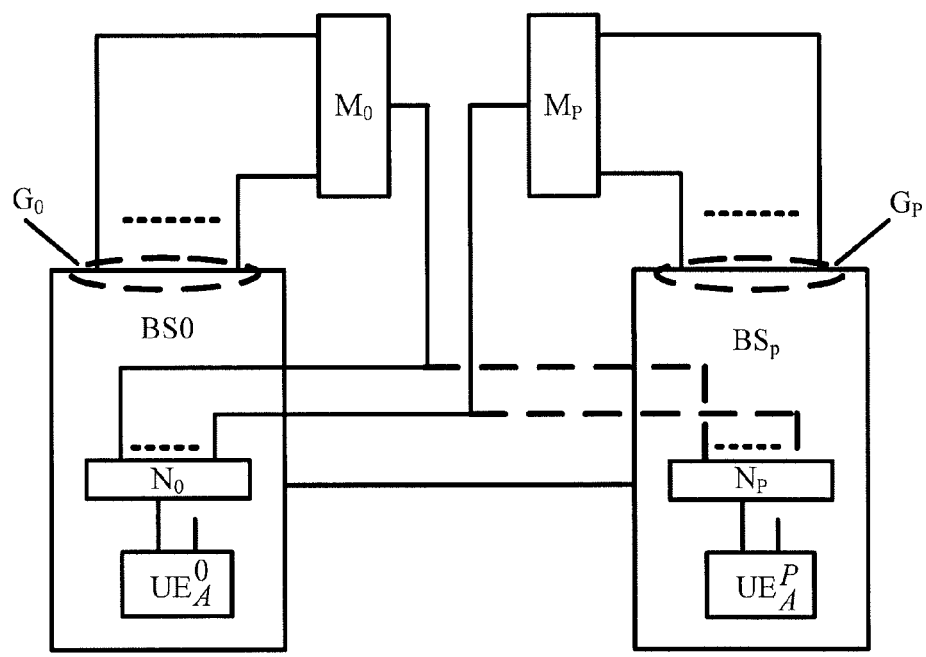
FIG. 8d is a schematic diagram of still another connection relationship between a base station of an internal correction type and a joint channel correction unit according to an embodiment of the present invention.

Alternatively, referring to FIG. 8d, the $UE_A$ and the seventh combiner N are built in at least one base station. For distinguishing purposes, the $UE_A$ built in a $P^{th}$ base station $BS_P$ is referred to as $UE_A^P$, and the seventh combiner N built in the $P^{th}$ base station $BS_P$ is referred to as $N_P$.

When N+1 dividing ends of the seventh combiner built in a certain base station are connected to combining ends of N+1 sixth combiners separately, the seventh combiner and the $UE_A$ connected to the seventh combiner (the $UE_A$ is used as a common reference transmit end and a common reference receive end) become a part of a joint channel correction unit and participate in joint channel correction. Refer to FIG. 8a for other details, which are not repeated again herein. In addition, for how the base stations in FIG. 8a to FIG. 8d perform channel self-correction by using self-correction coefficients, refer to the related descriptions of the foregoing single base station channel self-correction, which are not repeated again herein either.

Figure 8E:
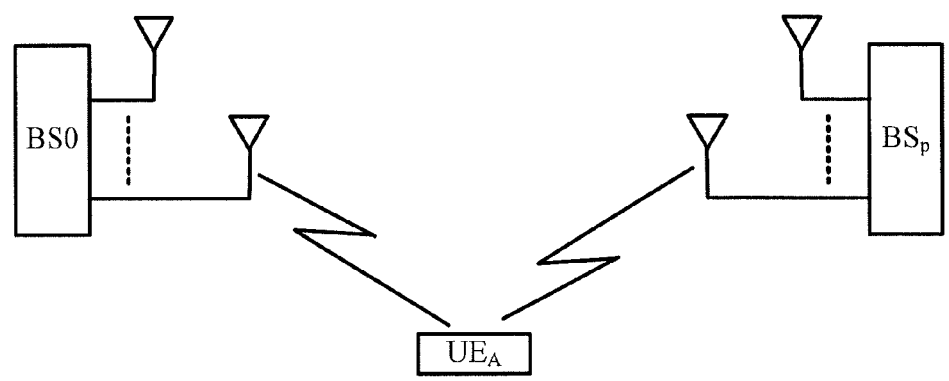
FIG. 8e is a schematic diagram in which a UE simulator uses an air interface to perform uplink/downlink communication with a base station according to an embodiment of the present invention.

Regardless of a base station of an internal correction type or an external correction type, referring to FIG. 8e, $UE_A$ can be placed at intersecting cell edges of at least two base stations in a base station set, so that $UE_A$ is used as both the common reference transmit end and the common reference receive end, and an air interface of $UE_A$ is used to perform joint channel correction.

Unlike FIG. 8a to FIG. 8d, $UE_A$ in FIG. 8e sends SRS signals to each base station over the air interface, receives CRS signals sent by each base station, and feeds back downlink channel estimation values to each base station over the air interface. Therefore, in FIG. 8e, the uplink channel estimation values calculated by each base station according to the SRS signals sent by $UE_A$ over the air interface include an uplink air interface channel response and a channel response of an intermediate radio frequency receive channel. Likewise, the downlink channel estimation values fed back by $UE_A$ to each base station also include a downlink air interface channel response and a channel response of an intermediate radio frequency transmit channel.

Therefore, the base station in the embodiment corresponding to FIG. 8e cannot calculate values of transmit channel self-correction coefficient $\beta_{i,DL}(k)$ and receive channel self-correction coefficient $\beta_{i,UL}(k)$ separately. Because uplink/downlink air interface channels of an LTE system have reciprocity (that is, an uplink air interface channel response is equal to a downlink air interface channel response), the base station can divide the obtained uplink channel estimation value by the obtained downlink channel estimation value or divide the obtained downlink channel estimation value by the obtained uplink channel estimation value, so as to obtain a ratio $$\frac{\beta_{i,UL}(k)}{\beta_{i,DL}(k)} \text{ or } \frac{\beta_{i,DL}(k)}{\beta_{i,UL}(k)}$$

between the transmit channel self-correction coefficient and the receive channel self-correction coefficient. Then, according to the foregoing manner of "performing transmit-receive channel self-correction simultaneously", channel self-correction is performed.

In addition, because $UE_A$ in FIG. 8e is located at cell edges of at least two base stations, which causes the poor quality of uplink/downlink correction signals, the correction precision is greatly affected. To further improve the precision, multiple base stations may establish a collaborated mechanism over an X2 interface to perform joint channel correction.

Therefore, before the SRS signals and the CRS signals are sent, the foregoing method may further include:

exchanging, by each base station in the base station set (over the X2 interface), scheduling information, where the scheduling information may include a high interference indicator (HII) and an overload indicator (OI); and when a certain or some base stations in the base station set are in a preset light load state (for example, at night), enabling a part of subframes of the base stations in the preset light load state to be silent, so as to reduce network interference, and further improve the correction precision.

With respect to all the foregoing embodiments in which a UE simulator is used, because all base stations also share the common reference transmit end and the common reference receive end, after the base stations complete channel self-correction, on a $k^{th}$ subcarrier, it may also be satisfied that $\lambda_0 e^{j\theta_0(k)} = \lambda_1 e^{j\theta_1(k)} = , \ldots , \lambda_p e^{j\theta_p(k)} = , \ldots , = \lambda_N e^{j\theta_N(k)}$, thereby also implementing joint channel correction between the base stations.

In addition, in all the foregoing embodiments, the UE simulator may further be equipped with an independent attenuator (or the UE simulator itself has an attenuation function), so as to prevent components of the UE simulator or external components from being damaged because of excessive transmit power of the UE simulator.

It should be noted that, in all the foregoing embodiments, two or more than two base stations send downlink correction signals to the same common reference receive end. Therefore, it needs to be considered that a time division form, a frequency division form or a code division form is adopted to distinguish downlink correction signals of different base stations. It may be unnecessary to distinguish uplink correction signals sent by the common reference transmit end.

The foregoing of this specification describes embodiments in which a correction time sequence (subframe) is negotiated between base stations. Actually, the base stations in FIG. 8a and FIG. 8e may also send CRS signals by using a negotiated a correction time sequence (that is, time division multiplexing). By still using the two base stations BS0 and BS1 as an example, its cooperative procedure may be:

according to the negotiated time sequence, in an $N^{th}$ subframe, sending a downlink correction signal from each service antenna of BS0, and receiving the downlink correction signal from a common reference receive end; and in an $(N+K)^{th}$ subframe, sending the downlink correction signal from each service antenna of BS1.

In addition, regardless of an internal or external correction type, in all the foregoing embodiments, a frequency resource (subcarrier) may also be negotiated between the base stations:

That the two base stations BS0 and BS1 perform joint transmit channel correction over an air interface is used as an example. It is assumed that a total number of service antennas of BS0 is X1, a total number of service antennas of BS1 is X2, and a total number of the service antennas of the two base stations is X (X=X1+X2). When the X service antennas perform joint channel correction between the base stations, a frequency division operation may be performed:

enabling a subcarrier of a downlink correction signal carried by a $P^{th}$ service antenna (P=0, 1, . . . , X−1) to be P+nX, where n is an integer, and P+nX≤N1 is satisfied, where N1 is the number of valid subcarriers.

For example, it is assumed that N1=32 (that is, subcarriers are numbered from 0 to 31), and BS0 and BS1 have a total of 8 service antennas that are numbered from 0 to 7. The service antenna 0 carries downlink correction signals on the subcarriers 0, 8, 16 and 24, the service antenna 1 carries downlink correction signals on the subcarriers 1, 9, 17 and 25, the service antenna 2 carries downlink correction signals on the subcarriers 2, 10, 18 and 26, the service antenna 3 carries downlink correction signals on the subcarriers 3, 11, 19 and 27, and the rest is deduced by analogy. Each service antenna transmits the downlink correction signals on corresponding multiple subcarriers simultaneously, thereby completing joint correction between multiple base stations at the same moment.

For embodiments in which joint transmit channel correction is not performed over an air interface, a similar frequency division operation may also be performed:

The first service bearer interface of the RRU communicates with X service antennas over X radio frequency cable interfaces, so that if BS0 and BS1 include a total of 8 service antennas, the first service bearer interface of BS0 and the first service bearer interface of BS1 also include a total of 8 radio frequency cable interfaces, where the 8 radio frequency cable interfaces are likewise numbered from 0 to 7. The radio frequency cable interface 0 carries downlink correction signals on the subcarriers 0, 8, 16 and 24, the radio frequency cable interface 1 carries downlink correction signals on the subcarriers 1, 9, 17 and 25, the radio frequency cable interface 2 carries downlink correction signals on the subcarriers 2, 10, 18 and 26, and the rest is deduced by analogy. Each radio frequency cable interface transmits the downlink correction signals on corresponding multiple subcarriers simultaneously, thereby also completing joint correction between multiple base stations at the same moment.

In addition, regardless of an internal or external correction type, in all the foregoing embodiments, the base stations may negotiate with each other to allocate resources in a manner of combining code division and frequency division:

That two base stations BS0 and BS1 perform joint transmit channel correction is still used as an example. It is assumed that a total number of service antennas of BS0 (or a total number of radio frequency cable interfaces) is X1, a total number of service antennas of BS1 (or a total number of radio frequency cable interfaces) is X2, and X1×2.

BS0 is used as a primary base station, and X1 service antennas (or X1 radio frequency cable interfaces) of the primary base station transmit the downlink correction signals in a frequency division manner. X2 service antennas (or X2 radio frequency cable interfaces) of BS1 may transmit, on subcarriers already occupied by BS0, the downlink correction signals in a code division manner.

For example, it is still assumed that the number of effective subcarriers N1=32 (that is, the subcarriers are numbered from 0 to 31), and BS0 includes 8 service antennas (or 8 radio frequency cable interfaces), which are numbered from 0 to 7. Moreover, the service antenna 0 (or the radio frequency cable interface 0) of BS0 carries downlink correction signals on the subcarriers 0, 8, 16 and 24, the service antenna 1 (or the radio frequency cable interface 1) of BS0 carries downlink correction signals on the subcarriers 1, 9, 17 and 25, the service antenna 2 (or the radio frequency cable interface 2) of BS0 carries downlink correction signals on the subcarriers 2, 10, 18 and 26, the service antenna 3 (or the radio frequency cable interface 3) of BS0 carries downlink correction signals on subcarriers 3, 11, 19 and 27, and the rest is deduced by analogy.

BS1 includes 4 service antennas (or 4 radio frequency cable interfaces), and BS1 may transmit, on the 32 subcarriers already occupied by BS0, the downlink correction signals in a code division manner. For example, the service antenna 0 (or the radio frequency cable interface 0) of BS1 may transmit, on the subcarriers (0, 8, 16 and 24) of the service antenna 0 of BS0, the downlink correction signals in a code division manner. The service antenna 1 (or radio frequency cable interface 1) of BS1 may transmit, on the subcarriers (1, 9, 17 and 25) of the service antenna 1 of BS0, the downlink correction signals in a code division manner, and the rest is deduced by analogy, so that joint correction may also be completed between multiple base stations at the same moment.

It should be noted that, the combiner mentioned in the present invention has both a combining function and a dividing function.

To implement normal service data transmission while joint channel correction is being performed between the base stations in the base station set, the joint channel correction units in the foregoing FIG. 8a to FIG. 8d may further be improved.

For example, in other embodiments of the present invention, the joint channel correction unit in FIG. 8a to FIG. 8d is improved to include a dividing combiner, at least two coupling discs (the sixth combiners in FIG. 8a to FIG. 8d are replaced with the coupling discs), and a $UE_A$ is used as a common reference transmit end and a common reference receive end. The $UE_A$ may be integrated with the following components: an attenuator and a dividing combiner.

Referring to FIG. 8f to FIG. 8j, any coupling disc has a second service bearer interface, a third service bearer interface and a second self-correction channel interface. The functions of the coupling discs in FIG. 8f to FIG. 8j are similar to those of a coupling disc used in a base station of an external correction type. Further, for the purpose of compactness, a circuit with a coupling disc function may be integrated in a service antenna or an RRU, so that no independent coupling disc is required.

For the purpose of distinction, in FIG. 8f to FIG. 8j, a second service bearer interface of a $P^{th}$ coupling disc ($OHP_P$) is denoted by $H_P$, a third service bearer interface of the $P^{th}$ coupling disc ($OHP_P$) is denoted by $W_P$, and a second self-correction channel interface of the $P^{th}$ coupling disc ($OHP_P$) is denoted by $E_P$. The second self-correction channel interface $E_P$ of $OHP_P$ is connected to a dividing end of dividing combiner N (that is, the foregoing seventh combiner N).

In FIG. 8f to FIG. 8j, base stations in the base station set are connected to the coupling discs in a one-to-one manner. That each base station is connected to the coupling discs in a one-to-one manner may be implemented in the following manner: the first service bearer interface $G_P$ of a $P^{th}$ base station is connected to the second service bearer interface $H_P$ of a $P^{th}$ coupling disc ($OHP_P$), and a service antenna of the $P^{th}$ base station is connected to the third service bearer interface $W_P$ of the $OHP_P$.

Figure 8F:
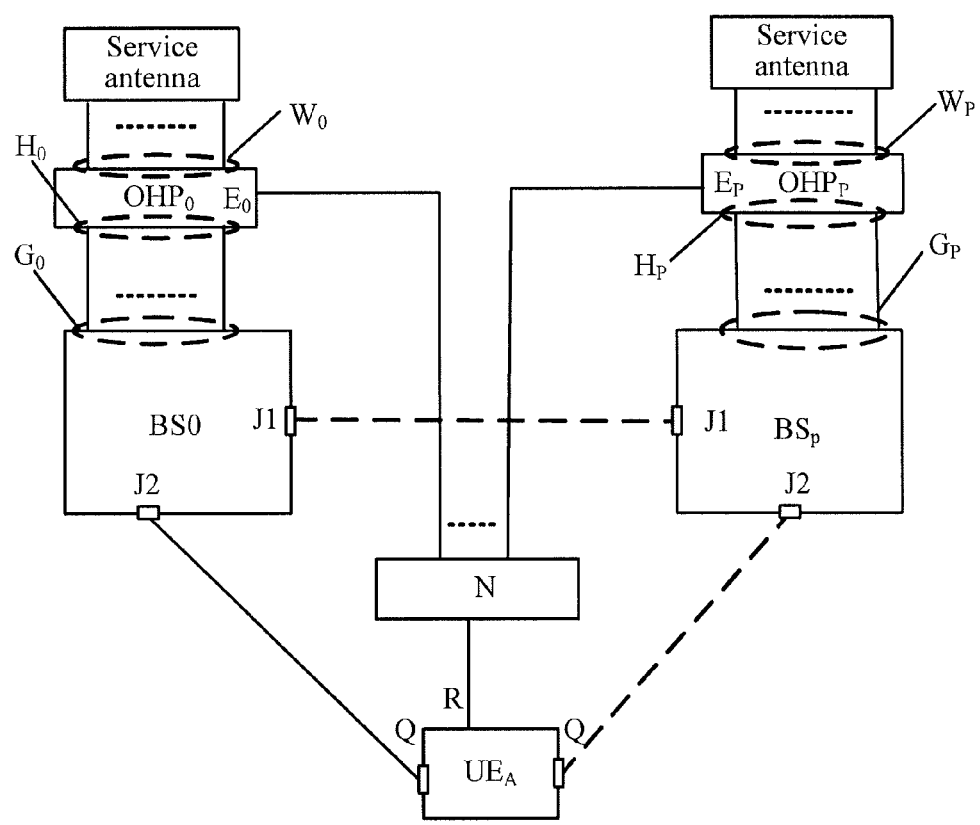
FIG. 8f is a schematic diagram of still another connection relationship between a base station of an internal correction type and a joint channel correction unit according to an embodiment of the present invention.
Figure 8G:
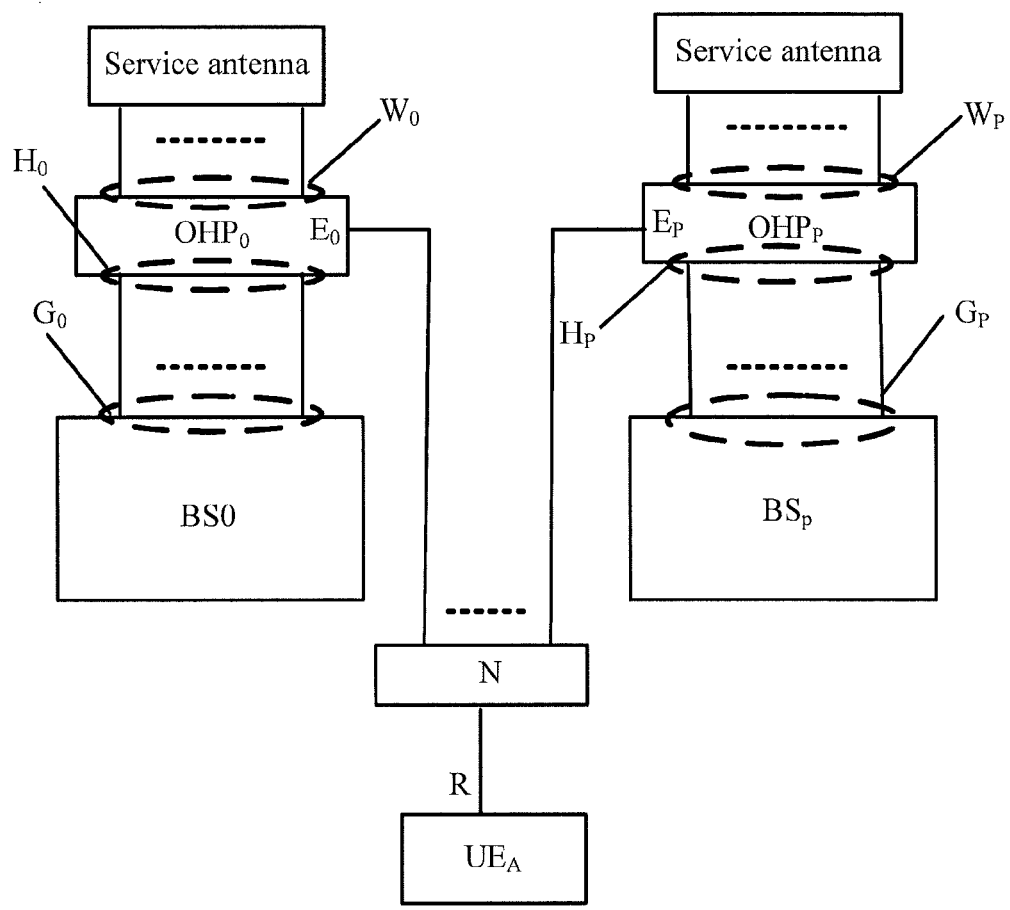
FIG. 8g is a schematic diagram of still another connection relationship between a base station of an internal correction type and a joint channel correction unit according to an embodiment of the present invention.
Figure 8H:
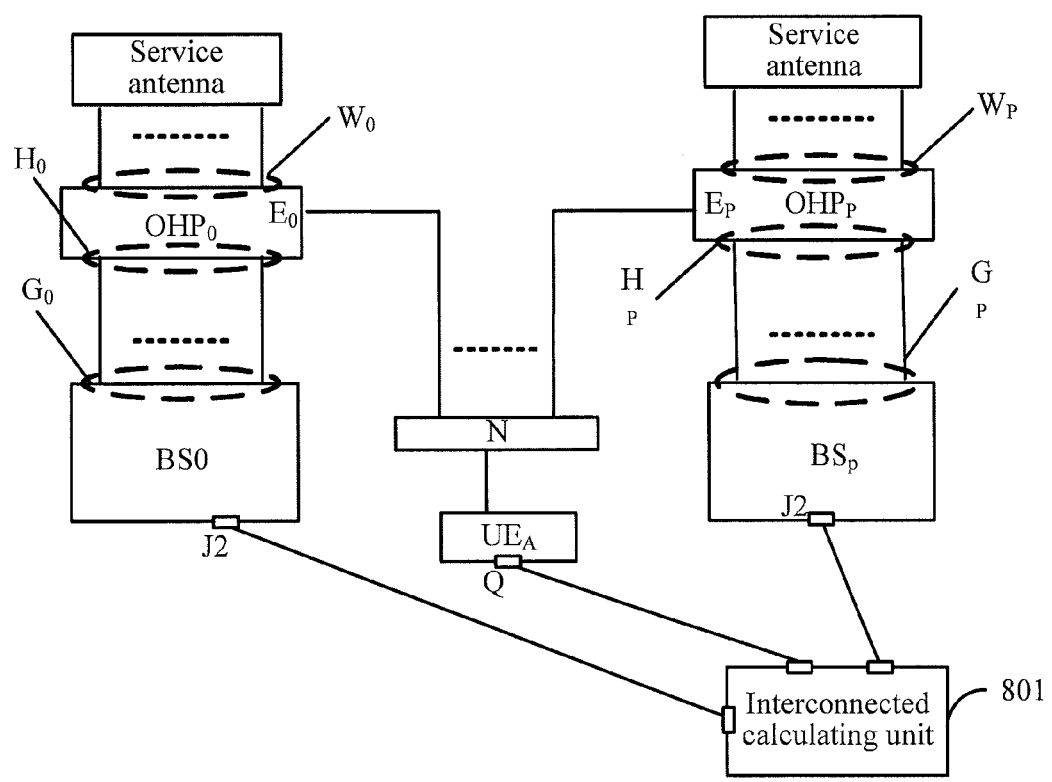
FIG. 8h is a schematic diagram of still another connection relationship between a base station of an internal correction type and a joint channel correction unit and an internal correction type base station according to an embodiment of the present invention.
Figure 8I:
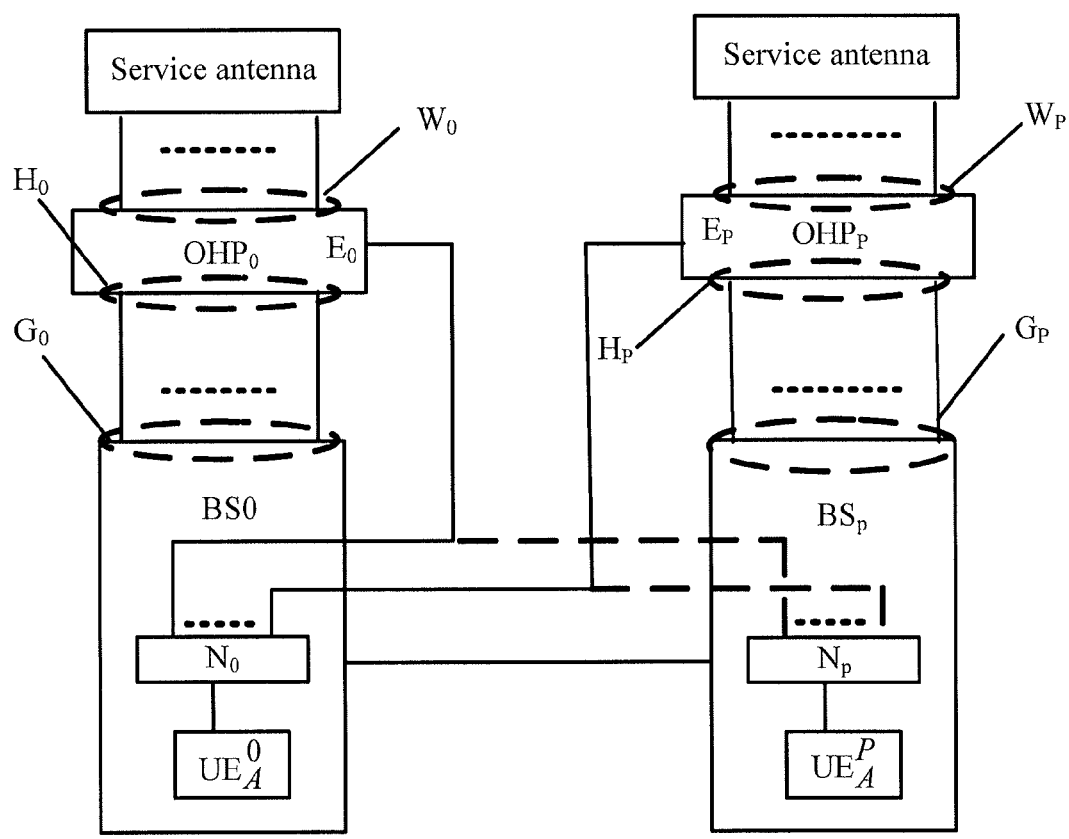
FIG. 8i is a schematic diagram of still another connection relationship between a base station of an internal correction type and a joint channel correction unit according to an embodiment of the present invention.
Figure 8J:
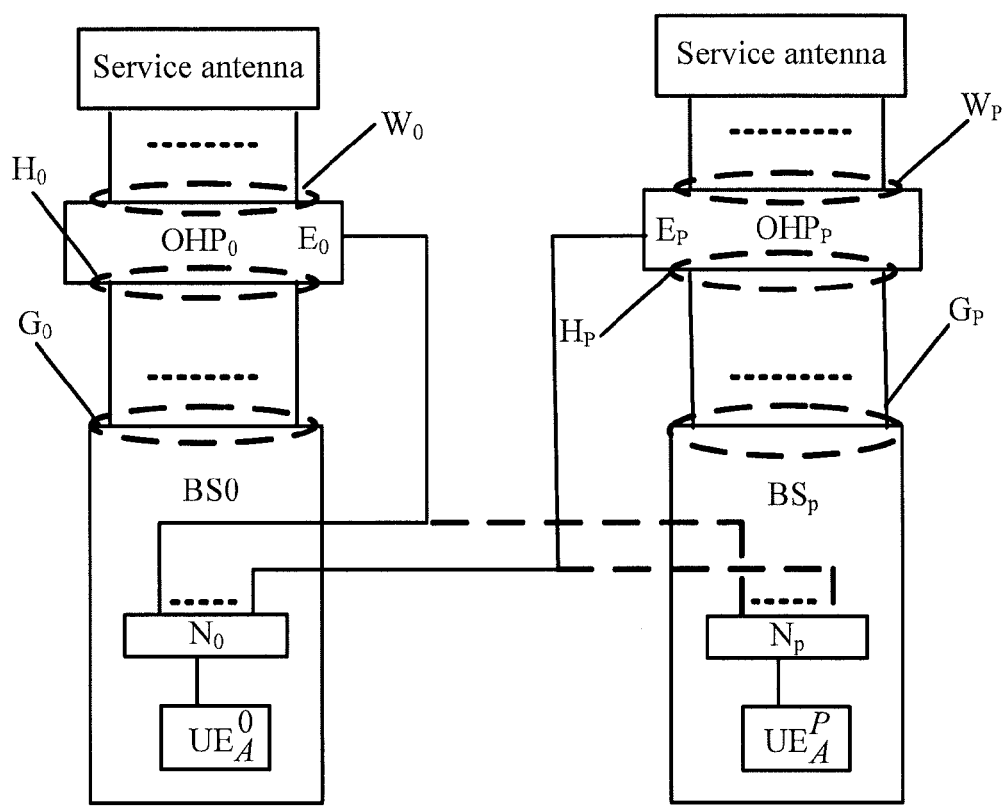
FIG. 8j is a schematic diagram of still another connection relationship between a base station of an internal correction type and a joint channel correction unit according to an embodiment of the present invention.
Figure 8K:
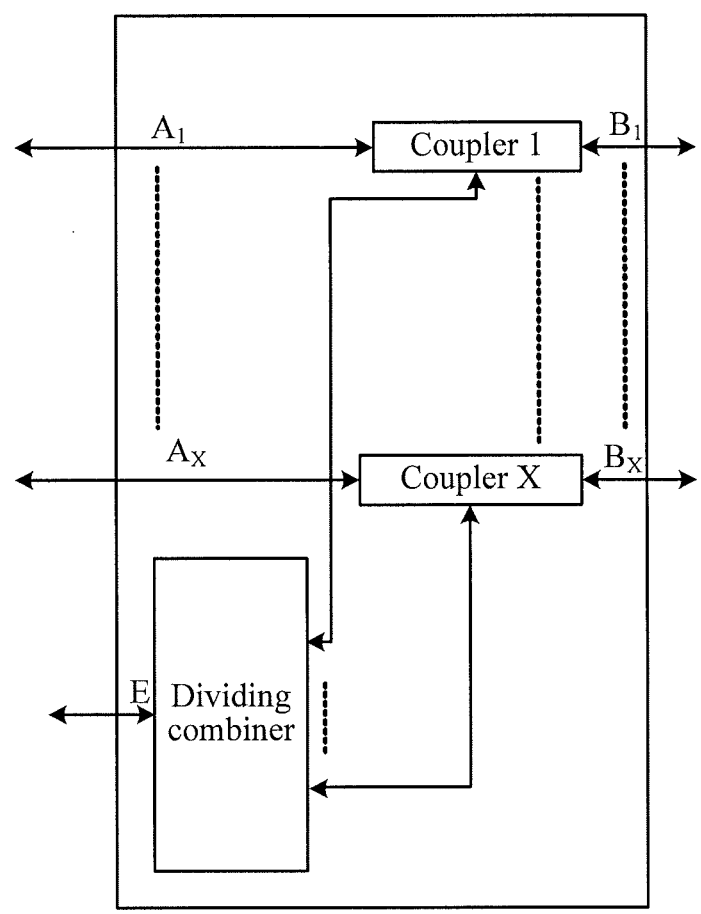
FIG. 8k is a schematic structural diagram of a coupling disc according to an embodiment of the present invention.
Figure 81:
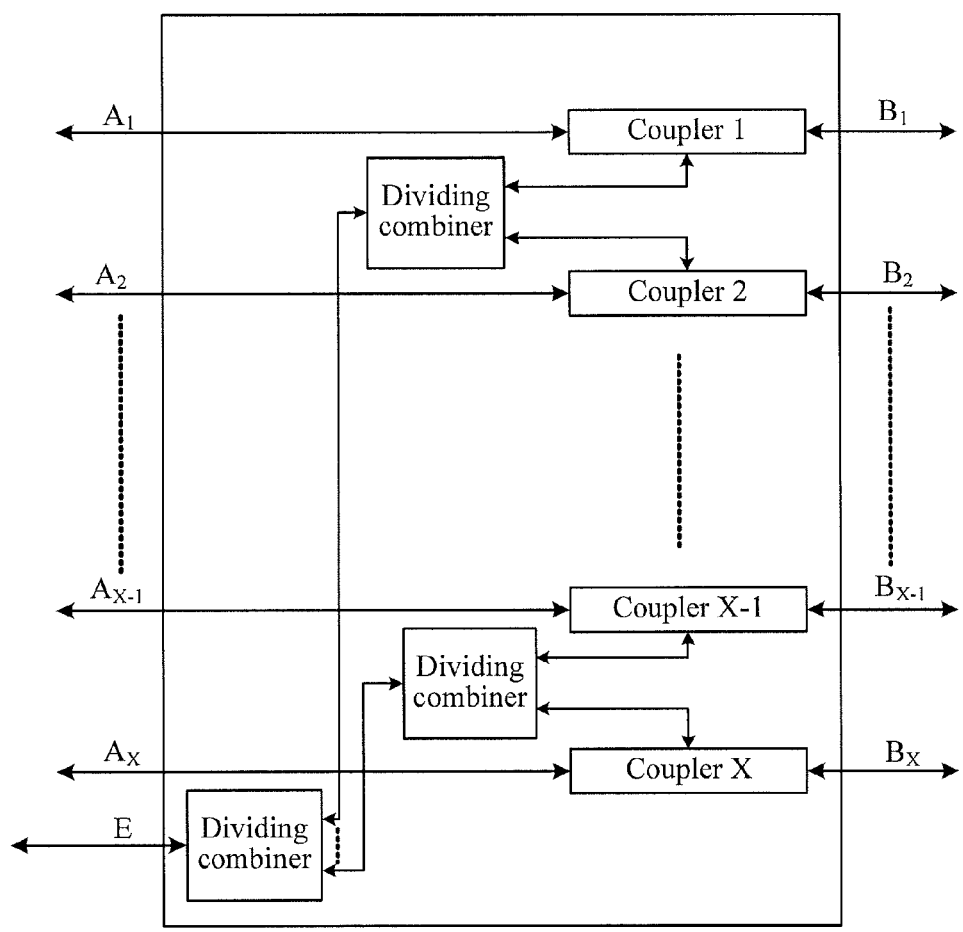

For a specific structure of the coupling disc, refer to FIG. 8k: Assuming that the number of service antennas is X, the second service bearer interface includes X radio frequency cable interfaces $A_1$ to $A_X$, and the third service bearer interface includes X radio frequency cable interfaces $B_1$ to $B_X$. It can be seen from FIG. 8k that, the coupling disc includes X couplers (coupler 1 to coupler X) and a dividing combiner, a first end of each coupler is used as one radio frequency cable interface in the second service bearer interface, a second end is used as one radio frequency cable interface in the third service bearer interface, a coupling end is connected to a dividing end of the dividing combiner, and a combining end of the dividing combiner is used as the second self-correction channel interface E.

In this way, it is assumed that a signal (data) from the base station is input from $A_1$, the signal is transmitted in two paths, in one path, the signal is output to the service antenna through $B_1$ and in the other path, the signal is output through the second self-correction channel interface E. Conversely, the signal (data) input by the second self-correction channel interface E may be output from $A_1$. The coupler may include a directional coupler, an attenuation component, and an electronic switch, as long as the foregoing functions can be completed.

It can be known with reference to FIG. 8f to FIG. 8j that, the signal (data) from the base station is input by the second service bearer interface of the coupling disc, the signal is transmitted in two paths, in one path, the signal is output to the service antenna through the third service bearer interface and in the other path, the signal is output to the dividing combiner through the second self-correction channel interface. Conversely, the signal (data) from $UE_A$ is input to the second self-correction channel interface of the dividing combiner, then coupled to the second service bearer interface of the coupling disc, and output to the base station from the second service bearer interface.

It should be noted that, because the number of ports of one dividing combiner is limited, when there is a large number of couplers, multiple dividing combiners may be cascaded (referring to FIG. 8l). That is, multiple dividing combiners are cascaded to form a large dividing combiner that functions as the dividing combiner in the foregoing FIG. 8k.

After the specific structure of the coupling disc is introduced, the following specifically introduces FIG. 8f to FIG. 8j FIG. 8f shows an improved solution for the solution shown in FIG. 8a, and all information mentioned about FIG. 8a is applicable to FIG. 8f, which is not repeated again herein.

An embodiment shown in FIG. 8g is a simplification for the embodiment shown in FIG. 8f, and the difference between the two embodiments lies in that a UE simulator in the embodiment shown in FIG. 8g does not need to feed back a downlink channel estimation value to a base station by using a data cable, but directly feeds back the downlink channel estimation value to the base station by using the dividing combiner N.

An embodiment shown in FIG. 8h is an improvement to the embodiment shown in FIG. 8b. All things mentioned about FIG. 8b are applicable to FIG. 8h, which are not repeated again herein. In addition, besides the manner provided in FIG. 8b, the embodiment shown in FIG. 8h may further feed back uplink/downlink estimation values in the following manner: The common $UE_A$ feeds back downlink channel estimation value information of all base stations to one base station (assuming that it is BS0), the base stations except BS0 feed back their respective uplink channel estimation value information to an interconnected calculating unit 801, BS0 feeds back uplink channel estimation value information of BS0 and the downlink channel estimation value information of all base stations to the interconnected calculating unit 801, and after calculating self-correction coefficients of all base stations, the interconnected calculating unit 801 distributes the self-correction coefficients; or, the common $UE_A$ feeds back the downlink channel estimation value information of all base stations to the base stations separately, the base stations feed back the uplink channel estimation value information and downlink channel estimation value information of the base stations to an interconnected calculating unit 801, and after calculating self-correction coefficients of all base stations, the interconnected calculating unit 801 distributes the self-correction coefficients.

An embodiment shown in FIG. 8i is an improvement to the embodiments shown in FIG. 8c and FIG. 8d. All things mentioned about FIG. 8c and FIG. 8d are applicable to FIG. 8i, which are not repeated again herein.

An embodiment shown in FIG. 8j is a simplification for the embodiment shown in FIG. 8i, and the difference between the two embodiments lies in that a UE simulator in the embodiment shown in FIG. 8j does not need to feed back a downlink channel estimation value to a base station by using a data cable, but directly feeds back the downlink channel estimation value to the base station by using the dividing combiner N.

During specific implementation, in the embodiments shown in FIG. 8a to FIG. 8j, besides the aforementioned CRS reference signal, a downlink correction signal may also be a CSI-RS (Channel State Information-Reference Signal) reference signal, or may be a private downlink reference signal (manufacturer customized downlink reference signal); and besides the aforementioned SRS reference signal, an uplink correction signal may also be a DMRS reference signal, or may be a private uplink reference signal (manufacturer customized uplink reference signal). It should be noted that the reference signal may also be referred to as a pilot signal or a training sequence.

Figure 8M:
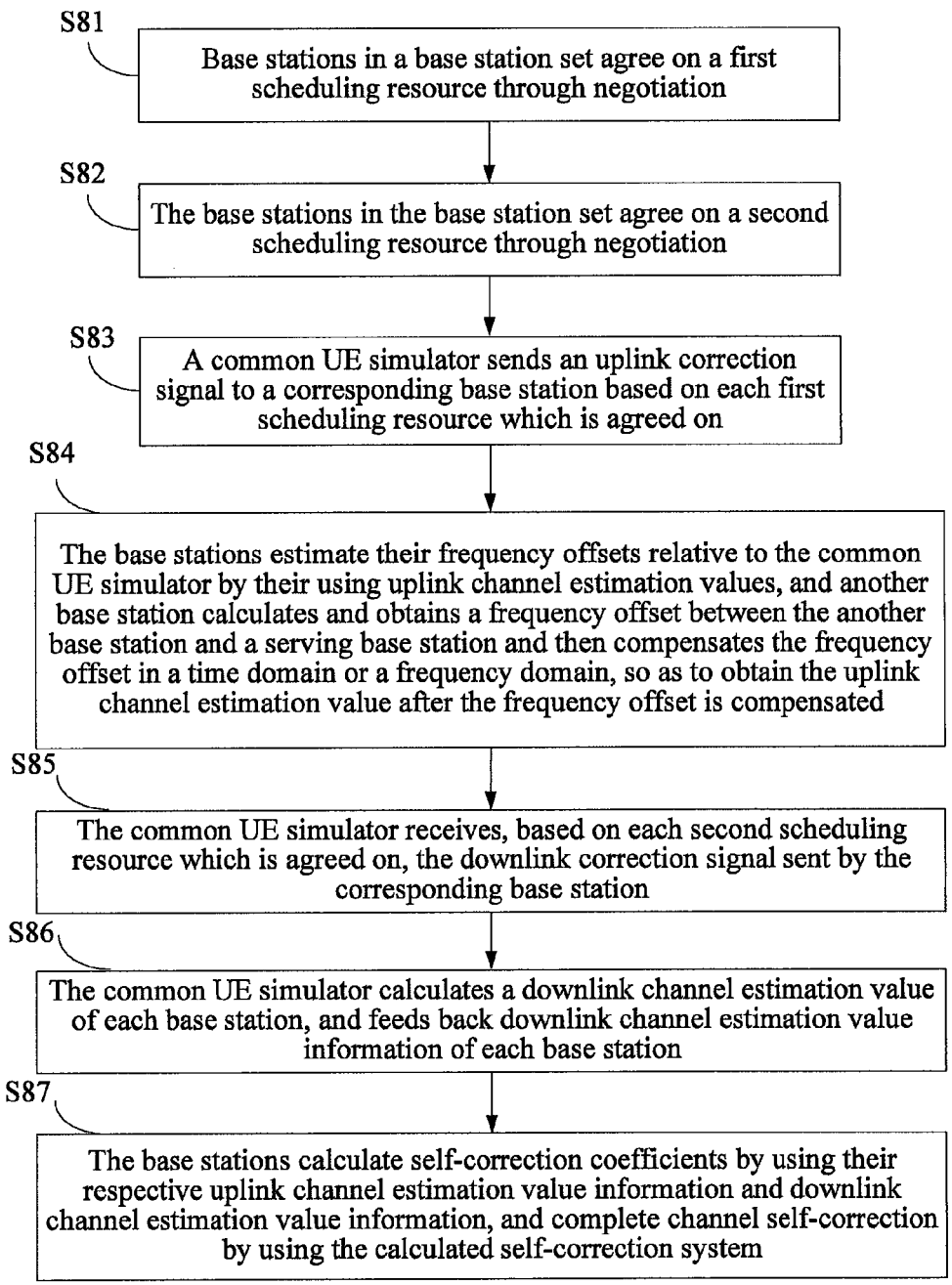
FIG. 8m is another flowchart of a joint channel correction method according to an embodiment of the present invention.

Except FIG. 8h, the embodiments shown in FIG. 8a to FIG. 8j may follow the following procedures to complete joint channel self-correction (referring to FIG. 8m). Because in FIG. 8a to FIG. 8j, a same UE simulator is used as a common reference transmit end and a common reference receive end, the following description directly uses a common UE simulator as an alternative name of the common reference transmit end and the common reference receive end. It can be understood by a person skilled in the art that, using different UE simulators separately as the common reference receive end and the common reference receive end may also follow the following procedures. Moreover, for the purpose of convenience, the following description uses an example in which a base station set has two base stations (BS0 and BS1) for introduction. Notes: that one base station is corresponding to one cell is used as an example for description herein, and the processing method is the same for a scenario where one base station includes multiple cells, and therefore no particular description is provided.

S81: Base stations in a base station set agree on, through negotiation, scheduling configuration information based on which an uplink correction signal is transmitted between each base station and a common UE simulator. The scheduling configuration information at least includes a time-frequency resource.

S82: The base stations in the base station set agree on, through negotiation, scheduling configuration information based on which a downlink correction signal is transmitted between each base station and the common UE simulator. The second scheduling configuration information at least includes a time-frequency resource.

It should be noted that, for convenience of distinction, the scheduling configuration information based on which an uplink correction signal is transmitted between each base station and the common UE simulator may be referred to as first scheduling configuration information, and the time-frequency resource included in the first scheduling configuration information may be referred to as a first time-frequency resource; and the scheduling configuration information based on which a downlink correction signal is transmitted between each base station and the common UE simulator may be referred to as a second scheduling configuration information, and the time-frequency resource included in the second scheduling configuration information may be referred to as a second time-frequency resource. That is, the first time-frequency resource and the second time-frequency resource are the time-frequency resource occupied by the uplink correction signal and the time-frequency resource occupied by the downlink correction signal respectively.

In addition, the steps S81 and S82 may be performed together or separately. If the steps S81 and S82 are performed separately, the execution sequence is interchangeable, as long as it is ensured that the first scheduling configuration information is agreed on before the common UE simulator sends the uplink correction signal to each base station in the base station set, and that the second scheduling configuration information is agreed on before the common UE simulator receives the downlink correction signal sent by each base station in the base station set.

For ease of understanding, a time-frequency resource is introduced briefly. Using an LTE system as an example, the LTE has time domain and frequency domain resources (that is, time-frequency resources with the minimum granularity of an RE), and an RB (Resource Block) is a minimum unit of service resource scheduling in the LTE. The RB includes multiple REs (Resource Elements). The RB is of a two-dimensional structure and includes a time domain symbol and a frequency domain subcarrier. The RE is one subcarrier on one time domain symbol. The LTE includes a total of 1024 subcarriers, where only 600 subcarriers are effective and correspond to a total of 50 RBs.

The length of each RB time domain is 1 ms, as shown in Table 1 (0.5 ms of time domain length):

TABLE 1

| Configuration | | $N_{sc}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

Figure 8N:
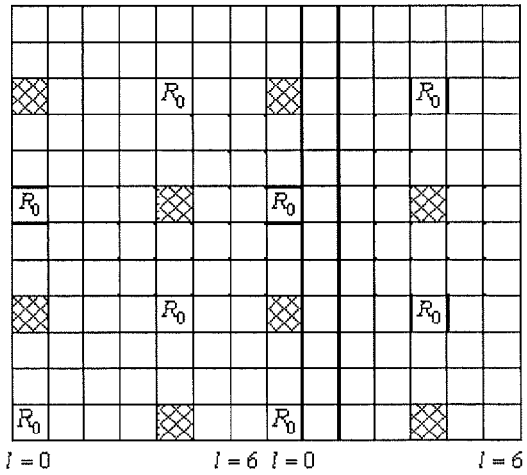
FIG. 8n and FIG. 8o are downlink pilot patterns according to an embodiment of the present invention.
Figure 8O:
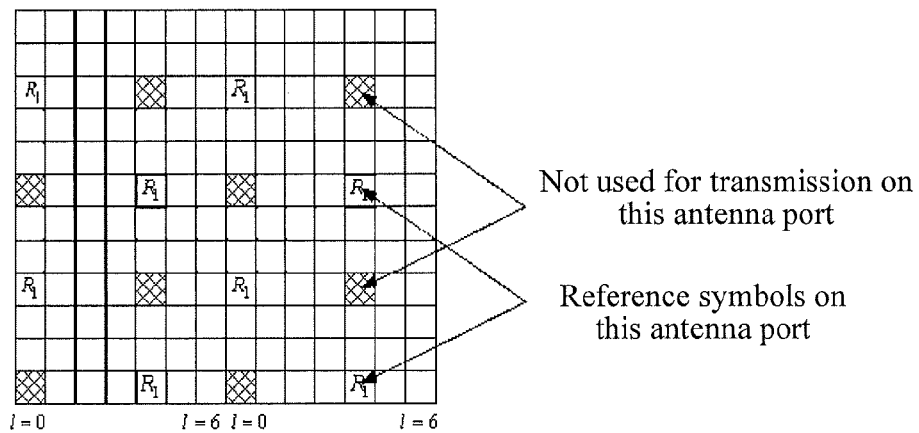

In Table 1, $N_{sc}^{RB}$ is the number of subcarriers in one RB (a subscript SC is an abbreviation of subcarrier, which denotes subcarrier), Δf is a bandwidth of one subcarrier, and $N_{symb}^{DL}$ denotes the number of OFDM symbols included in 0.5 ms (a superscript DL is an abbreviation of downlink, which denotes downlink; and a subscript Symb is an abbreviation of symbol, which denotes an OFDM symbol), where Normal cyclic prefix and Extended cyclic prefix denote the CP (Cyclic Prefix) type of the OFDM symbol, and Extended cyclic prefix applies to a large coverage scenario. Because the numbers of OFDM symbols of different CP types in one RB are different, pilot patterns may also vary, but final principles are the same. The following description uses the Normal CP as an example. By using a CRS reference signal as an example, FIG. 8n and FIG. 8o separately show pilot patterns of downlink CRSs, in one RB, of two antennas T0 and T1 of a same base station, and other RBs have similar patterns. In FIG. 8n and FIG. 8o, each small box indicates one RE, and the RE is identified by using (k, l), where l denotes a sequence number of an OFDM symbol, and k denotes a sequence number of a subcarrier. In addition, for uplink, l denotes a sequence number of an SCFDMA symbol.

In addition, R0 in FIG. 8n denotes a downlink pilot position of the antenna T0, and R1 in FIG. 8o denotes a downlink pilot position of the antenna T1. In FIG. 8o, Not used for transmission on this antenna port denotes: not transmitting data on a time-frequency resource RE corresponding to the antenna port (correspondingly, the other antenna transmits a pilot on the RE), and Reference symbols on this antenna port denotes: transmitting a pilot on the time-frequency resource RE corresponding to the antenna port.

It should be noted that, the pilot patterns of downlink CRSs, in one RB, of different base stations may be the same, or may be different.

S83: The common UE simulator sends the uplink correction signal to a corresponding base station based on each piece of first scheduling configuration information which is agreed on (that is, each base station receives, based on the first resource which is agreed on, the uplink correction signal sent by the common UE simulator), so that each base station performs its respective uplink channel estimation according to the received uplink correction signal, so as to obtain an uplink channel estimation value.

To send the uplink correction signal, the common UE simulator needs to access a cell managed by a certain base station, and the cell/base station provides services for the common UE simulator. The cell/base station that provides services for the common UE simulator and is capable of controlling the common UE simulator is referred to as a serving cell/base station of the common UE simulator.

It is assumed that BS0 is a serving base station of the common UE simulator, and BS0 configures the first scheduling configuration information which is agreed on for the common UE simulator, where the first scheduling configuration information may include first time-frequency resource information, uplink correction signal sequence configuration information, power control information and the like.

All base stations in the base station set may receive, based on the first time-frequency resource which is agreed on, the uplink correction signals simultaneously, and more specifically, there are two manners for receiving the uplink correction signals simultaneously.

A first manner is: BS0 and BS1 use an X2 interface or a private interface to exchange configuration parameters (for example, uplink correction signal sequence configuration information) of the uplink correction signals and the first time-frequency resource information. It is assumed that the common UE simulator accesses a cell managed by BS0, BS0 configures the time-frequency resource information (that is, the foregoing RB) which is agreed on for the common UE simulator for transmitting an uplink correction reference signal, the uplink correction signal sequence configuration information, the power control information and the like, and the common UE simulator transmits the uplink correction signals on the first time-frequency resource which is agreed on.

Because BS0 and BS1 have exchanged the configuration parameters, BS1 may not perform scheduling on these time-frequency resources. Therefore, BS0 and BS1 may receive the uplink correction signals sent by the common UE simulator simultaneously, and further separately calculate their respective the uplink channel estimation values according to the received uplink correction signals.

By using the LTE as an example, the common UE simulator transmits the uplink correction signals to BS0 on the RE which is agreed on, and BS1 does not perform scheduling at the same RE position, so that BS0 and BS1 may receive the uplink correction signals sent by the common UE simulator simultaneously, and further separately calculate their respective uplink channel estimation values according to the received uplink correction signals.

A second manner is: BS0 and BS1 use an X2 interface or a private interface to exchange configuration parameters (for example, uplink correction signal sequence configuration information) of the uplink correction signals and first time-frequency resource information. It is assumed that the common UE simulator accesses a cell managed by BS0, BS0 configures the time-frequency resource information (that is, the foregoing first time-frequency resource) which is agreed on for the common UE simulator for transmitting an uplink correction reference signal, the uplink correction signal sequence configuration information, the power control information and the like, and the common UE simulator transmits the uplink correction signals on the time-frequency resource which is agreed on.

Because BS0 and BS1 have exchanged the configuration parameters, on the time-frequency resource which is agreed on, BS1 may instruct, according to the uplink correction signal sequence configuration information configured by BS0 for the common UE simulator, an ordinary user terminal in a cell of BS1 to transmit uplink pilot signals in a code division manner. Therefore, BS1 may simultaneously receive the uplink pilot signals (uplink correction signals) transmitted by the common UE simulator, and the uplink pilot signal transmitted by the ordinary user terminal in this cell in a code division manner.

For the second manner, BS0 may calculate the uplink channel estimation value according to the received uplink correction signals, and BS1 may complete, by using code division characteristics of the received different uplink correction signals, the channel estimation to obtain the uplink channel estimation value.

Still by using the LTE as an example, the common UE simulator transmits the uplink correction signals to BS0 on the RE which is agreed on, and BS1 schedules, at the same RE position, the ordinary user terminal in this cell by adopting code division configuration.

After that, BS0 directly calculates the uplink channel estimation value of BS0 according to the received uplink correction signals; and BS1 may simultaneously receive, at the same RE position, the uplink pilot signals (uplink correction signals) transmitted by the common UE simulator, and the uplink pilot signals transmitted by the ordinary user terminal in this cell in a code division manner. BS1 may further complete, by using the code division characteristics of the different uplink correction signals received, channel estimation to obtain the uplink channel estimation value.

In addition, the common UE simulator may also first access BS0, and then transmit the uplink correction signals to BS0 on the RE which is agreed on. BS1 schedules, at the same RE position, the ordinary user terminal in this cell by adopting code division configuration or remains silent. Then, the common UE simulator accesses BS1, and then transmits the uplink correction signals to BS1 on the RE which is agreed on. BS0 schedules, at the same RE position, the ordinary user terminal in this cell by adopting code division configuration or remains silent.

Certainly, in consideration of the precision, the common UE simulator preferably only accesses a cell managed by one base station.

S84: The base stations estimate their frequency offsets relative to the common UE simulator by using their uplink channel estimation values (that is, the base stations in the base station set estimate their frequency offsets relative to the common UE simulator by using their uplink channel estimation values); and a serving base station transmits a frequency offset value between the serving base station and the common UE simulator to another base station over an X2 interface or a private interface, the another base station calculates a frequency offset between the another base station and the serving base station (a frequency offset between the base stations) according to the frequency offset value of the serving base station and the frequency offset value of the another base station, and then the another base station compensates the frequency offset in a time domain or a frequency domain, so as to obtain the uplink channel estimation value after the frequency offset is compensated.

Meanwhile, for CoMP JT (Joint Transmission), a coordinated base station and the serving base station (a base station participating in coordination is referred to as a coordinated base station) need frequency synchronization. Therefore, another base station (that is, the coordinated base station) may decide, according to the magnitude of the frequency offset between the base stations, whether a local frequency needs to be adjusted. The adjustment may be performed in one step or multiple steps. Certainly, frequency offset compensation may be performed in the time domain, and then transmitted in a JT manner.

S85: The common UE simulator receives, based on each piece of second scheduling configuration information which is agreed on, the downlink correction signal sent by the corresponding base station.

To receive the downlink correction signal, the common UE simulator also needs to access a cell managed by a certain base station, and the cell/base station provides services for the common UE simulator. It is assumed that BS0 is a serving base station of the common UE simulator.

In a case where the downlink pilot patterns are the same, that is, when the base stations in the base station set are based on the same second time-frequency resources, there are at least the following two manners for receiving the downlink correction signal.

A first manner is: All base stations in the base station set send, based on the second time-frequency resource, the downlink correction signals in a code division manner, that is, the common UE simulator receives the downlink correction signals sent by all base stations in the base station set in a code division manner. For example, on the same time-frequency resources, BS0 and BS1 transmit the downlink correction signals in a code division manner. In the first manner, the downlink correction signal sequence configuration information needs to be exchanged between the base stations.

Still by using the LTE as an example, BS0 and BS1 may transmit, at the same RE position, the downlink correction signals to the common UE simulator in a code division manner.

A second manner is: The common UE simulator receives, according to a preset sequence, the downlink correction signal sent by each base station based on the second time-frequency resource, and when any base station sends the downlink correction signal, another base station remains silent on the second time-frequency resource occupied by the base station that sends the downlink correction signal. In the second manner, the downlink correction signal sequence configuration information does not need to be exchanged between the base stations.

Still by using the LTE as an example, the common UE simulator may first access a cell managed by BS0, and receive, at the RE position which is agreed on, the downlink correction signal delivered by BS0. Meanwhile, BS1 remains silent at the same RE position. Subsequently, the common UE simulator switches to the cell managed by BS1, and receives, at the RE position which is agreed on, the downlink correction signal delivered by BS1, while BS0 remains silent at the same RE position.

Alternatively, the common UE simulator accesses a cell managed by BS0, and receives, at the RE position which is agreed on, the downlink correction signal delivered by BS0. Meanwhile, BS1 remains silent at the same RE position. Subsequently, the common UE simulator still resides in the cell managed by BS0, but receives, at a certain RE position in a next period, the downlink correction signal delivered by BS1, while BS0 remains silent at the RE position where BS1 sends the downlink correction signal.

To ensure the self-correction precision, it is preferred not to switch the common UE simulator to a cell managed by another base station.

In a case where the pilot patterns are different, that is, when the base stations in the base station set are based on different second time-frequency resources, the common UE simulator may receive, based on different second time-frequency resources, the downlink correction signal sent by each base station, and when any base station sends the downlink correction signal, another base station remains silent at the second time-frequency resource occupied by the base station that sends the downlink correction signal.

For example, if BS0 and BS1 transmit the downlink correction signals on different time-frequency resources, BS1 remains silent on the time-frequency resource where BS0 transmits the downlink correction signal. Likewise, BS0 remains silent on the time-frequency resource where BS1 transmits the downlink correction signal.

Still by using the LTE as an example, the common UE simulator may first access a cell managed by BS0, and receive, at the RE position which is agreed on, the downlink correction signal delivered by BS0. Meanwhile, BS1 remains silent at the same RE position. Subsequently, the common UE simulator switches to the cell managed by BS1, and receives, at another RE position which is agreed on, the downlink correction signal delivered by BS1, while BS0 remains silent at the same RE position. Alternatively, BS1 also remains silent at the RE position where BS0 sends the downlink correction signal, and BS0 also remains silent at the RE position where BS1 sends the downlink correction signal. The common UE simulator accesses the cell managed by BS0, and receives, at the RE position which is agreed on, the downlink correction signals delivered by BS0 and BS1. Because the REs occupied by the downlink correction signals of BS0 and BS1 are different, downlink channel information of BS0 and BS1 may be obtained simultaneously through the channel estimation.

To ensure the self-correction precision, it is preferred not to switch the common UE simulator to a cell managed by another base station.

It should be noted that: if the precision of the frequency synchronization between the base stations cannot meet a specified requirement, for example, 0.02 ppm (part per million, part per million), the execution sequence of steps S83 to S85 must be S83, S84 and S85. If the precision of the frequency synchronization between the base stations meets the specified requirement, the step for frequency synchronization between the base stations is not needed. In this case, step S84 may be omitted, and the execution sequence of step S83 and step S85 is interchangeable.

S86: The common UE simulator calculates the downlink channel estimation value of each base station, and feeds back downlink channel estimation value information of each base station.

The downlink channel estimation value information of each base station may include the following content:

1) Original downlink channel estimation value.

As mentioned above, the LTE includes a total of 1024 subcarriers, where 600 subcarriers are effective and correspond to a total of 50 RBs. Each RE in each RB corresponds to one original downlink channel estimation value. To save the overhead, original downlink channel estimation values corresponding to one or more pilot OFDM/SC-FDMA symbols may be extracted and fed back (extracted from a time domain), or original downlink channel estimation values corresponding to a part of subcarriers may be extracted and fed back (extracted from a frequency domain). To further reduce the overhead, a manner of time domain extraction+ frequency domain extraction may also be adopted.

Alternatively, delay tap information (in the time domain) may be directly fed back. The original downlink channel estimation value is expressed in a form of the frequency domain, and may be converted into a value in a form of the time domain, that is, converted into the delay tap information.

2) Phase information of the original downlink channel estimation value.

The original downlink channel estimation value is in a form of $Ae^x$, where A is the amplitude and x is the phase. During feedback, the amplitude of the original downlink channel estimation value may be ignored, only the phase information thereof is fed back, and the phase information is quantized. For example, if 1 degree is used as a quantization unit, 9 bits may be adopted to feed back the phase information ($2^9=512>360$), and if 2 degrees are used as a quantization unit, 8 bits may be adopted to feed back the phase information.

To further reduce the feedback overhead, the phase information in the original downlink channel estimation value may be extracted in a process that is similar to that in the foregoing description.

3) Adopt a feedback mechanism based on a PMI (Precoding Matrix Index) codebook, where the PMI codebook corresponds to a circumferential phase, and is fed back according to a subband (the subband includes subcarrier clusters). The common UE simulator only needs to feed back a PMI index number.

More specifically, the common UE simulator feeds back the downlink channel estimation value of each base station in the following manners:

First manner: The common UE simulator separately accesses a cell managed by each base station in the base station set. The common UE simulator accesses a cell managed by a base station, and the base station is used as a serving base station. Then, under the scheduling of the serving base station, the common UE simulator feeds back the downlink channel estimation value information of the serving base station, which is carried in service data, to the serving base station.

For example, the common UE simulator first accesses a cell managed by BS0, and feeds back the downlink channel estimation value of BS0 to BS0 in service data. Then, the common UE simulator accesses a cell managed by BS1, and feeds back the downlink channel estimation value of BS1 to BS1 in service data.

Second manner: Under the scheduling of the serving base station, the common UE simulator feeds back downlink channel estimation value information of all base stations in the base station set, which is carried in service data, to the serving base station. Then, the serving base station distributes a downlink channel estimation value of another base station in the base station set to the another base station.

For example, the common UE simulator feeds back the downlink channel estimation values of all base stations, which is carried in service data, to BS0 used as the serving base station. Then, BS0 distributes the downlink channel estimation value of BS1 to BS1.

Third manner: The serving base station instructs another base station to schedule the common UE simulator to feed back scheduling configuration information (time-frequency resource, modulation manner, coding manner, and the like) on which the service data is based, or the serving base station and another base station negotiate to instruct the common UE simulator to feed back scheduling configuration information on which the service data is based; and under the scheduling of the serving base station, the common UE simulator feeds back the downlink channel estimation values of all base stations in the base station set, which is carried in service data, to the serving base station, and another base station does not perform scheduling on the same time-frequency resource, so that the another base station may also receive the service data sent by the common UE simulator.

For example, BS0 and BS1 use an X2 interface or a private interface to exchange configuration parameters that are used to instruct the common UE simulator to feed back service data. For example, the common UE simulator accesses a cell managed by BS0, BS0 configures the time-frequency code resource information, the modulation manner and the coding manner that are agreed on and used to transmit the service data for the common UE simulator, and the common UE simulator transmits, on the time-frequency resource which is agreed on, the service data that carries the downlink channel estimation value information.

Still by using the LTE as an example, because BS0 and BS1 have exchanged the configuration parameters, BS0 receives, on an RE, the service data that carries the downlink channel estimation value information and is sent by the common UE simulator, and BS1 may not perform scheduling on the same RE, BS0 and BS1 may receive the service data sent by the common UE simulator simultaneously, further separately demodulate and decode the service data and extract, from the service data, the downlink channel estimation value information that belongs to BS0 and BS1.

Alternatively, BS0 receives, on the RE, the service data that carries the downlink channel estimation value information and is sent by the common UE simulator, and BS1 may instruct, on the same RE, an ordinary user terminal of a cell of BS1 to transmit the service data in a code division manner. Therefore, BS0 and BS1 may receive the service data sent by the common UE simulator simultaneously, further separately demodulate and decode the service data and extract, from the service data, the downlink channel estimation value information that belongs to BS0 and BS1.

In the second manner and the third manner, when feeding back the downlink channel estimation value information, the common UE simulator only needs to access one base station, and feed back the downlink channel estimation value information of all base stations to the base station.

Further, in any manner, the foregoing scheduling may include the following three manners:

Manner 1: The serving base station allocates fixed scheduling configuration information (time-frequency resource, modulation manner and coding manner) to the common UE simulator, so that the common UE simulator sends, according to the allocated fixed resources and the fixed modulation and coding manner, the service data that carries the downlink channel estimation value information.

Manner 2: The serving base station instructs, in a preferential scheduling manner, the common UE simulator to send the service data that carries the downlink channel estimation value information.

Manner 3: The serving base station instructs, in an ordinary scheduling manner, the common UE simulator to send the service data that carries the downlink channel estimation value information.

Moreover, manners 2 and 3 may be further used in combination with at least one of a manner of reducing MCS transmission (reducing a modulation order) and a manner of reducing a coding bit rate. By using the reducing a modulation order as an example, when an uplink MCS of the common UE simulator is X1, the MCS may be reduced to the X1-Y order from X1. The MCS (Modulation and Coding Scheme) is an index number and corresponds to combinations of different modulations such as QPSK, 16QAM, and 64QAM and different channel coding bit rates. A higher index number denotes a higher modulation and coding rate, and a higher demodulation threshold. Reducing the MCS is to ensure correct transmission of the service data that carries the downlink channel estimation value information.

The aforementioned three scheduling manners may be freely combined with three feedback manners of the common UE simulator, which are not repeated again herein.

S87: The base stations calculate self-correction coefficients by using their respective uplink channel estimation value information and downlink channel estimation value information, and complete the channel self-correction by using the calculated self-correction system.

In other embodiments, before a common UE simulator used as a common reference receive end feeds back the downlink channel estimation value information of each base station, the foregoing method may further include:

constructing, by the UE simulator used as the common reference receive end, the service data that carries the downlink channel estimation value information.

More specifically, the UE simulator used as the common reference receive end packetizes the downlink channel estimation value information into bit stream data, and performs upper-layer related processing, such as IP layer processing, PDCP layer processing, or RLC layer processing, on the bit stream data. An IP (Internet Protocol) layer, a PDCP (Packet Data Convergence Protocol) layer, and an RLC (Radio Link Control) layer are protocol layers for LTE user plane data processing.

Figure 8P:
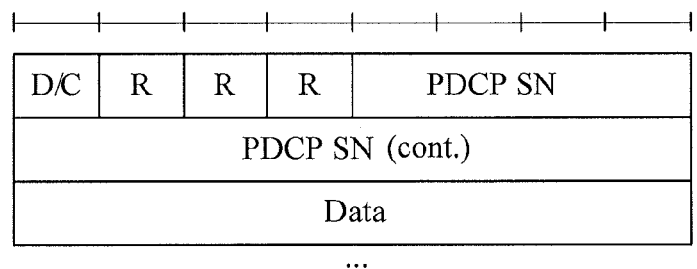
FIG. 8p is a schematic diagram of a service data format according to an embodiment of the present invention.

For one of formats of the service data after being process at an upper layer, reference may be made to FIG. 8p (FIG. 8p shows a header of the service data). In FIG. 8p: a symbol Oct denotes 8 bits as a group; a symbol SN denotes a Sequence number; a symbol D/C denotes a data/control field, the length is 1 bit, and whether the data is service data or control data is denoted by setting 0 or 1; and R is a reserved field, and in FIG. 8p, there are totally three reserved fields. In the embodiment of the present invention, one, two or three reserved fields may be used to indicate whether the service data carries downlink channel estimation value information used for correction. By using that one reserved field (a reserved field nearest to the D/C field) is used as an example, setting the reserved field to 1 indicates that the service data carries downlink channel estimation value information used for correction.

Correspondingly, after the base station receives the service data as shown in FIG. 8p, a MAC header, an RLC header, a PDCP header, an IP header and a UDP/TCP header need to be removed to obtain the downlink channel estimation value information. The foregoing downlink channel estimation value information may only include downlink channel estimation value information of one base station, or may include downlink channel estimation value information of multiple base stations, which is decided according to the feedback manner of the common UE simulator.

Correspondingly, in the embodiment shown in FIG. 8h, when joint channel self-correction is implemented, steps S81 to S85 may be adopted, then, a common $UE_A$ feeds back downlink channel estimation value information of all base stations to one base station (assuming that it is BS0), subsequently, other base stations except BS0 feed back their respective uplink channel estimation value information to an interconnected calculating unit 801, BS0 feeds back uplink channel estimation value information of BS0 and the downlink channel estimation value information of all base stations to the interconnected calculating unit 801, and after calculating self-correction coefficients of all base stations, the interconnected calculating unit 801 distributes the self-correction coefficients; or, the common $UE_A$ feeds back the downlink channel estimation value information of all base stations to the base stations separately, the base stations feed back the uplink channel estimation value information and downlink channel estimation value information of the base stations to an interconnected calculating unit 801, and after calculating self-correction coefficients of all base stations, the interconnected calculating unit 801 distributes the self-correction coefficients.

Alternatively, steps S81 to S84 may also be adopted, then the common $UE_A$ feeds back the downlink channel estimation value information of all base stations to the interconnected calculating unit 801, the base stations also feed back their respective uplink channel estimation value information to the interconnected calculating unit 801, and after calculating the self-correction coefficients of all base stations, the interconnected calculating unit 801 distributes the self-correction coefficients.

In all the foregoing embodiments, joint channel correction is completed through the channel self-correction, and the following embodiment in this specification provides another manner to complete joint channel correction.

It should be noted that, during actual multi-cell coordinated communications, a cell/base station that is providing services for a UE is referred to as a serving cell/base station of the UE, a candidate cell/base station that participates in coordination is referred to as a candidate coordinated cell/base station, and a cell/base station that participates in coordination is referred to as a coordinated cell/base station.

Only when signal strength of the serving cell and signal strength of the candidate coordinated cell are subject to some conditions, the candidate coordinated cell/base station can become the coordinated cell/base station. In the following description, BS0 or subscript 0 is used to denote the serving cell/base station, and BS1 or subscript 1 is used to denote the coordinated cell/base station, how to perform joint channel correction on the serving cell/base station and the coordinated cell/base station is introduced.

In this specification, BS0 and BS1 are used as examples first to obtain the following formula 7:

$$r = h_{DL}^{BS0} w_0 s_0 + h_{DL}^{BS1} w_1 s_1 + n$$

$$= \lambda_0 e^{j\theta_0} (h_{UL}^{BS0})^T ((h_{UL}^{BS0})^T)^H / \|h_{UL}^{BS0}\|_F s_0 +$$

$$\lambda_1 e^{j\theta_1} (h_{UL}^{BS1})^T ((h_{UL}^{BS1})^T)^H / \|h_{UL}^{BS1}\|_F s_0 + n$$

-continued $$= \lambda_0 e^{j\theta_0} \|h_{UL}^{BS0}\|_F s_0 + \lambda_1 e^{j\theta_1} \|h_{UL}^{BS1}\|_F s_0 + n$$

$$= \lambda_0 e^{j\theta_0} \cdot \left( \|h_{UL}^{BS0}\|_F + \frac{\lambda_1}{\lambda_0} e^{j(\theta_1 - \theta_0)} \|h_{UL}^{BS1}\|_F \right) s_0 + n$$

$$= \lambda_0 e^{j\theta_0} \|h_{UL}^{BS0}\|_F \cdot \left( 1 + \frac{\lambda_1}{\lambda_0} e^{j(\theta_1 - \theta_0)} \frac{\|h_{UL}^{BS1}\|_F}{\|h_{UL}^{BS0}\|_N} \right) s_0 + n$$

$$== \lambda_0 e^{j\theta_0} \|h_{UL}^{BS0}\|_F \cdot (1 + \varepsilon \cdot e^{j(\theta_1 - \theta_0)}) s_0 + n$$

It can be seen from the formula 7 that, because $\lambda_0 e^{j\theta_0} \neq \lambda_1 e^{j\theta_1}$, coherent superposition cannot be ensured at a UE side. Meanwhile, a received SINR waveform depends on $1+\varepsilon \cdot e^{j(\theta_1-\theta_0)}$.

If $\theta_0(k)-\theta_1(k)=\Delta\theta(k)$, $\Delta\theta(k)$ may be denoted as:

$$\Delta\theta(k) = \theta_{int} + \left( \frac{2\pi\tau}{N_{FFTSize}T_s} \right) k \quad \text{(formula 8)}$$

where $N_{FFTSize}$, denotes an FFT transform sequence length, such as 512 or 1024, $T_s$ denotes system sampling time, $\tau$ denotes a residual delay of a base station, $\theta_{int}$ denotes an initial phase, and $k=0, 1, \ldots, N_{FFTSize}-1$.

In the formula 8, the subcarrier number k is an independent variable, $\Delta\theta(k)$ is a dependent variable of k, $N_{FFTSize}$, $T_s$, $\tau$ and $\theta_{int}$ are constant coefficients, and $N_{FFTSize}$ and $T_s$ are known. Therefore, as long as specific values of $\tau$ and $\theta_{int}$ are known, a phase difference $\Delta\theta(k)$ between a serving cell/base station and a coordinated cell/base station on a $k^{th}$ subcarrier may be known according to the formula 8 (that is, the phase difference on each subcarrier is known), so that $\Delta\theta(k)$ may be used to perform joint channel correction. Its specific procedure is as follows:

It is assumed that on the $k^{th}$ subcarrier, the serving cell/base station after channel self-correction corresponds to the complex constant factor $\lambda_0 e^{j\theta_0(k)}$, and the coordinated cell/base station after channel self-correction corresponds to the complex constant factor $\lambda_1 e^{j\theta_1(k)}$. After the coordinated cell/base station obtains $\tau$ and $\theta_{int}$ or $\Delta\theta(k)$, a receive channel self-correction coefficient of the coordinated cell/base station may be multiplied by a joint channel receive compensation factor $$\frac{\lambda_0}{\lambda_1} e^{j(\theta_0(k)-\theta_1(k))}.$$

In this way, the complex constant factor corresponding to the coordinated cell/base station becomes $$\lambda_1 e^{j\theta_1(k)} \times \frac{\lambda_0}{\lambda_1} e^{j(\theta_0(k)-\theta_1(k))} = \lambda_0 e^{j\theta_0(k)},$$

which is equal to the complex constant factor $\lambda_0 e^{j\theta_0(k)}$ corresponding to the serving cell/base station, thereby implementing joint channel correction between the serving cell/base station and the coordinated cell/base station.

Alternatively, the transmit channel self-correction coefficient of the coordinated cell/base station may also be multiplied by a joint channel transmit compensation factor $$\left(\frac{\lambda_0}{\lambda_1}e^{j(\theta_0(k)-\theta_1(k))}\right)^{-1},$$

thereby also implementing the joint channel correction between the serving cell/base station and the coordinated cell/base station (more specifically, at a baseband side of the coordinated cell, the downlink transmit frequency domain signal $r^{BS1}_{i,DL}(k)$ that has completed self-correction compensation may be multiplied by the foregoing joint channel transmit compensation factor).

It can be known from the foregoing analysis that, the process of joint channel correction between the serving cell/base station and the coordinated cell/base station may be considered as a process of getting undetermined coefficients $\tau$ and $\theta_{int}$. Determine values of the undetermined coefficients $\tau$ and $\theta_{int}$, in combination with a value law between k and $\Delta\theta(k)$, or a relationship between k, or $\Delta\theta(k)$ and other known parameters.

The inventor finds through creative exploration that, on a $k^{th}$ subcarrier, the following relationship exists between $\Delta\theta(k)$ and a BF gain value—BfGain(k):

By using a serving base station and a coordinated base station that are configured with a 2×1 antenna as examples, there is the following formula 9:

$$BfGain = \frac{SINR_{BF}}{SINR_{TxD}}$$

$$= \frac{E\left(\frac{|(|h_{BS0,0}|^2+|h_{BS0,1}|^2)+e^{j(\theta_1(k)-\theta_0(k))}(|h_{BS1,0}|^2+|h_{BS1,1}|^2)|^2}{\sigma_n^2 \cdot (|h_{BS0,0}|^2+|h_{BS0,1}|^2+|h_{BS1,0}|^2+|h_{BS1,1}|^2)}\right)}{E\left(\frac{|h_{BS0,0}|^2+|h_{BS0,1}|^2+|h_{BS1,0}|^2+|h_{BS1,1}|^2}{4\sigma_n^2}\right)}$$

$$= 4 \cdot E\left(\frac{|(|h_{BS0,0}|^2+|h_{BS0,1}|^2)+e^{j(\theta_1(k)-\theta_0(k))}(|h_{BS1,0}|^2+|h_{BS1,1}|^2)|^2}{||h_{BS0,0}|^2+|h_{BS0,1}|^2+|h_{BS1,0}|^2+|h_{BS1,1}|^2|^2}\right)$$

$$= 4 \cdot E\left(\frac{(|h_{BS0,0}|^2+|h_{BS0,1}|^2)}{||h_{BS0,0}|^2+|h_{BS0,1}|^2+|h_{BS1,0}|^2+|h_{BS1,1}|^2|^2}\right) \cdot$$

$$E\left(\left|1+e^{j(\theta_1(k)-\theta_0(k))}\frac{(|h_{BS1,0}|^2+|h_{BS1,1}|^2)}{(|h_{BS0,0}|^2+|h_{BS0,1}|^2)}\right|^2\right)$$

$$= 4 \cdot \varepsilon \cdot E\left(\left|1+e^{j(\theta_1(k)-\theta_0(k))}\frac{RSRP_{BS1}}{RSRP_{BS0}}\right|^2\right)$$

$$= 4 \cdot \varepsilon_1 \cdot E\left(|1+\varepsilon_2 \cdot e^{j\Delta\theta(k)}|^2\right)$$

$$= 4 \cdot \varepsilon_1 \cdot E\left(\left|1+\varepsilon_2 \cdot e^{j\left(\theta_{int}+2\pi\frac{k\tau}{N_{fftsize}\cdot T_s}\right)}\right|^2\right)$$

It can be seen from the formula 9 that, the expression of BfGain(k) is similar to that of $|1+\gamma e^{j(\theta_0(k)-\theta_1(k))}|^2$.

Again it is known that $$1+\gamma e^{j\Delta\theta} = 1+\gamma[\cos(\Delta\theta)+j\cdot\sin(\Delta\theta)]$$
$$= 1+\gamma\cos(\Delta\theta)+j\cdot\gamma\sin(\Delta\theta)$$

(the subcarrier number is omitted), and therefore $$|1+\gamma e^{j(\theta_0(k)-\theta_1(k))}|^2 = [1+\gamma\cos(\Delta\theta)]^2+\gamma^2\sin^2(\Delta\theta) \quad \text{(formula 10)}$$
$$= 1+2\gamma\cos(\Delta\theta)+\gamma^2\cos^2(\Delta\theta)+$$
$$\gamma^2\sin^2(\Delta\theta)$$
$$= 1+\gamma^2+2\gamma\cos(\Delta\theta)$$
$$= 1+\gamma^2+2\gamma\cos\left(\theta_{int}+2\pi\cdot\frac{k(\tau/T_s)}{N_{fftsize}}\right)$$

$$k = 0, 1, \ldots N_{FFTSize}-1$$

It can be known from the formula 10 that, BfGain(k) obeys the cosine wave distribution (or the sine wave distribution) when $k=0, 1, \ldots, N_{FFTSize}-1$. Moreover, k is an independent variable, BfGain(k) is a dependent variable of k, and the formula 10 also has the same constant coefficients $\tau$ and $\theta_{int}$.

Figure 9:
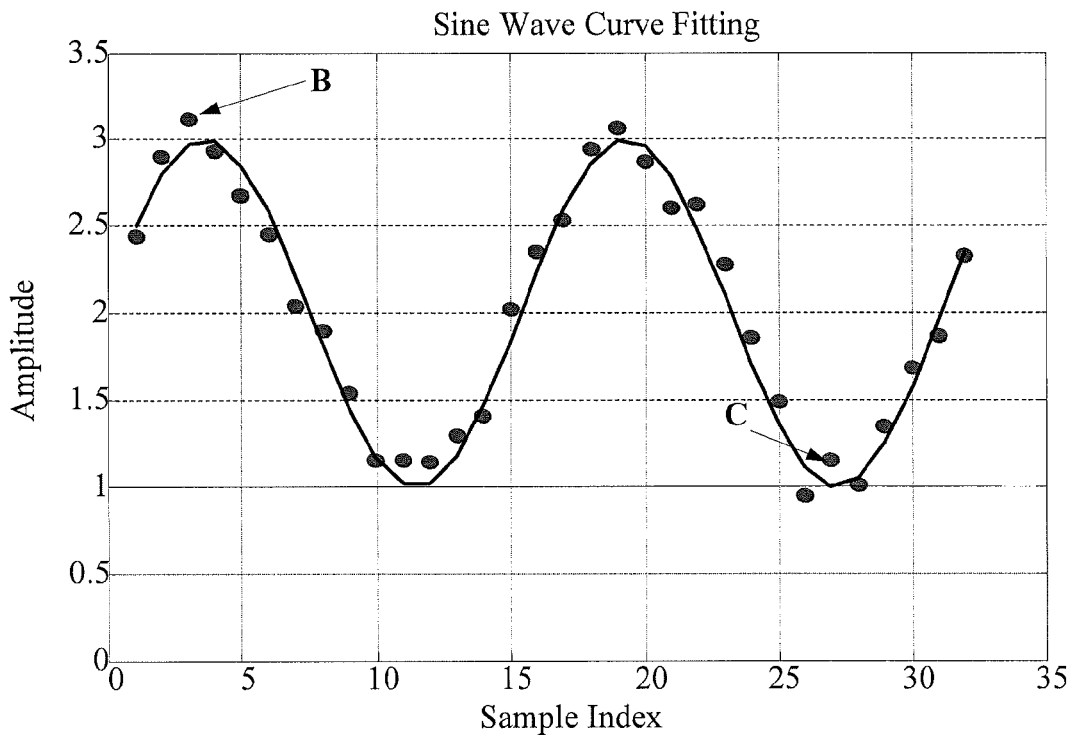
FIG. 9 is a schematic distribution diagram of a BF gain value according to an embodiment of the present invention.

Alternatively, referring to FIG. 9, after continuous BF gain cosine waves or sine waves are sampled $N_{FFTSize}$ times, the obtained $k^{th}$ sampling value is BfGain(k). Therefore, the BF gain value BfGain(k) of each subcarrier may be obtained, and the undetermined coefficients $\theta_{int}$ and $\tau$ may be obtained according to BfGain(k).

Because a full band totally includes 512 or 1024 subcarriers, it takes a long time to obtain the BF gain value of each subcarrier, and there are also a large number of operations that need to be performed. Therefore, every 2, 3, or 4 subcarriers (or another quantity) may form one minimum unit, and the minimum unit is used as the granularity for obtaining the BF gain value.

Figure 10:
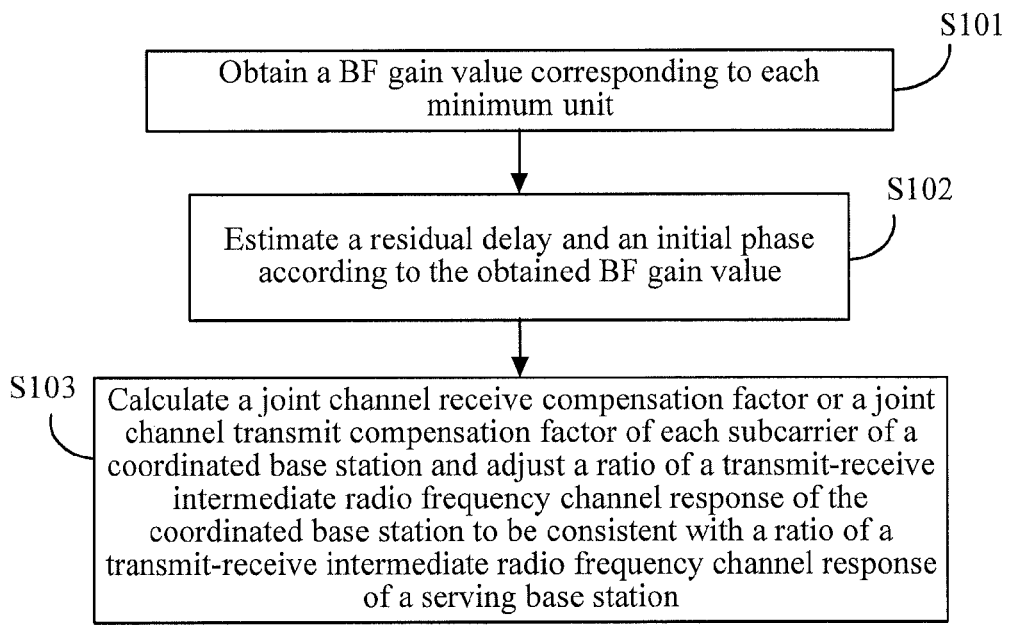
FIG. 10 is another flowchart of a joint channel correction method according to an embodiment of the present invention.
Figure 11:
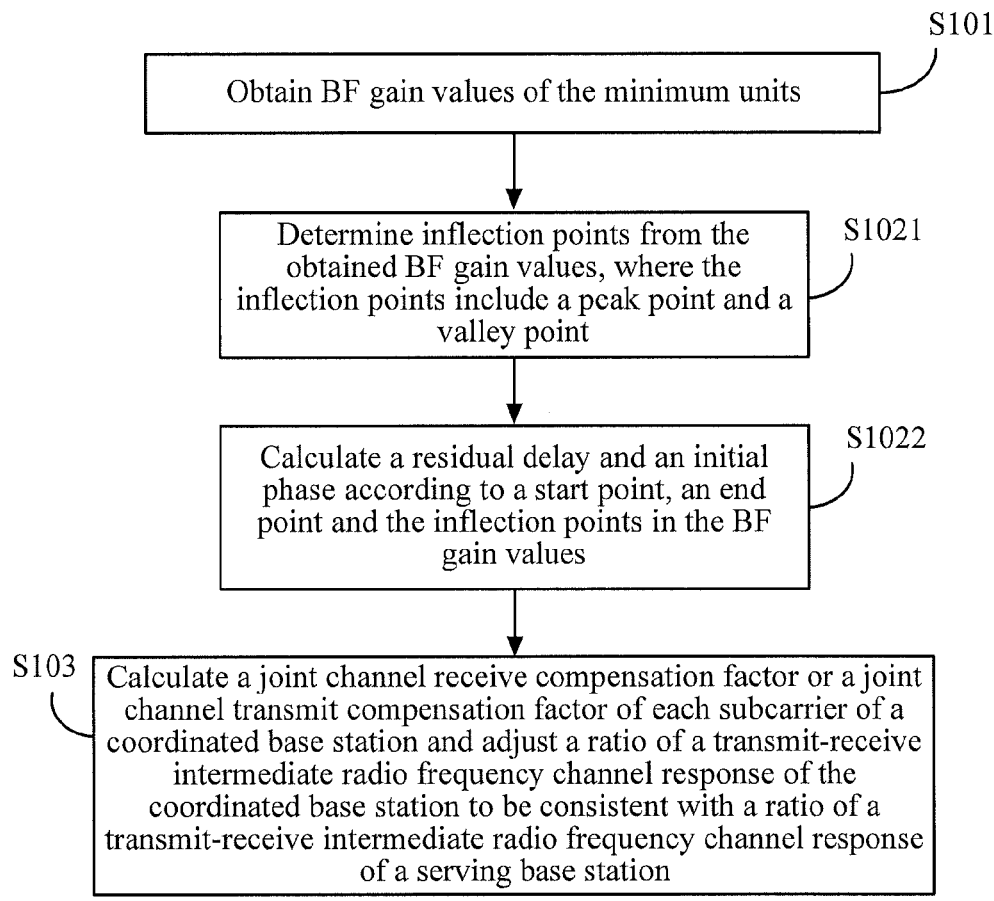
FIG. 11 is still another flowchart of a joint channel correction method according to an embodiment of the present invention.

Based on foregoing analysis, referring to FIG. 9 to FIG. 11, the embodiment of the present invention provides the following methods to implement joint correction:

S101: (A serving base station) obtains a BF gain value corresponding to each minimum unit (one minimum unit includes at least one subcarrier).

Before step S101, other embodiments of the present invention may further include the following step: dividing a full band into at least one minimum unit, for example, dividing a full band into 256 or 128 minimum units, so that a series of (256 or 128) gain values may be obtained in step S101.

S102: (The serving base station) estimates a residual delay $\tau$ and an initial phase $\theta_{int}$ according to the BF gain value.

S103: (The serving base station or a coordinated base station) completes joint channel correction between the serving base station and the coordinated base station according to the $\tau$ and $\theta_{int}$.

For how to obtain $\Delta\theta(k)$ by using $\tau$ and $\theta_{int}$, how to calculate a joint channel receive compensation factor or a joint channel transmit compensation factor according to $\Delta\theta(k)$, and how to implement joint channel correction by using the joint channel receive compensation factor or the joint channel transmit compensation factor, reference may be made to the foregoing records in this specification, and details are not described again herein.

Referring to FIG. 11, the step S102 may specifically include:

S1021: Determine inflection points in the BF gain values corresponding to the minimum units, where the determined inflection points include a peak point and a valley point.

S1022: Calculate $\tau$ and $\theta_{int}$ according to start points, end points and the inflection points in the foregoing series of BF gain values.

The inflection points may be margin inflection points or non-margin inflection points. The margin inflection points include a left margin inflection point and a right margin inflection point.

More specifically, $\tau$ and $\theta_{int}$ may be obtained at least by using the following two methods:

It is assumed that the number of peak points in the foregoing series of BF gain values is K, a maximum vertical distance between the peak point and the valley point is A, a vertical distance from the left margin inflection point B (an inflection point with a minimum horizontal distance to the start point) to the start point is X, a vertical distance from the right margin inflection point C (an inflection point with a maximum horizontal distance to the start point) to the end point is Y, and the number of valley points included in the margin inflection points is M. It should be noted that, because the inflection point is either a peak point or a valley point, the margin inflection point includes two valley points at most, and includes 0 valley point at least. That is, a maximum value of M is 2 and a minimum value is 0.

Method 1:

1. Calculate a decimal residual delay difference according to the formula $$\tau_{int} = (K-1)T_s + \frac{M}{2}T_s,$$

where $\tau_{int}$ denotes the decimal residual delay difference and K denotes the number of peak points.

2. Get arccosine of $$\left|\frac{A-2X}{A}\right|$$

in the interval (0°, 90°) to obtain an angle $\theta_{tmp,0}$ according to the vertical distance X from the start point to the left margin inflection point B.

3. If the left margin inflection point B is a peak point and X is less than $$\frac{A}{2},$$

determine that $\theta_{int}$ is in the fourth quadrant (270°, 360°), the initial phase $\theta_{int}=360-\theta_{tmp,0}$, and the first residual delay difference $\tau_{frac,left}$ is $$\frac{360-\theta_{tmp,0}}{360} \cdot T_s \text{ or } \frac{\theta_{int}}{360} \cdot T_s.$$

4. If the left margin inflection point B is a peak point and X is greater than $$\frac{A}{2},$$

determine that $\theta_{int}$ in the third quadrant (180°, 270°), the initial phase $\theta_{int}=180+\theta_{tmp,0}$, and $\tau_{frac,left}$ is $$\frac{180-\theta_{tmp,0}}{360} \cdot T_s \text{ or } \frac{360-\theta_{int}}{360} \cdot T_s.$$

5. If the left margin inflection point B is a valley point and X is greater than $$\frac{A}{2},$$

determine that the $\theta_{int}$ is in the first quadrant (0°, 90°), the initial phase $\theta_{int}=\theta_{tmp,0}$, and $\tau_{frac,left}$ is $$\frac{180-\theta_{tmp,0}}{360} \cdot T_s \text{ or } \frac{180-\theta_{int}}{360} \cdot T_s.$$

6. If the left margin inflection point B is a valley point and X is less than $$\frac{A}{2},$$

determine that the $\theta_{int}$ is in the second quadrant (90°, 180°), the initial phase $\theta_{int}=180-\theta_{tmp,0}$, and $\tau_{frac,left}$ is $$\frac{\theta_{tmp,0}}{360} \cdot T_s \text{ or } \frac{180-\theta_{int}}{360} \cdot T_s.$$

An optimal initial phase may be also obtained by using a method of exhaustion.

7. Calculate a second residual delay difference $\tau_{frac,right}$: getting arccosine of $$\left|\frac{A-2Y}{A}\right|$$

in the interval (0°, 90°) to obtain an angle $\theta_{tmp,0}$.

If the right margin inflection point C is a peak point and Y is less than $$\frac{A}{2},$$

$\tau_{frac,right}$ is $$\frac{\theta_{tmp,1}}{360} \cdot T_s.$$

If the right margin inflection point C is a peak point and Y is greater than $$\frac{A}{2},$$

$\tau_{frac,right}$ is $$\frac{180-\theta_{tmp,1}}{360} \cdot T_s.$$

If the right margin inflection point C is a valley point and Y is less than $$\frac{A}{2},$$

$\tau_{frac,right}$ is $$\frac{\theta_{tmp,1}}{360} \cdot T_s.$$

If the right margin inflection point C is a valley point and Y is greater than $$\frac{A}{2},$$

$\tau_{frac,right}$ is $$\frac{180-\theta_{tmp,1}}{360} \cdot T_s.$$

8. Obtain τ according to the formula $\tau=\tau_{int}+\tau_{frac,left}+\tau_{frac,right}$.

Method 2:

In the method 2, τ is estimated in a simplified manner, and the calculation of $\theta_{int}$ is the same as that in the method 1.

The estimation of τ includes:

calculating horizontal distances $l_1, l_2, \ldots l_{K-1}$ between multiple peak points, so that the period $T_l$ of the cosine wave corresponding to the BF gain value is $$T_l = \frac{l_1 + l_2 + \ldots + l_{K-1}}{K}$$

through fitting; and calculating a horizontal distance l between the start point and the end point, so that the residual delay of the base station is $$\tau = \frac{l}{T_l} T_s.$$

It should be noted that, when the minimum unit includes at least 2 subcarriers, to estimate τ and $\theta_{int}$ precisely, polynomial interpolation, linear interpolation or extrapolation processing may be performed on the obtained BF gain value of each minimum unit, so as to obtain the BF gain value corresponding to each subcarrier, and then the τ and $\theta_{int}$ are obtained by using the foregoing two methods.

By using that a full band includes 1024 subcarriers as an example, after the full band is divided into 256 minimum units (that is, each minimum unit includes 4 subcarriers), 256 BF gain values may be obtained by performing step S101. Then, polynomial interpolation or linear interpolation processing may be performed on the 256 BF gain values to obtain 1024 BF gain values.

The extrapolation processing generally applies to an OFDM system in which subcarriers with guard sidebands exist. If guard sideband subcarriers exist in the OFDM system, that is, in subcarriers 0, 1, . . . $N_{FFTSize}-1$ ($N_{FFTSize}=1024$), subcarriers K1, K1+1, . . . K1+N1−1 (K1=256, and K1+N1−1=768) are occupied by effective bandwidth, only BF gain values corresponding to subcarriers K1, K1+1, . . . , K1+N1−1 can only be obtained according to step S101 at most, that is, 512 BF gain values corresponding to 512 effective subcarriers can only be obtained at most.

Then, a BF gain value corresponding to the subcarrier K1 may be used as a start point, a BF gain value corresponding to the subcarrier K1+N1−1 may be used as an end point, and a delay τ' corresponding to the subcarriers K1 to K1+N1−1 is calculated according to the foregoing method 1 or method 2. Subsequently, the τ' needs to further be converted to obtain the actual delay τ by using the conversion formula $$\tau = \frac{N_{FFTSize}}{N1} \cdot \tau'.$$

The $\theta_{int}$ may be estimated by extrapolating cosine waveforms corresponding to the subcarriers K1, K1+1, . . . , K1+N1−1 into cosine waveforms of the subcarriers 0, 1, . . . $N_{FFTSize}-1$.

Alternatively, extrapolation processing may be also directly performed on the 512 BF gain values corresponding to the foregoing 512 effective subcarriers. That is, cosine waveforms corresponding to a $256^{th}$ subcarrier to a $768^{th}$ subcarrier are extrapolated into cosine waveforms corresponding to a $0^{th}$ subcarrier to a $1023^{th}$ subcarrier, thereby obtaining 1024 BF gain values corresponding to 1024 subcarriers. Then, according to the 1024 BF gain values obtained through extrapolation, τ and $\theta_{int}$ are obtained by using the foregoing method 1 or method 2.

After describing how to estimate τ and $\theta_{int}$, the following describes in detail how to obtain the BF gain value corresponding to the minimum unit in the foregoing step S101.

The BF gain value corresponding to the minimum unit may be obtained by using the following three solutions, and the three solutions all require use of an ordinary UE that works properly:

First Solution:

A) Assuming that a minimum correction period is X hours, start joint channel correction among multiple base stations in each period when the system load is light.

B) Select an edge UE with a full band CQI satisfying a preset condition as an auxiliary UE to perform correction measurement.

The preset condition may be: the CQI changes the least, or the CQI changes with an amplitude less than a preset value, a transmit correlation of a measuring UE is very high, or the like.

For a non-transparent solution in which a base station needs to send a signaling message to notify a UE that it is an auxiliary UE, when an auxiliary UE has multiple receiving antennas, to improve compensation precision, the auxiliary UE enables only one receiving antenna in a correction measurement process. The auxiliary UE may enable a certain receiving antenna according to the maximum RSRP, and other receiving antennas do no process received data In this case, a receiving measurement algorithm procedure of the auxiliary UE is processed according to multiple transmission channels of the base station and one receiving antenna of the UE. If the auxiliary UE supports the antenna selection, to improve the compensation precision, the serving base station may instruct the auxiliary UE to close the function, so that finally the auxiliary UE receives and sends a signal by means of a same antenna.

C) The auxiliary UE feeds back CQIs of all the minimum units to the serving base station, and the serving base station calculates the total transmit diversity SINR of all the minimum units according to the CQIs. The total transmit diversity SINR may be denoted by $SINR_{TxD}$, where subscript $_{TxD}$ denotes the transmit diversity.

The auxiliary UE may feed back the CQIs of all the minimum units in a one-step or multiple-step manner. Considering that the auxiliary UE needs to further continuously instruct a certain minimum unit to perform a downlink service in the following steps, feedback in the multiple-step manner is preferable.

In addition, to improve precision, the auxiliary UE may further measure and feed back the CQI of each minimum unit multiple times, and then the serving base station may obtain the final CQI corresponding to each minimum unit through averaging or filtering.

By using the LTE system as an example, the auxiliary UE may be configured to feed back the minimum correction period and the subband CQI of the minimum number of RBs (resources) (that is, the minimum number of RBs is used as the minimum unit), thereby obtaining the $SINR_{TxD}$ of each subband. The specific obtaining procedure is as follows:

Because the UE only feeds back the subband CQI of the serving cell (base station), the transmit diversity SINR—$SINR_{TxD,BS0}$ of each subband of the serving cell (base station) may be directly calculated according to a mapping relationship between the CQI and the transmit diversity SINR.

The $SINR_{TxD}$ satisfies the following formula 11:

$$SINR_{TxD} = E\left(\frac{|h_{BS0,0}|^2 + |h_{BS0,1}|^2 + |h_{BS1,0}|^2 + |h_{BS1,1}|^2}{4\sigma_n^2}\right) \quad \text{(formula 11)}$$

$$= \frac{E(|h_{BS0,0}|^2 + |h_{BS0,1}|^2) + E(|h_{BS1,0}|^2 + |h_{BS1,1}|^2)}{4 \cdot E(\sigma_n^2)}$$

$$= \frac{RSRP_{BS0} + RSRP_{BS1}}{4 \cdot E(\sigma_n^2)}$$

$$= \frac{(1+\alpha) \cdot RSRP_{BS0}}{4 \cdot E(\sigma_n^2)} = \frac{(1+\alpha)}{2} \cdot \frac{RSRP_{BS0}}{2 \cdot E(\sigma_n^2)}$$

$$= \frac{(1+\alpha)}{2} \cdot SINR_{TxD,BS0}$$

According to the formula 11, it can be known that $$SINR_{TxD} = \frac{(1+\alpha)}{2} \cdot SINR_{TxD,BS0} \quad \text{(formula 12)}$$

If denotation is made in a decibel manner, the formula 12 may be converted into:

$$SINR_{TxD,dB} = 10 \cdot \lg(1+\alpha) + 10 \cdot \lg(SINR_{TxD,BS0}) - 3 \quad \text{(formula 13)}$$

The subscript dB denotes that denotation is made in a decibel manner, and lg(X) denotes getting a 10-based logarithm of X.

It can be known from the formula 12 or 13 that, if $\alpha$ is obtained, the $SINR_{TxD}$ may be obtained.

As mentioned above, only when signal strength of the serving cell and signal strength of the candidate coordinated cell meet certain conditions, the candidate coordinated cell/base station can become the coordinated cell/base station. Actually, the serving base station calculates a ratio $|X_{dB}|$ of the signal strength of the serving cell to the signal strength of the candidate coordinated cell, and only when the signal strength $RSRP_{BS0,dB}$ of the serving cell and the signal strength $RSRP_{BS1,dB}$ of the candidate coordinated cell satisfy $|X_{dB}| \leq CoorThr_{dB}$ (RSRP is a measurement value fed back by a UE according to an LTE protocol, and $CoorThr_{dB}$ is a threshold for coordinated cell selection), the candidate coordinated cell can become a coordinated cell.

Again because:

$$RSRP_{BS0,dB} - RSRP_{BS1,dB} = X_{dB} \quad \text{(formula 14)}$$

$$10\lg\left(\frac{RSRP_{BS0}}{RSRP_{BS1}}\right) = X_{dB}$$

$$\frac{RSRP_{BS1}}{RSRP_{BS0}} = 10^{-0.1 \cdot X_{dB}} = \alpha$$

the serving cell (base station) obviously can obtain the specific value of $\alpha$ according to the formula $10^{-0.1 \cdot X_{dB}} = \alpha$.

Then, the specific values of $\alpha$ and $SINR_{TxD,BS0}$ are substituted into the formula 12, and the $SINR_{TxD}$ corresponding to each subband may be obtained.

Alternatively, the $SINR_{TxD}$ may also be obtained in another manner:

The serving cell (base station) instructs the auxiliary UE to feed back the transmit diversity CQI based on the subband, to obtain the foregoing $SINR_{TxD,BS0}$. Then the serving cell (base station) forcibly switches the auxiliary UE to a coordinated cell (base station). The auxiliary UE feeds back the transmit diversity CQI of the coordinated cell (base station) based on the same subband, and then may obtain the transmit diversity SINR, which is recorded as $SINR_{TxD,BS1}$, of the coordinated cell (base station) according to the mapping relationship between the CQI and the transmit diversity SINR. By using a 2T2R base station and a 1T1R auxiliary UE as an example (T denotes a receive channel, and R denotes a transmit channel), there are:

$$SINR_{TxD,BS0} = E\left(\frac{|h_{BS0,0}|^2 + |h_{BS0,1}|^2}{2\sigma_n^2}\right), \text{ and}$$

$$SINR_{TxD,BS1} = E\left(\frac{|h_{BS1,0}|^2 + |h_{BS1,1}|^2}{2\sigma_n^2}\right)$$

It can be known that a relationship among the $SINR_{TxD}$, the $SINR_{TxD,BS1}$ and the $SINR_{TxD,BS0}$ satisfies the following formula:

$$SINR_{TxD} = A \cdot SINR_{TxD,BS0} + B \cdot SINR_{TxD,BS1}, \text{ where } A \text{ and } B \text{ are constants.}$$

Finally, the $SINR_{TxD}$ may be calculated according to the formula $SINR_{TxD} = A \cdot SINR_{TxD,BS0} + B \cdot SINR_{TxD,BS1}$.

D). With respect to each minimum unit, the serving base station instructs the auxiliary UE to continuously send downlink signals on the minimum unit, so as to obtain a modulation and coding scheme corresponding to the minimum unit, and obtain the BF_SINR corresponding to each minimum unit according to a correspondence between the modulation and coding scheme and the BF_SINR (beamforming SINR), thereby obtaining the BF_SINRs of all minimum units.

Still by using the LTE system as an example, it is assumed that the serving base station instructs the auxiliary UE to continuously send downlink signals on a subband 1, adjusts an MCS (modulation and coding scheme) of the subband 1 to a suitable MCS according to an IBLER (initial block error rate), records the BF_SINR corresponding to the MCS, and traverses all subbands, thereby obtaining their respective BF_SINRs corresponding to all subbands.

It should be noted that, in the prior art, different CQIs correspond to different MCSs, and different MCSs correspond to different BF_SINRs. Therefore, with respect to a certain subband, after its MCS is adjusted to the suitable MCS according to the IBLER, the serving base station may obtain the BF_SINR corresponding to the subband according to the correspondence between the MCS and the BF_SINR E) Obtain the BF gain value corresponding to the minimum unit based on a relationship among the $SINR_{TxD}$, the BF_SINR and the BF gain value corresponding to the minimum unit.

Specifically, with respect to each minimum unit, the BF_SINR of the minimum unit may be used to subtract the $SINR_{TxD}$ of the minimum unit, thereby obtaining the BF gain value of the minimum unit. Then, the $\tau$ and $\theta_{int}$ may be estimated by using step S102.

Second Solution:

The second solution is similar to the first solution in general except that the first solution uses one edge UE as an auxiliary UE, but the second solution uses multiple edge UEs as auxiliary UEs, that is, operations on one auxiliary UE in the first solution are apportioned to the multiple auxiliary UEs.

Third Solution:

The DRS (demodulation reference signal/Dedicated RS) SINR measurement is added for the UE, thereby obtaining the BF_SINR corresponding to each minimum unit. Because the UE may be configured to support the subband CQI feedback and perform CQI measurement based on the transmit diversity, so that the UE may also obtain the $SINR_{TxD}$ of each minimum unit. Therefore, the UE may obtain the BF gain value corresponding to each minimum unit according to the foregoing record, thereby calculating the foregoing $\tau$ and $\theta_{int}$.

It should be noted that, in the third solution, the foregoing $\tau$ and $\theta_{int}$ may be calculated in two manners. In one manner, the UE itself calculates the $\tau$ and $\theta_{int}$, where for the calculation of the $\theta_{int}$, it may be considered that an existing PMI feedback mechanism is used, and a codebook is analogized to a PSK constellation to obtain an angle; and for $\tau$, it may also be considered that feedback is performed in a manner of quantizing channel information (the quantization step may be 2 ns).

In the other manner, the $\tau$ and $\theta_{int}$ are calculated by performing the foregoing steps S1021 to S1022.

Correspondingly, an embodiment of the present invention further discloses a base station for joint channel correction.

Figure 12:
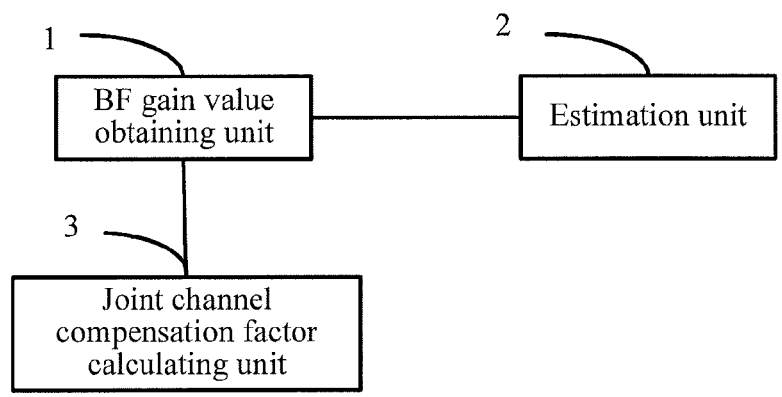
FIG. 12 is a schematic structural diagram of a base station according to an embodiment of the present invention.

Referring to FIG. 12, when the foregoing base station is used as a serving base station, the base station may include a BF gain value obtaining unit 1, an estimation unit 2 and a joint channel compensation factor calculating unit 3.

The BF gain value obtaining unit 1 is configured to obtain a beamforming BF gain value corresponding to each minimum unit.

The estimation unit 2 is configured to estimate a residual delay $\tau$ and an initial phase $\theta_{int}$ between channels of a serving base station and a coordinated base station according to the BF gain value obtained by the BF gain value obtaining unit 1.

The joint channel compensation factor calculating unit 3 is configured to calculate a joint channel receive compensation factor or a joint channel transmit compensation factor of each subcarrier of the coordinated base station according to the $\tau$ and $\theta_{int}$ estimated by the estimation unit 2, so that the coordinated base station adjusts, by using the joint channel receive compensation factor or the joint channel transmit compensation factor, a ratio of a transmit-receive intermediate radio frequency channel response to be consistent with a ratio of a transmit-receive intermediate radio frequency channel response of the serving base station, thereby completing joint channel correction between the serving base station and the coordinated base station.

In other embodiments of the present invention, the foregoing estimation unit 2 may include:

a determining unit, configured to determine inflection points in the BF gain values corresponding to the minimum units; and a calculating unit, configured to calculate the $\tau$ and $\theta_{int}$ according to a start point, an end point and the inflection points in the BF gain values corresponding to each minimum unit.

The foregoing BF gain value obtaining unit 1 may also include:

a selecting unit, configured to select one or more edge UEs with a CQI satisfying a preset condition as auxiliary UEs;

an $SINR_{TxD}$ calculating unit, configured to receive a transmit diversity CQI of a minimum unit fed back by an auxiliary UE, and calculate an $SINR_{TxD}$ of the minimum unit by using the CQI;

a BF_SINR obtaining unit, configured to instruct the auxiliary UEs to continuously send downlink signals on the minimum unit, to obtain a modulation and coding scheme corresponding to the minimum unit, and obtain, according to a preset correspondence between the modulation and coding scheme and a beamforming signal to interference plus noise ratio BF_SINR, a BF_SINR corresponding to the minimum unit; and a BF gain value calculating unit, configured to obtain, according to a relationship among the $SINR_{TxD}$, the BF_SINR and the BF gain value, the BF gain value corresponding to the minimum unit.

In addition, in other embodiments of the present invention, when the foregoing base station is used as a coordinated base station, the base station may include a joint channel correction unit. The joint channel correction unit is configured to adjust, by using the joint channel receive compensation factor or the joint channel transmit compensation factor, a ratio of a transmit-receive intermediate radio frequency channel response to be consistent with a ratio of a transmit-receive intermediate radio frequency channel response of the serving base station.

Figure 13:
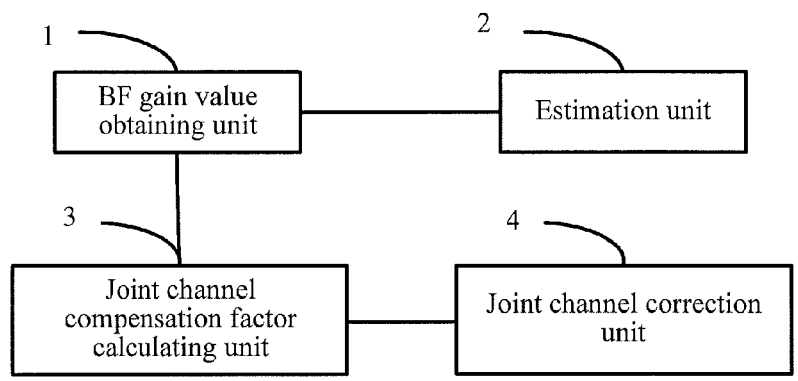
FIG. 13 is another schematic structural diagram of a base station according to an embodiment of the present invention.

In actual practice, each base station may function as a serving base station or a coordinated base station, and therefore, referring to FIG. 13, each base station may include a BF gain value obtaining unit 1, an estimation unit 2, a joint channel compensation factor calculating unit 3 and a joint channel correction unit 4.

Figure 14:
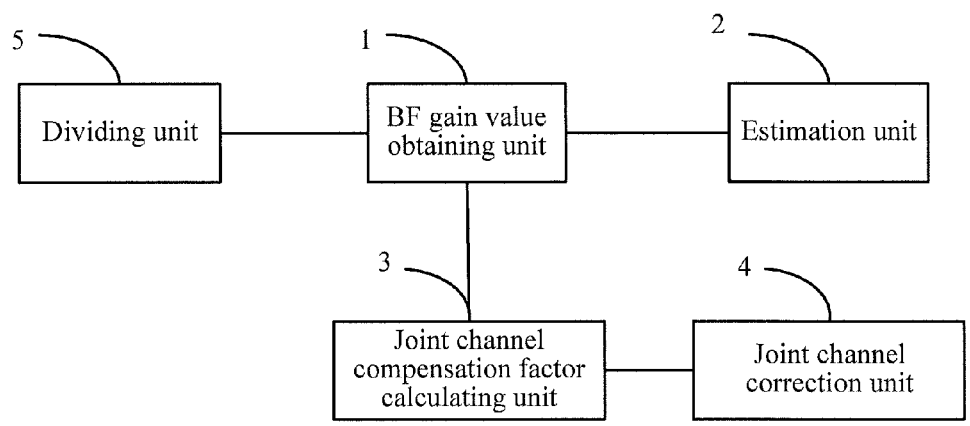
FIG. 14 is still another schematic structural diagram of a base station according to an embodiment of the present invention.

Moreover, referring to FIG. 14, the base station may further include a dividing unit 5 that divides a full band into at least one minimum unit.

For more details, reference may be made to records in the foregoing methods, and details are not described again herein.

The embodiments in this specification are all described in a progressive manner, mutual reference may be made to the same or similar part of the embodiments, and each embodiment focuses on illustrate difference from other embodiments.

Steps of methods described in the embodiments disclosed in this specification may be implemented by hardware, a software program executed by a processor, or a combination thereof. The software modules may be placed in a random access memory (RAM), a memory, a read-only memory (ROM), an electrically programmable ROM, an electrically erasable programmable ROM, a register, a hard disk, a removable disk, a CD-ROM or a storage medium in any other forms well-known in the art.

The preceding description disclosed in the embodiments allows a person skilled in the art to implement or use the present invention. Multiple modifications to these embodiments are apparent for a person skilled in the art. The general principle defined in the present invention may be implemented in other embodiments without departing from the spirit or scope of the present invention. Therefore, the present invention is not limited to the embodiments described in this invention, but extends to the widest scope that complies with the principle and novelty disclosed in the invention.

What is claimed is:

1. A joint channel correction method used for joint channel correction between base stations in a base station set, wherein the base station set comprises at least two base stations, each base station in the base station set comprises a remote radio unit (RRU), and at least one base station in the base station set is connected to a joint channel correction unit, so that all the base stations in the base station set share a common reference transmit end and a common reference receive end; and
the method comprises:
sending, by the common reference transmit end, an uplink correction signal to each base station in the base station set, wherein the uplink correction signal is used to calculate an uplink channel estimation value of each base station;
receiving, by the common reference receive end, a downlink correction signal sent by each base station in the base station set, wherein the downlink correction signal is used to calculate a downlink channel estimation value of each base station; and
completing channel self-correction of each base station according to the uplink channel estimation value and the downlink channel estimation value of each base station.

2. The method according to claim 1, wherein:
each base station in the base station set further comprises a coupling disc, wherein a first self-correction channel interface and a first service bearer interface that interwork with each other are disposed on the RRU, a second self-correction channel interface and a second service bearer interface that interwork with each other are disposed on the coupling disc, and the first service bearer interface interworks with the second service bearer interface; and
the at least one base station in the base station set is connected to the joint channel correction unit comprises:
the first self-correction channel interface of the at least one base station in the base station set is connected to the joint channel correction unit; and
any first self-correction channel interface connected to the joint channel correction unit is configured to be used as the common reference transmit end or the common reference receive end, or is configured to be used as both the common reference transmit end and the common reference receive end.

3. The method according to claim 2, wherein:
the joint channel correction unit comprises a first combiner and a second combiner, wherein a combining end of the first combiner is connected to a combining end of the second combiner; and
the first self-correction channel interface of the at least one base station in the base station set is connected to the joint channel correction unit comprises:
the first self-correction channel interface of the at least one base station in the base station set is connected to a dividing end of the first combiner;
the second self-correction channel interfaces of all the base stations in the base station set are separately connected to different dividing ends of the second combiner; and
any first self-correction channel interface connected to the first combiner is configured to be used as the common reference transmit end or the common reference receive end, or is configured to be used as both the common reference transmit end and the common reference receive end.

4. The method according to claim 2, wherein:
the joint channel correction unit comprises a second combiner; and
the first self-correction channel interface of the at least one base station in the base station set is connected to the joint channel correction unit comprises:
the first self-correction channel interface of any base station in the base station set is used as both the common reference transmit end and the common reference receive end, and is connected to a combining end of the second combiner; and
the second self-correction channel interfaces of the base stations in the base station set are connected to different dividing ends of the second combiner.

5. The method according to claim 2, wherein:
the joint channel correction unit comprises a second combiner and a radio frequency cable;
a first coupled circuit and a third combiner are built in, and a third self-correction channel interface is disposed on the coupling disc of one base station in the base station set; and
one dividing end of the third combiner is connected to the second service bearer interface of the coupling disc to which the third combiner belongs by using the first coupled circuit, another dividing end of the third combiner is connected to the third self-correction channel interface of the coupling disc to which the third combiner belongs, and a combining end of the third combiner is connected to the second self-correction channel interface of the coupling disc to which the third combiner belongs.

6. The method according to claim 5, wherein:
the first self-correction channel interface of the at least one base station in the base station set is connected to the joint channel correction unit comprises:
the first self-correction channel interface and the second self-correction channel interface of the base station to which the third combiner belongs interwork with each other by using the radio frequency cable;

the third self-correction channel interface of the base station to which the third combiner belongs is connected to a combining end of the second combiner;

dividing ends of the second combiner are separately connected to second self-correction channel interfaces of other base stations in the base station set; and the first self-correction channel interface of the base station to which the third combiner belongs is used as the common reference transmit end and the common reference receive end.

7. The method according to claim 5, wherein:

a third self-correction channel interface is disposed on the coupling disc of another base station in the base station set; and a second coupled circuit is also built in the coupling disc of the another base station, and the second coupled circuit is separately connected to the third self-correction channel interface and the second service bearer interface of the coupling disc to which the second coupled circuit belongs; or both the second coupled circuit and a fourth combiner are built in the coupling disc of the another base station, wherein a combining end of the fourth combiner is connected to the second service bearer interface of the coupling disc to which the second coupled circuit belongs by using the second coupled circuit, and two dividing ends of the fourth combiner are separately connected to the third self-correction channel interface and the second self-correction channel interface of the coupling disc to which the fourth combiner belongs; and a first self-correction channel interface of at least one base station in the base station set is connected to the joint channel correction unit comprises:

the first self-correction channel interface and the second self-correction channel interface of the base station to which the third combiner belongs interwork with each other by using the radio frequency cable;

the third self-correction channel interface of the base station to which the third combiner belongs is connected to a combining end of the second combiner;

dividing ends of the second combiner are separately connected to third self-correction channel interfaces of other base stations in the base station set; and the first self-correction channel interface of the base station to which the third combiner belongs is used as the common reference transmit end and the common reference receive end.

8. The method according to claim 2, wherein:

the joint channel correction unit comprises at least one first antenna; and a first self-correction channel interface of at least one base station in the base station set is connected to the joint channel correction unit comprises:

the first self-correction channel interface of one base station in the base station set is connected to the first antenna, or, the first self-correction channel interface of each base station in the base station set is connected to one first antenna, and any first self-correction channel interface connected to the first antenna is configured to be used as the common reference transmit end or the common reference receive end, or is configured to be used as both the common reference transmit end and the common reference receive end.

9. The method according to claim 8, wherein the first antenna is one of an ordinary antenna, a cable antenna or a leaky cable.

10. The method according to claim 9, wherein:

the joint channel correction unit further comprises at least one fifth combiner, wherein one dividing end of each fifth combiner is connected to one first antenna;

a first self-correction channel interface of one base station in the base station set is connected to the first antenna comprises:

the first self-correction channel interface of one base station in the base station set is connected to a combining end of the fifth combiner; and a first self-correction channel interface of each base station in the base station set is connected to one first antenna comprises:

the first self-correction channel interface of each base station in the base station set is connected to a combining end of one fifth combiner.

11. The method according to claim 2, wherein:

the uplink correction signal is a receive channel correction signal, and the downlink correction signal is a transmit channel correction signal;

the sending, by the common reference transmit end, an uplink correction signal to each base station in the base station set comprises:

sending, by the first self-correction channel interface used as the common reference transmit end, the receive channel correction signal to the first service bearer interface of each base station in the base station set; and the receiving, by the common reference receive end, a downlink correction signal sent by each base station in the base station set comprises:

receiving, by the first self-correction channel interface used as the common reference receive end, the transmit channel correction signal sent by the first service bearer interface of each base station in the base station set.

12. The method according to claim 1, wherein:

the common reference transmit end and the common reference receive end are a same user equipment (UE) simulator or different UE simulators, the uplink correction signal is a sounding reference (SRS) signal, and the downlink correction signal is a common reference (CRS) signal;

the sending, by the common reference transmit end, an uplink correction signal to each base station in the base station set comprises:

sending, by the UE simulator used as the common reference transmit end, the SRS signal to each base station in the base station set; and the receiving, by the common reference receive end, a downlink correction signal sent by each base station in the base station set comprises:

receiving, by the UE simulator used as the common reference receive end, the CRS signal sent by each base station in the base station set.

13. The method according to claim 12, wherein:

each base station in the base station set comprises a first service bearer interface and a communication interface unit, wherein the communication interface unit comprises an internal communication interface and an external communication interface;

the joint channel correction unit comprises a data line, a seventh combiner, at least two sixth combiners and the UE simulator used as the common reference transmit end and the common reference receive end, combining ends of the at least two sixth combiners are separately connected to different dividing ends of the seventh combiner, a radio frequency interface is disposed on the UE simulator, and a combining end of the seventh combiner is connected to the radio frequency interface;

at least one base station in the base station set is connected to a joint channel correction unit comprises:

a dividing end of each sixth combiner is connected to the first service bearer interface of each base station in the base station set;

a data transmission interface of the UE simulator of the joint channel correction unit is connected to an external communication interface of each base station in the base station set; or a data transmission interface of the UE simulator of the joint channel correction unit is connected to an external communication interface used as a primary communication interface unit by using a data cable, wherein the primary communication interface unit is a communication interface unit of any base station in the base station set; or a data transmission interface of the UE simulator of the joint channel correction unit and an internal communication interface of each base station in the base station set are both connected to an input interface of an external interconnected calculating unit by using a data cable;

the sending, by the UE simulator used as the common reference transmit end, the SRS signal to each base station in the base station set comprises:

sending the SRS signal to each base station in the base station set by using a radio frequency interface of the UE simulator of the joint channel correction unit; and the receiving, by the UE simulator used as the common reference receive end, the CRS signal sent by each base station in the base station set comprises:

receiving, by the UE simulator of the joint channel correction unit, the CRS signal sent by the first service bearer interface of each base station in the base station set.

14. The method according to claim 12, wherein:

the joint channel correction unit comprises an UE simulator;

at least one base station in the base station set is connected to the joint channel correction unit comprises:

the UE simulator is placed at cell edges of at least two base stations in the base station set, so as to be used as the common reference transmit end and the common reference receive end; and before the SRS signal and the CRS signal are sent, the method further comprises:

exchanging, by each base station in the base station set, scheduling information; and when at least one base station in the base station set is in a preset light load state, enabling a part of subframes of the base station in the preset light load state to be silent.

15. The method according to claim 1, wherein the receiving, by the common reference receive end, a downlink correction signal sent by each base station in the base station set comprises:

receiving, by the common reference receive end, downlink correction signals that are simultaneously sent by all service antennas or all radio frequency cable interfaces of all base stations in the base station set in a frequency division manner.

16. A joint channel correction method, used for joint channel correction between a serving base station and a coordinated base station, comprising:

obtaining a beamforming BF gain value corresponding to each minimum unit, wherein the minimum unit comprises at least one subcarrier;

estimating a residual delay $\tau$ and an initial phase $\theta_{int}$ between channels of the serving base station and the coordinated base station according to the obtained BF gain value; and calculating a joint channel receive compensation factor or a joint channel transmit compensation factor of each subcarrier of the coordinated base station according to the $\tau$ and $\theta_{int}$, so that the coordinated base station adjusts, by using the joint channel receive compensation factor or the joint channel transmit compensation factor, a ratio of a transmit-receive intermediate radio frequency channel response to be consistent with a ratio of a transmit-receive intermediate radio frequency channel response of the serving base station, thereby completing joint channel correction between the serving base station and the coordinated base station.

17. The method according to claim 16, wherein:

before the obtaining a BF gain value corresponding to each minimum unit, the method further comprises:

dividing a full band into at least one minimum unit.

18. The method according to claim 16, wherein the estimating a residual delay $\tau$ and an initial phase $\theta_{int}$ between channels of the serving base station and the coordinated base station according to the obtained BF gain value comprises:

determining inflection points in the BF gain values corresponding to the minimum units; and calculating the $\tau$ and $\theta_{int}$ according to a start point, an end point and the inflection points in the BF gain values corresponding to the minimum units.

19. A joint channel correction unit, connected to at least one base station in a base station set, wherein:

the joint channel correction unit comprises a first combiner and a second combiner;

a combining end of the first combiner is connected to a combining end of the second combiner;

a dividing end of the first combiner is connected to a first self-correction channel interface of at least one base station in the base station set; and different dividing ends of the second combiner are separately connected to second self-correction channel interfaces of all base stations in the base station set; or, the joint channel correction unit comprises the second combiner, wherein the combining end of the second combiner is connected to the first self-correction channel interface of any base station in the base station set, and different dividing ends of the second combiner are separately connected to second self-correction channel interfaces of all base stations in the base station set.

20. A base station, comprising a remote radio unit (RRU) and a coupling disc, wherein a first self-correction channel interface and a first service bearer interface that interwork with each other are disposed on the RRU, a second self-correction channel interface and a second service bearer interface that interwork with each other are disposed on the coupling disc, and the first service bearer interface interworks with the second service bearer interface, wherein a first coupled circuit and a third combiner are built in, and a third self-correction channel interface is disposed on the coupling disc; and a dividing end of the third combiner is connected to the second service bearer interface by using the first coupled circuit, another dividing end of the third combiner is connected to the third self-correction channel interface, and a combining end of the third combiner is connected to the second self-correction channel interface.

* * * * *